(12) United States Patent
Nakajima

(10) Patent No.: US 9,229,645 B2
(45) Date of Patent: Jan. 5, 2016

(54) STORAGE MANAGEMENT METHOD AND STORAGE SYSTEM IN VIRTUAL VOLUME HAVING DATA ARRANGED ASTRIDE STORAGE DEVICES

(75) Inventor: Akio Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/391,518

(22) PCT Filed: Feb. 10, 2012

(86) PCT No.: PCT/JP2012/000924
§ 371 (c)(1),
(2), (4) Date: Feb. 21, 2012

(87) PCT Pub. No.: WO2013/118195
PCT Pub. Date: Aug. 15, 2013

(65) Prior Publication Data
US 2014/0351545 A1  Nov. 27, 2014

(51) Int. Cl.
*G06F 3/06* (2006.01)

(52) U.S. Cl.
CPC ............ *G06F 3/0629* (2013.01); *G06F 3/0604* (2013.01); *G06F 3/0607* (2013.01); *G06F 3/067* (2013.01); *G06F 3/0617* (2013.01); *G06F 3/0641* (2013.01); *G06F 3/0664* (2013.01);
(Continued)

(58) Field of Classification Search
CPC ... G06F 3/0629; G06F 3/0604; G06F 3/0641; G06F 3/067; G06F 3/0664; G06F 3/0617; G06F 3/0689; G06F 3/0665; G06F 3/0607; G06F 2003/0695; G06F 12/0223; G06F 3/06
See application file for complete search history.

(56) References Cited

U.S. PATENT DOCUMENTS

| 5,335,328 A * | 8/1994 | Dunn et al. ..................... 710/33 |
| 5,742,792 A * | 4/1998 | Yanai et al. .................... 711/162 |
| 6,711,162 B1 * | 3/2004 | Ortega et al. .................. 370/389 |

(Continued)

FOREIGN PATENT DOCUMENTS

| EP | 1717688 | 11/2006 |
| WO | 2010084522 | 7/2010 |

OTHER PUBLICATIONS

Webopedia, "SAN", Apr. 10, 2001, pp. 1-2, https://web.archive.org/web/20010410060140/http://webopedia.com/TERM/S/SAN.html.*

(Continued)

*Primary Examiner* — Edward Dudek, Jr.
*Assistant Examiner* — Christopher D Birkhimer
(74) *Attorney, Agent, or Firm* — Mattingly & Malur, PC

(57) ABSTRACT

An administrator instructs creation of a volume to a virtual storage device and registration of a host port for providing access permission to the volume. The virtual storage device searches a candidate of a physical storage device capable of reaching the host port and a candidate of the target port based on the access permission information, and creates a distributed volume astride the candidate physical storage device. The distributed volume is composed of a plurality of partial volumes, and the partial volumes inherit the functions of the storage device and the access permission information set for the distributed volume. The virtual storage device distributes an access permission to the physical storage device, constitutes the access permission information of the host port and the volume with respect to the candidate target port, and registers the access permission information of the host port and the target port to the SAN switch.

17 Claims, 57 Drawing Sheets

(52) U.S. Cl.
CPC ............ *G06F 3/0665* (2013.01); *G06F 3/0689* (2013.01); *G06F 2003/0695* (2013.01)

(56) References Cited

U.S. PATENT DOCUMENTS

| | | | |
|---|---|---|---|
| 7,127,577 | B2 | 10/2006 | Koning et al. |
| 7,441,009 | B2* | 10/2008 | Shinohara ..................... 709/215 |
| 7,478,221 | B1 | 1/2009 | Karr et al. |
| 7,529,816 | B2* | 5/2009 | Hayden ............... H04L 67/1097 709/220 |
| 7,577,729 | B1* | 8/2009 | Umbehocker et al. ........ 709/223 |
| 7,657,613 | B1* | 2/2010 | Hanson et al. ................. 709/220 |
| 7,818,515 | B1* | 10/2010 | Umbehocker ........ G06F 3/0605 711/114 |
| 7,844,856 | B1* | 11/2010 | Ahal et al. ....................... 714/19 |
| 8,032,701 | B1 | 10/2011 | Glade et al. |
| 8,984,248 | B2* | 3/2015 | Morishita ............. G06F 3/0608 711/100 |
| 2002/0038406 | A1* | 3/2002 | Shirai et al. ................... 711/137 |
| 2003/0115439 | A1 | 6/2003 | Mahalingam et al. |
| 2003/0149753 | A1* | 8/2003 | Lamb ............................ 709/223 |
| 2003/0204597 | A1* | 10/2003 | Arakawa et al. .............. 709/226 |
| 2004/0073677 | A1* | 4/2004 | Honma et al. ................. 709/226 |
| 2004/0243737 | A1* | 12/2004 | Beardsley et al. .............. 710/22 |
| 2006/0277383 | A1* | 12/2006 | Hayden .................. H04L 69/14 711/170 |
| 2007/0150590 | A1* | 6/2007 | Shinohara ..................... 709/225 |
| 2007/0180000 | A1* | 8/2007 | Mine et al. ..................... 707/204 |
| 2008/0244099 | A1* | 10/2008 | Machida ........................... 710/6 |
| 2009/0019157 | A1 | 1/2009 | Suman et al. |
| 2009/0083484 | A1* | 3/2009 | Basham et al. ................ 711/114 |
| 2009/0210634 | A1* | 8/2009 | Tsuruta ......................... 711/141 |
| 2009/0216986 | A1 | 8/2009 | Sakurai et al. |
| 2009/0222733 | A1* | 9/2009 | Basham et al. ................ 715/736 |
| 2009/0249104 | A1* | 10/2009 | Ikeda et al. .................... 713/324 |
| 2009/0271485 | A1* | 10/2009 | Sawyer et al. ................. 709/206 |
| 2010/0057985 | A1* | 3/2010 | Kaneda et al. ................. 711/114 |
| 2010/0088280 | A1* | 4/2010 | Satoyama et al. ............. 707/640 |
| 2010/0153767 | A1 | 6/2010 | Fredin et al. |
| 2010/0235573 | A1* | 9/2010 | Asano et al. ................... 711/114 |
| 2011/0167233 | A1* | 7/2011 | Sekine et al. .................. 711/162 |
| 2011/0178988 | A1* | 7/2011 | Satoyama et al. ............. 707/649 |

OTHER PUBLICATIONS

International Search Report in PCT Application No. PCT/JP2012/000922, dated Jul. 6, 2012.
International Search Report in PCT Application No. PCT/JP2012/000924, dated Jul. 6, 2012.
C. DeSanti, "FC-GS-7 Peer Zoning Specification", INCITS Technical Committee T11 Document No. 11-411v3, Dec. 2011, ftp://ftp.t10.org/t11/document.11/11-411v3.pdf.

* cited by examiner

Fig.12A

Volume Type / Name — 1104
(Global)

| Int. LUN | Volume Type | LU Name | pointer to volume (Global LUN) | Global Physical Storage ID |
|---|---|---|---|---|
| 0000 | Entity Volume | AAAA_AAAA | N/A | Phy Storage #0 |
| 0001 | Distributed Virtual Volume | BBBB_BBBB | N/A | N/A |
| 0002 | Virtual Volume | [ AAAA_AAAA ] | 0000 | Phy Storage #0 |
| 0003 | Partial Volume | [ BBBB_BBBB ] | 0001 | Phy Storage #0 |
| 0004 | Partial Volume | [ BBBB_BBBB ] | 0001 | Phy Storage #1 |
| ... | ... | ... | ... | ... |

Fig.12B

Distributed Virtual Volume — 1105
(Global)

| D-Vol Int. LUN | Volume Type | p-Vol Int. LUN | Global Physical Storage ID |
|---|---|---|---|
| 0001 | Partial Volume | 0003 | Phy Storage #0 |
| | Partial Volume | 0004 | Phy Storage #1 |
| ... | ... | ... | ... |

Fig.12C

Storage Function Table — 1116
(Global)

| Int. LUN | Function Enable Flags | inheritance Int. LUN |
|---|---|---|
| 0000 | Page Provisioning = 1 Volume Copy = 1, ... | N/A |
| 0001 | Snap Shot = 1, Page Provisioning = 1 De-duplication = 1, ... | N/A |
| 0003 | Snap Shot = 1, Page Provisioning = 1 De-duplication = 1, ... | 0001 (D-Vol) |

Fig.13A

Host Group (per Target Port local) — 1109

| Host Group | Storage Target Port WWPN | Host Initiator Port WWPN | Host LUN | Global Int. LUN | Attribute index |
|---|---|---|---|---|---|
| AAAA0000 | 5006_0E80_AAAA_0001 | 2001_0011_2233_4455 | 0000 | 0001 | 2 |
| AAAA0001 | 5006_0E80_AAAA_0001 | 2001_AA22_3344_4455 | 0000 | 0002 | 1 |
| BBBB0000 | 5006_0E80_BBBB_0001 | 2001_BB22_3344_8899 | 0002 | 0003 | 1 |
| BBBB0001 | 5006_0E80_BBBB_0002 | 2001_CC22_7788_AA00 | 0000 | 0001 | 3 |
| CCCC0000 | 5006_0E80_CCCC_0001 | 2001_DD22_AA00_FF11 | 0004 | 0004 | 1 |
| ... | ... | ... | ... | ... | ... |

Fig.13B

Host Group Attribute Table (Global) — 1110

| Attribute index | Host OS Type | Host Multipath Software Type | Auto Data Migration | Policy |
|---|---|---|---|---|
| 1 | Vender A OS A | SPC-3 ALUA | Volume | Archive (SATA) |
| 2 | Vender A OS B | SPC-4/SBC-3 ALUA & Referral | Volume / Page | High Transaction (SSD) |
| 3 | Vender B OS C | SPC-4/SBC-3 ALUA & Referral | Volume / Page | Mixed (SATA/SSD) |
| 4 | Vender C OS D | SPC-4/SBC-3 ALUA & Referral | Volume / Page | High Throughput (Port) |
| 5 | Vender D OS E | SPC-5 ALUA enhance | Disable | N/A |
| ... | ... | ... | ... | ... |

Fig.14A

Host / Peer Zone (storage local) — 1111

| Storage Target Port WWPN | Mode | Num of Initiator Port | Host Initiator Port WWPN | Host Group |
|---|---|---|---|---|
| 5006_0E80_ AAAA_0001 | Fabric | 2 | 2001_0011_ 2233_4455 | AAAA0000 |
| | | | 2001_AA22_ 3344_4455 | AAAA0001 |
| 5006_0E80_ BBBB_0001 | Fabric | 1 | 2001_BB22_ 3344_8899 | BBBB0000 |
| 5006_0E80_ BBBB_0002 | Fabric | 1 | 2001_CC22_ 7788_AA00 | BBBB0001 |
| 5006_0E80_ CCCC_0001 | P2P | 1 | 2001_DD22_ AA00_FF11 | CCCC0000 |
| ... | ... | ... | ... | ... |

Fig.14B

Communication Path / Peer Zone (storage local) — 1102

| Storage Target Port WWPN | Mode | Num of Initiator Port | Storage Initiator Port WWPN | Global Physical Storage ID |
|---|---|---|---|---|
| 5006_0E80_ AAAA_0001 | Fabric | 3 | 5006_0E80_ BBBB_0001 | Phy Storage #1 |
| | | | 5006_0E80_ BBBB_0002 | Phy Storage #1 |
| | | | 5006_0E80_ CCCC_0001 | Phy Storage #2 |
| 5006_0E80_ BBBB_0001 | Fabric | 1 | 5006_0E80_ AAAA_0001 | Phy Storage #0 |
| 5006_0E80_ BBBB_0002 | P2P | 1 | 5006_0E80_ CCCC_0001 | Phy Storage #2 |
| ... | ... | ... | ... | ... |

Fig.15A

Target Port Group (Global) — 1113

| Target Port Group | AAS | num RTPI | Relative Target Port Identifier | Storage Target Port WWPN |
|---|---|---|---|---|
| 0A01 | Act/Opt | 1 | 0A01 | 5006_0E80_AAAA_0001 |
| 0A02 | Offline | 1 | 0A02 | 5006_0E80_AAAA_0002 |
| 0B01 | Unavailable | 1 | 0B01 | 5006_0E80_BBBB_0001 |
| 0B02 | LBD | 1 | 0B02 | 5006_0E80_BBBB_0002 |
| 0C01 | LBD | 1 | 0C01 | 5006_0E80_CCCC_0001 |
| ... | ... | ... | ... | ... |

Fig.15B

Referral table (per D-Vol) — 1114

| D-Vol Int. LUN | p-Vol Int. LUN | Start / End LBA | num TPG | TPG [0] AAS [0] | TPG [1] AAS [1] |
|---|---|---|---|---|---|
| 0001 | 0003 | 0000 / 0999 | 2 | 0A01 Act/Opt | 0A02 Act/UnOpt |
| | | 4000 / 4999 | 2 | 0A01 Act/Opt | 0A02 Act/UnOpt |
| | | 8000 / 9999 | 2 | 0A01 Act/Opt | 0A02 Act/UnOpt |
| | 0004 | 1000 / 3999 | 2 | 0B01 Act/Opt | 0B02 Act/UnOpt |
| | | 5000 / 7999 | 2 | 0B01 Act/Opt | 0B02 Act/UnOpt |
| ... | ... | ... | ... | ... | ... |

Fig.16A

Target Port Group (per Host Group / Volume pair) — 1113

| Int. LUN | Host Group | TPG | num RTPI | RTPI | Storage Target Port WWPN | AAS |
|---|---|---|---|---|---|---|
| 0001 (D-Vol) | AAAA0000 | 0001 | 1 | 0000 | 5006_0E80_AAAA_0001 | LBD |
| | AAAA0001 | 0002 | 1 | 0001 | 5006_0E80_AAAA_0001 | LBD |
| | BBBB0000 | 0003 | 1 | 0002 | 5006_0E80_BBBB_0001 | LBD |
| | BBBB0001 | 0004 | 1 | 0003 | 5006_0E80_BBBB_0002 | LBD |
| 0002 (V-Vol) | CCCC0000 | 0001 | 1 | 0000 | 5006_0E80_CCCC_0001 | Act/Opt |
| | ... | ... | ... | ... | ... | ... |

Fig.16B

Referral table (per Host Group / D-Vol pair) — 1114

| D-Vol Int. LUN | p-Vol Int. LUN | Host Group | UDS# (Start / End LBA) | num TPG | TPG [0] AAS [0] | TPG [1] AAS [1] |
|---|---|---|---|---|---|---|
| 0001 | 0003 | AAAA0000 AAAA0001 ... | #0 0000 / 0999 | 2 | 0001 Act/Opt | 0002 Act/UnOpt |
| | | | #2 4000 / 4999 | 2 | 0001 Act/Opt | 0002 Act/UnOpt |
| | | | #4 8000 / 9999 | 2 | 0001 Act/Opt | 0002 Act/UnOpt |
| | 0004 | BBBB0000 BBBB0001 ... | #1 1000 / 3999 | 2 | 0003 Act/Opt | 0004 Act/UnOpt |
| | | | #3 5000 / 7999 | 2 | 0003 Act/Opt | 0004 Act/UnOpt |
| ... | ... | ... | ... | ... | ... | ... |

Fig.18A

TPG table (Host memory) — 172

| Storage Target Port WWPN | Num LU | LUN | Vender / Device / LU Name | RTPI | TPG AAS | ALUA Support |
|---|---|---|---|---|---|---|
| 5006_0E80_AAAA_0001 | 2 | 0000 | Vender / Device / BBBB_BBBB | 0000 | 0001 LBD | TPGS =01 R_SUP = 1 |
| | | 0001 | Vender / Device / AAAA_AAAA | 0000 | 0001 Act/Opt | TPGS =01 R_SUP = 0 |
| 5006_0E80_AAAA_0002 | 1 | 0000 | Vender / Device / BBBB_BBBB | 0001 | 0002 LBD | TPGS =01 R_SUP = 1 |
| 5006_0E80_BBBB_0001 | 1 | 0000 | Vender / Device / BBBB_BBBB | 0002 | 0003 LBD | TPGS =01 R_SUP = 1 |
| 5006_0E80_BBBB_0002 | 1 | 0000 | Vender / Device / BBBB_BBBB | 0003 | 0004 LBD | TPGS =01 R_SUP = 1 |
| ... | ... | ... | ... | ... | ... | ... |

Fig.18B

Referral table (Host memory) — 173

| LUN | UDS Start / End LBA | num TPG | TPG [0] AAS [0] | TPG [1] AAS [1] |
|---|---|---|---|---|
| 0000 | 0000 / 0999 | 2 | 0001 Act/Opt | 0002 Act/UnOpt |
| | 1000 / 3999 | 2 | 0003 Act/Opt | 0004 Act/UnOpt |
| | 4000 / 4999 | 2 | 0001 Act/Opt | 0002 Act/UnOpt |
| | 5000 / 7999 | 2 | 0003 Act/Opt | 0004 Act/UnOpt |
| | 8000 / 9999 | 2 | 0001 Act/Opt | 0002 Act/UnOpt |
| ... | ... | ... | ... | ... |

Fig.19A

Referral Hit/Miss History table (Host memory) — 174

| LUN | Start / End LBA | num TPG | TPG [0] | Hit/Miss TPG [0] | TPG [1] | Hit/Miss TPG [1] |
|---|---|---|---|---|---|---|
| 0000 | 0000 / 0999 | 1 | 0001 | Hit | | |
| | 1000 / 1999 | 2 | 0003 | Miss | 0001 | Hit |
| | 2000 / 2999 | 1 | 0003 | Hit | | |
| | 3000 / 3999 | 2 | 0003 | Miss | 0001 | Hit |
| | 4000 / 9999 | 2 | 0001 | Hit | 0003 | Miss |
| | ... | ... | ... | ... | ... | ... |

Fig.19B

Name server Query Table (Host memory) — 176

| Host Initiator Port WWPN | Num of Target Port | Storage Target Port WWPN | FC-4 Type / Feature | Array Vender / Phys Storage |
|---|---|---|---|---|
| 2001_0011_ 2233_4455 | 2 | 5006_0E80_ AAAA_0001 | SCSI-FCP Target | Vender / Phys. Storage A |
| | | 5006_0E80_ AAAA_0002 | SCSI-FCP Target | Vender / Phys. Storage A |
| 2001_AA22_ 3344_4455 | 2 | 5006_0E80_ BBBB_0001 | SCSI-FCP Target | Vender / Phys. Storage B |
| | | 5006_0E80_ BBBB_0002 | SCSI-FCP Target | Vender / Phys. Storage B |
| ... | ... | ... | ... | ... |
| | ... | ... | ... | ... |

Fig.21A

Name server D.B. table
(SAN Switch memory) — 202

| N_Port ID | Port WWPN | FC-4 Type / Feature | Array Vender / Phys Storage | FDMI (Host HBA) |
|---|---|---|---|---|
| 010100 | 2001_0011_ 2233_4455 | SCSI-FCP Initiator | | HBA Vender / Host Name / ... |
| 010200 | 2001_AA22_ 3344_4455 | SCSI-FCP Initiator | | HBA Vender / Host Name / ... |
| 0A0100 | 5006_0E80_ AAAA_0001 | SCSI-FCP Both | Vender / Phys. Storage A | |
| 0A0200 | 5006_0E80_ AAAA_0002 | SCSI-FCP Both | Vender / Phys. Storage A | |
| 0B0100 | 5006_0E80_ BBBB_0001 | SCSI-FCP Both | Vender / Phys. Storage B | |
| ... | ... | ... | ... | ... |

Fig.21B

Zone D.B. table
(SAN Switch memory) — 205

| Zoneset (ASCII) | Zone Name (ASCII Code) | num | Port WWPN [0] | Port WWPN [n] | Attribute |
|---|---|---|---|---|---|
| Cfg_A | HostA_port0 | 3 | 5006_0E80_ AAAA_0001 | 2001_0011_ 2233_4455 | WWPN zone |
| | HostA_port1 | 2 | 5006_0E80_ AAAA_0002 | 2001_AA22_ 3344_4455 | WWPN zone |
| | ... | ... | ... | ... | ... |
| Cfg_B | ... | n | WWPN[0] | WWPN [n] | ... |
| | ... | ... | ... | ... | ... |
| ... | ... | ... | ... | ... | ... |

Fig.22

Active Zone Set table
(SAN Switch memory)    — 206

| Zoneset | Zone Name (ASCII Code) | num | Port WWPN [0] | Port WWPN [n] | Attribute |
|---|---|---|---|---|---|
| Active Zone Set | HostA_port0 | 3 | 5006_0E80_ AAAA_0001 | 2001_0011_ 2233_4455 | WWPN zone |
| | HostA_port1 | 2 | 5006_0E80_ AAAA_0002 | 2001_AA22_ 3344_4455 | WWPN zone |
| | x0_5006_0E80_ BBBB_0001 | 2 | 5006_0E80_ BBBB_0001 | 2001_0011_ 2233_4455 | Peer Zone |
| | x0_5006_0E80_ BBBB_0002 | 2 | 5006_0E80_ BBBB_0002 | 2001_0011_ 2233_4455 | Peer Zone |
| | x0_5006_0E80_ CCCC_0001 | 2 | 5006_0E80_ CCCC_0001 | ... | Peer Zone |
| | ... | n | WWPN[0] | WWPN [n] | ... |

Fig.30

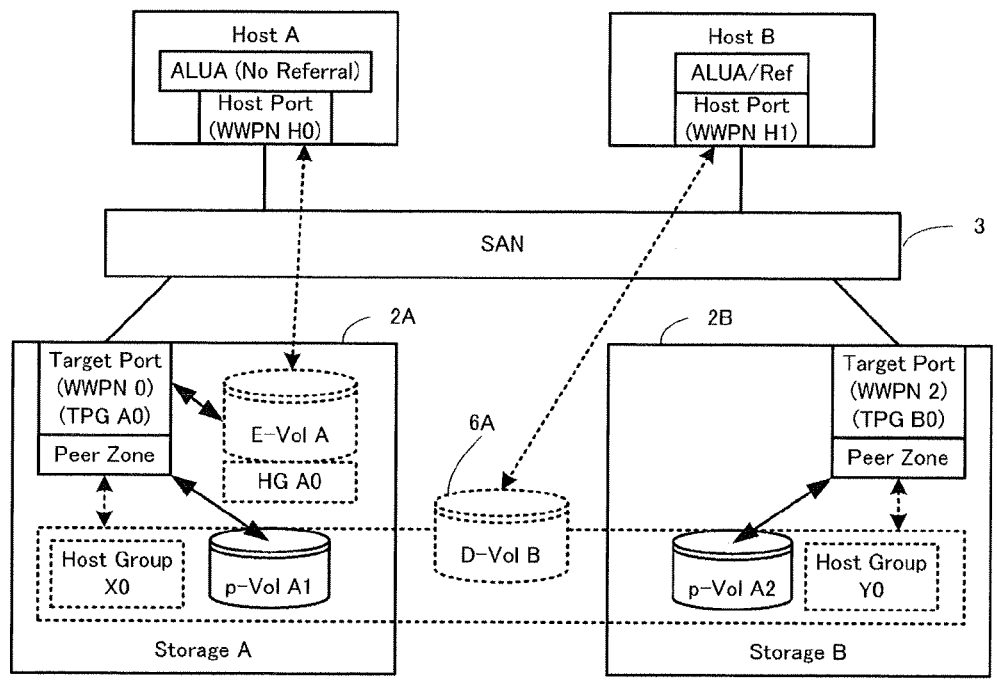

TPG Table (Host Memory)

| LU Name | TPG/AAS | R_SUP |
|---|---|---|
| AAAA_AAAA | A0 / Act0 | 0 (No) |

Referral Table (Host Memory A)

<Not Supported>

Peer Zone (Storage A)

| Target | Mode | Host |
|---|---|---|
| WWPN 0 | Fabric | WWPN H0 |
| | | WWPN H1 |

Host Group (Storage A)

| HG | Target | Host | Host LUN |
|---|---|---|---|
| A0 | WWPN 0 | WWPN H0 | 0000 |
| X0 | WWPN 0 | WWPN H1 | 0000 |

TPG Table (Storage Global)

| Vol | HG | Target | TPG | TPG/AAS |
|---|---|---|---|---|
| E-VolA | A0 | WWPN 0 | A0 | A0 / Act0 |
| D-VolB | X0 | WWPN 0 | A0 | A0 / LBD |
| | Y0 | WWPN 2 | B0 | B0 / LBD |

TPG Table (Host Memory B)

| LU Name | TPG/AAS |
|---|---|
| BBBB_BBBB (D-VolB) | A0 / LBD |
| | B0 / LBD |

Referral Table (Host Memory B)

| LU Name | LBA | TPG/AAS |
|---|---|---|
| BBBB_BBBB (D-VolB) | 0-199 | A0 / Act0 |
| | 200-599 | B0 / Act0 |

Peer Zone (Storage B)

| Target | Mode | Host |
|---|---|---|
| WWPN 2 | Fabric | WWPN H1 |

Host Group (Storage B)

| HG | Target | Host | Host LUN |
|---|---|---|---|
| Y0 | WWPN 2 | WWPN H1 | 0000 |

Referral Table (Storage Global)

| Vol | HG | LBA | TPG/AAS |
|---|---|---|---|
| D-VolB | X0 | 0-199 | A0 / Act0 |
| | Y0 | 200-599 | B0 / Act0 |

Fig. 31

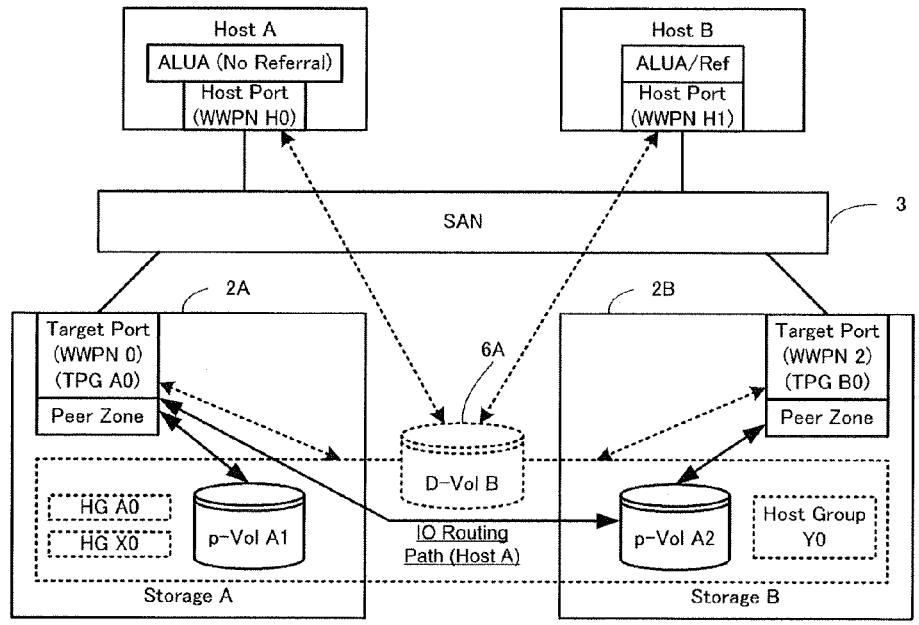

ALUA Table (Host Memory A)

| LU Name | TPG/AAS | R_SUP |
|---|---|---|
| BBBB_BBBB | A0 / ActO | 0 (No) |

Referral Table (Host Memory A)

<Not Supported>

Peer Zone (Storage A)

| Target | Mode | Host |
|---|---|---|
| WWPN 0 | Fabric | WWPN H0 |
| | | WWPN H1 |

Host Group (Storage A)

| HG | Target | Host | Host LUN |
|---|---|---|---|
| A0 | WWPN 0 | WWPN H0 | 0000 |
| X0 | WWPN 0 | WWPN H1 | 0000 |

TPG Table (Storage Global)

| Vol | HG | Target | TPG | TPG/AAS |
|---|---|---|---|---|
| D-VolB | A0 | WWPN 0 | A0 | A0 / ActO |
| D-VolB | X0 | WWPN 0 | A0 | B0 / LBD |
| | Y0 | WWPN 2 | B0 | A0 / LBD |

ALUA Table (Host Memory B)

| LU Name | TPG/AAS |
|---|---|
| BBBB_BBBB (D-VolB) | A0 / LBD |
| | B0 / LBD |

Referral Table (Host Memory B)

| LU Name | LBA | TPG/AAS |
|---|---|---|
| BBBB_BBBB (D-VolB) | 0-199 | A0 / ActO |
| | 200-599 | B0 / ActO |

Peer Zone (Storage B)

| Target | Mode | Host |
|---|---|---|
| WWPN 2 | Fabric | WWPN H1 |

Host Group (Storage B)

| HG | Target | Host | Host LUN |
|---|---|---|---|
| Y0 | WWPN 2 | WWPN H1 | 0000 |

Referral Table (Storage Global)

| Vol | HG | LBA | TPG/AAS | Storage ID |
|---|---|---|---|---|
| D-VolB | X0 | 0-199 | A0 / ActO | Storage A |
| | Y0 | 200-599 | B0 / ActO | Storage B |

Fig.33

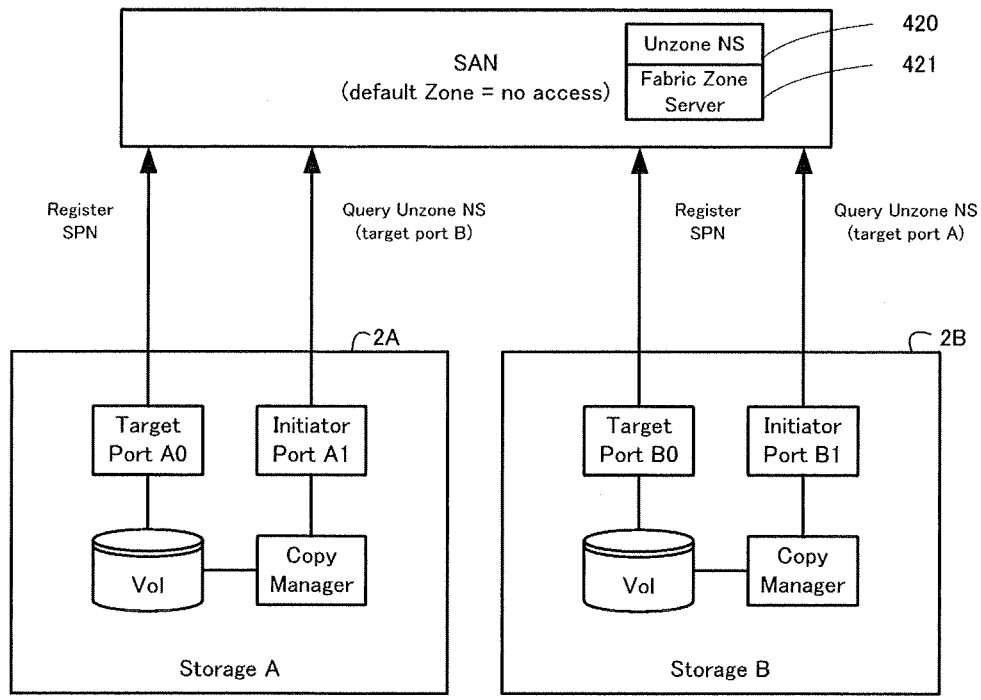

Query Unzone Name Server (Storage A/B)

| N_Port | WWPN | FC-4 Type / Feature | Array Vender |
|--------|------|---------------------|------------------|
| A0 | WWN A0 | FCP / Target | Vender / Storage A |
| A1 | WWN A1 | FCP / Initiator | Vender / Storage A |
| B0 | WWN B0 | FCP / Target | Vender / Storage B |
| B1 | WWN B1 | FCP / Initiator | Vender / Storage B |

Peer Zone (Storage A)

| Target | Mode | Host |
|--------|------|------|
| WWN A0 | Fabric | N/A |

Query Name Server (Storage A)

Access Deny

Peer Zone (Storage B)

| Target | Mode | Host |
|--------|------|------|
| WWN B0 | Fabric | N/A |

Query Name Server (Storage A)

Access Deny

Fig.41

Page table (Storage memory) — 1106

| Physical Storage # | Pool # | Media Type | Page # | Page Address (Start / End LBA) | internal LUN | UDS # (Start / End LBA) |
|---|---|---|---|---|---|---|
| Physical Storage #1 | 0 | SSD | 0 | 0000 - 0099 | D-Vol 0001 | 0 (0000-0099) |
| | | | 1 | 0100 - 0199 | D-Vol 0002 | 0 (0000-0099) |
| | | | 2 | 0200 - 0299 | D-Vol 0001 | 0 (0100-0199) |
| | | | 3 | 0300 - 0399 | ... | ... |
| | | | ... | ... | ... | ... |
| | 1 | SATA | 0 | 0000 - 1999 | D-Vol 0001 | 3 (2200-3199) |
| | | | | | D-Vol 0001 | 4 (3200-4199) |
| | | | 1 | 2000 - 3999 | D-Vol 0002 | 2 (2100-4099) |
| | | | ... | ... | ... | ... |
| Physical Storage #2 | 0 | SAS | 0 | 0000 - 0999 | D-Vol 0001 | 5 (4200-5199) |
| | | | 1 | 1000 - 1999 | D-Vol 0001 | 5 (5200-6199) |
| | | | 2 | 2000 - 2999 | D-Vol 0002 | 1 (0100-2099) |
| | | | 3 | 3000 - 3999 | ... | ... |
| | | | ... | ... | ... | ... |
| | 1 | SATA | 0 | 0000 - 1999 | D-Vol 0001 | 1 (0200-1199) |
| | | | | | D-Vol 0001 | 2 (1200-2199) |
| | | | 1 | 2000 - 3999 | D-Vol 0002 | 3 (4100-6099) |
| | | | ... | ... | ... | ... |

STORAGE MANAGEMENT METHOD AND STORAGE SYSTEM IN VIRTUAL VOLUME HAVING DATA ARRANGED ASTRIDE STORAGE DEVICES

TECHNICAL FIELD

The technical field of the present invention relates to hosts, storage devices, a network coupling the hosts and storage devices, and a communication protocol of block storages.

BACKGROUND ART

In large-scale computer systems and virtual machine environments, storage devices are required to have extremely high system IO performances using a large amount of volumes. Further, the required functions of recent storage devices have differed from conventional storage devices. Conventionally, storage devices were required to have data copy (volume copy, snapshot) functions and page-granularity data control (Thin Provisioning, data location control in tiers of storage media) functions. However, along with the enhancement in functions, the storage devices are now required to implement data computation (such as hash value calculation for data de-duplication, calculation for data compression, data search etc.) within the storage system and to reduce the actual amount of capacity or reduce the offload of host computation.

However, costs are increased by designing a large-scale storage device having a highly-functional dedicated processing engine to meet these demands. To overcome this problem, a plurality of inexpensive storage devices are arranged in a row to form the system, but in such arrangement, it is important to bring out performances of mutual storage devices and to distribute the load of data copy and data calculation processes among the plurality of storage devices.

It is even more preferable to suppress the management load of an administrator accompanying the change of settings of the hosts and network or the migration of existing volumes among storage devices, or to clear away the restrictions or dependent relationship of storage devices related to calculation resources which becomes the bottleneck of the performance.

Further, one example of a system in which load distribution is executed is a cluster file system in which a plurality of hosts issue IO requests to a logical volume. The virtual machine of a host is migrated to a different host so as to distribute the load applied on the host.

Another method for distributing the load of disk IO is a method adopting a RAID (Redundant Array of Independent Disks) structure in which data is distributed and stored in a plurality of HDDs (Hard Disk Drives). Another possible method relates to uniting a plurality of HDDs or a plurality of physical volumes provided by the storage devices as a logical volume via logical volume manager (LVM) mounted in a file system of the OS (Operation System). This method enables to perform load distribution astride a plurality of disk array devices.

In addition, according to a prior art technique, it is possible to set up a plurality of disk array devices so that they are recognized as a storage device via a storage virtualization device or a virtualization system of a disk array device. Furthermore, performance optimization within the storage devices or the virtualization system is enabled via tier management in which data is migrated to a volume having an appropriate performance.

Moreover, a load distribution method using a plurality of controllers is taught as prior art technique in the following patent literatures.

CITATION LIST

Patent Literature

PTL 1: US Patent Application Publication No. 2010/0153767
PTL 2: US Patent Application Publication No. 2009/0019157
PTL 3: U.S. Pat. No. 7,127,577

SUMMARY OF INVENTION

Technical Problem

The above-mentioned prior arts had drawbacks in which management load was increased related to various settings of equipments in a plurality of disk array devices and computer system.

In order to show a plurality of volumes astride systems as a logical volume via the LVM of the host OS, it is necessary to suspend the operation temporarily to set up the LVM. Further, in order to improve the performance, the administrator must create volumes and to migrate data among storage devices. In other words, the administrator must manage a plurality of separated storage devices, according to which the management of the correspondence of volumes of storages and a SAN (Storage Area Network) or OS becomes complex.

In a cluster storage taught in patent literature 1, there is no consideration on a Host Group setting associating volumes with host ports and target ports that must be set up for each physical storage device, or a LUN Masking setting.

In addition, when a volume is created in a cluster storage to realize load distribution of volumes in a SAN coupled system, the SAN administrator must perform Zone settings of the SAN in advance by comprehending in advance which volume is to be associated with a certain target port of a certain storage controller to perform load distribution. In order to create a storage device, setting of the SAN is required in association with ports astride a plurality of storage device.

When setting up the cluster storage device, the SAN administrator must set up the Zoning by consulting with virtual machine operation administrators and storage administrators regarding which volume should be associated with a certain target port, which host accesses a certain volume, and which storage target port must be provided with an access permission of a host port, so the management load of setting the Zoning of the SAN in a cluster storage device is increased.

A cluster storage device taught in patent literature 2 may also be provided with an access control (ACL: Access Control List) similar to an IP network. Recently, an environment has become popular in which a large number of virtual machines including a plurality of tenants are operated, and similar to the FC SAN Zoning, the change of access control is required also in an IP SAN configuration from the viewpoint of security.

The storage system taught in patent literature 3 considers the operation of storage device functions astride a plurality of storage device belonging to a representative storage device capable of transmitting and receiving IO requests to and from the host. However, none of the literatures consider the operation of storage device functions where a plurality of storage devices astride a plurality of storage devices are each capable of sending and receiving IO requests respectively.

Solution to Problem

In order to solve the problems mentioned above, the present invention provides a means for virtualizing a logical volume as a distributed virtual volume via a plurality of storage devices and to perform load distribution of the IO from the host.

The present invention also provides a means for performing necessary settings of each physical storage device and settings of a network for providing access permission to each physical storage device with the host in the setting of distributed virtual volumes astride a plurality of storage devices.

The present invention also provides a means for constituting distributed virtual volumes among storage devices without affecting the operations of the storage device functions.

Advantageous Effects of Invention

According to the present invention, it becomes possible to provide a large-scale computer system with hosts in which the performance of storage devices is enhanced and load distribution is performed in which the performance of storage devices do not become bottle necks.

According further to the present invention, the storage administrator adds a storage device, provides physical wiring thereto and includes the same in the cluster storage without having to consult with host administrators and network administrators, so that a logical volume having insufficient performance can have data distributed and arranged in a plurality of storage devices, according to which the performance of the logical volume itself can be enhance and the management work can be cut down.

Furthermore, the performance of the storage device may be deteriorated due to the programs operated within the storage device, calculation related to data processing (copy function or snapshot function of logical volume, de-duplication, compression, encryption, data search and the like) or data copy processing. In response thereto, by distributing volumes in a plurality of storage devices and activating the program in distributed manner in the respective storage devices, it becomes possible to distribute the load of performance of the programs within storage devices operated within a volume.

BRIEF DESCRIPTION OF DRAWINGS

FIG. 12A is a volume type table.
FIG. 12B is a table having extracted the configuration of the distributed virtual volume in FIG. 12A.
FIG. 12C is a function table managing the functions of the storage device for each volume.
FIG. 13A is a table showing the information related to host groups.
FIG. 13B is an attribute table of host groups.
FIG. 14A is a table illustrating the information of Peer Zone settings of target ports of the storage device and host.
FIG. 14B is a table showing a communication path/peer zone information.
FIG. 15A is a table showing one example of a TPG (Target Port Group) information of the storage device.
FIG. 15B is a table showing one example of Referral information of the storage device.
FIG. 16A is a table showing one example of TPG information of the storage device.
FIG. 16B is a table showing one example of Referral information of the storage device.
FIG. 18A is a table showing one example of TPG information of the host.
FIG. 18B is a table showing one example of Referral information of the host.
FIG. 19A is a table showing a Referral Hit/Miss information of the host.
FIG. 19B is a table showing a name server query information of the host.
FIG. 21A is a table showing a name server database information of the SAN switch.
FIG. 21B is a table showing a zone database information of the SAN switch.
FIG. 22 is a table showing an active zone information of the SAN switch.
FIG. 30 is a block diagram illustrating one example of configuration of the virtual storage device and management information.
FIG. 31 is a block diagram illustrating one example of configuration of the virtual storage device and management information.
FIG. 33 is a block diagram illustrating one example of configuration of the virtual storage device and management information.

FIG. 41 is a table showing one example of a TPG information stored in the host.

DESCRIPTION OF EMBODIMENTS

Now, the preferred embodiments of the present invention will be described with reference to the drawings.

Figure 1:
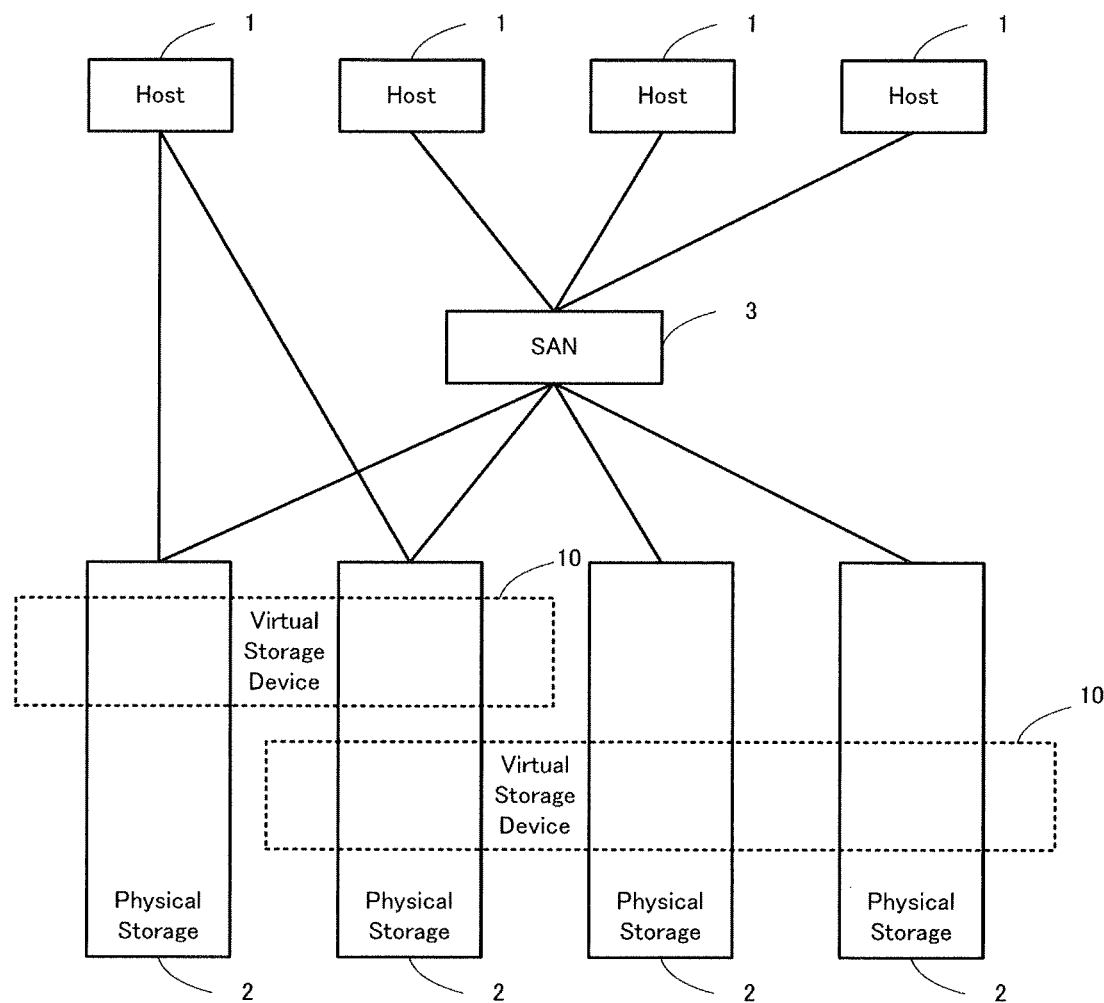
FIG. 1 is a block diagram illustrating a whole computer system.

FIG. 1 is a view showing an overall configuration of a computer system according to the present invention. One or more hosts 1 and two or more physical storage devices 2 are coupled to a storage area network (SAN) 3. A virtual storage device 10 is composed astride two or more physical storage devices 2.

In the present embodiment, the storage network 3 does not adopt a redundant configuration. However, it is possible to adopt a redundant network configuration having removed a point of failure. In a network configuration having redundancy, recovery processing becomes possible even if failure occurs during a path switching control accompanying migration of volume among storage devices. This processing will be described in detail later.

According to another embodiment in which a storage network 3 is not intervened, a similar virtual storage device 10 can be composed by directly coupling the host 1 with two or more physical storage devices 2. Such arrangement will be described in detail later.

Figure 2:
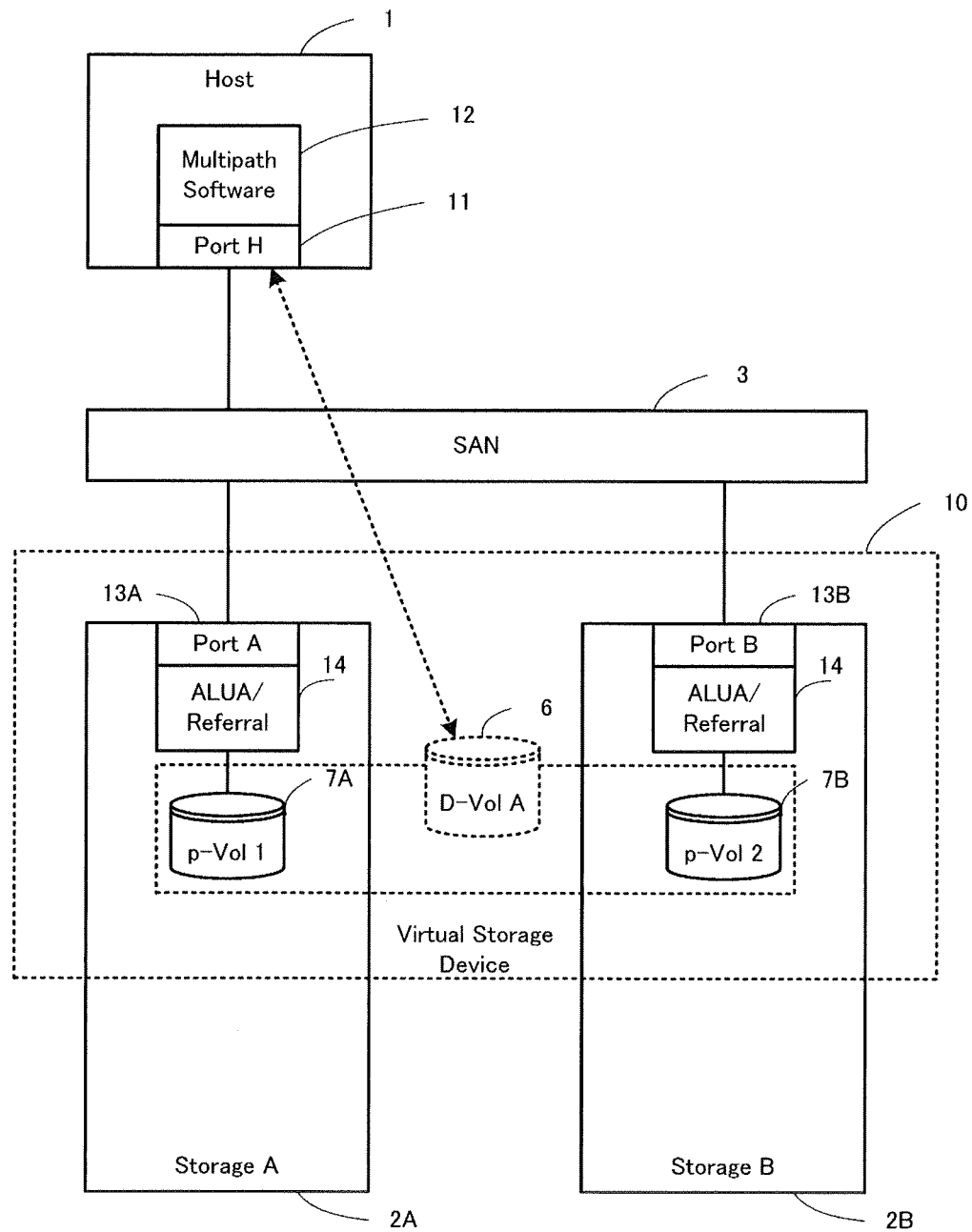
FIG. 2 is a block diagram illustrating one example of a configuration of a virtual storage device.

FIG. 2 illustrates a system configuration of a virtual storage device 10 formed astride a storage device 2A and a storage device 2B. The host has one or more ports 11. The host has a multipath software 12 capable of issuing an IO with respect to a plurality of logical paths. The multipath software of the host switches the path of the IO issue destination in granularity of UDS (User Data Segment) which is a granularity of the LBA (Logical Block Address) range using SCSI Referrals which is an extended function of ALUA based on SBC-3 (SCSI Block Command set version 3) and SPC-4 (SCSI Primary Command set version 4) standards.

The present embodiment assumes that a distributed virtual volume (D-Volume) 6 has already been created, and that a setting procedure for enabling the host to correctly access the distributed virtual volume 6 of the storage via the SAN has already been performed.

The distributed virtual volume 6 is composed as a complete volume by handling two or more partial volumes (P-Volume) 7A and 7B as a volume via referral information. A partial volume 7 is an incomplete volume that stores data of a plurality of UDS out of all the UDS of the distributed virtual volume 6, but a partial volume does not store all the data within the volume.

Each partial volume stores information for operating a storage function having been taken over from the distributed virtual volume. The distributed virtual volume formed astride storage devices is a volume for operating the storage function, similar to a volume within a normal physical storage device.

The procedure for operating the functions of the storage device via the distributed virtual volume will be described in detail with respect to each storage function (such as a volume copy, a snapshot, a remote copy, a volume data compression, a volume data de-duplication elimination, a tier arrangement control and a capacity allocation).

The multipath software 12 of the host may be realized through a switching scheme software unique to the storage system vender so as to perform control that is out of the standard range. The present embodiment illustrates a case where control is performed in conformity with the standards.

A procedure for the storage administrator to create a distributed virtual volume 6 and a procedure for setting up a Host Group information that must be set for the ports 13A and 13B of each physical storage device so as to enable the ports to be coupled to the host will be described in detail later.

The procedure for creating Zoning in connection with the creation of the distributed virtual volume 6 for setting a Zoning ACL of the SAN by the storage device that does not require linkage accompanying the change of setting to the SAN administrator upon creating a distributed virtual volume 6 will be described in detail later.

According to another embodiment of the present invention adopting an arrangement in which the host and each storage devices are directly coupled and the communication paths are directly coupled to each storage device, the procedure for automating the steps for setting up the distributed virtual volume 6 with respect to each physical storage device will be described in detail later.

Figure 3:
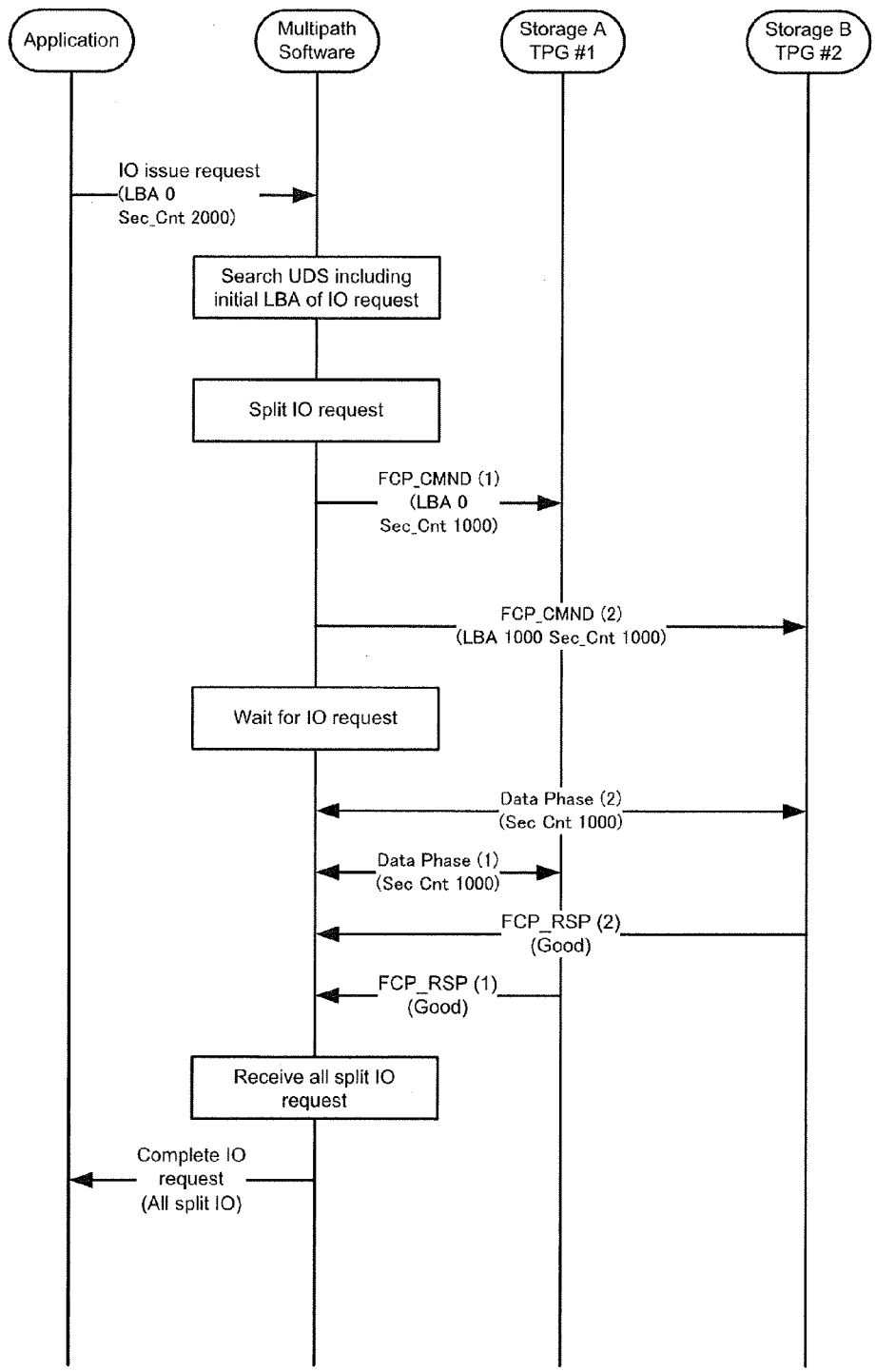
FIG. 3 is a ladder chart illustrating an IO procedure of distributed virtual volumes.

FIG. 3 is a ladder chart illustrating a procedure for the host to issue an IO to the distributed virtual volume 6. In the present embodiment, for easier description, a case is illustrated where a IO request (transfer length of 2000 sectors from an LBA start address 0) is received. In the example, it is assumed that a distributed virtual volume is composed in which TPG #1 of storage device A is associated with LBA 0 through 999, and TPG #2 of storage device B is associated with LBA 1000 through 1999.

At first, the host IO logs into a SAN switch. Next, the multipath software 12 of the host acquires ALUA information when it recognizes a distributed virtual volume 6, and stores the same in a storage area of the host. The host acquires from the storage device a Referral information of the distributed virtual volume illustrating the port status of LBD (Logical Block Dependence) from the acquired ALUA information. The host stores the Referral information of the distributed virtual volume acquired from the physical storage device to a host memory.

On the other hand, the Referral information acquired from one of the physical storage devices is the Referral information of the whole distributed virtual volume, so it is not necessary to acquire the similar Referral information via the port of the other storage device.

Now, the ALUA information refers to a list stating a port corresponding to the recognized volume and port status pairs. If the port status of the ALUA information is LBD, it is necessary to refer to the Referral information. The Referral information is a list stating a plurality of accessible ports for each corresponding UDS, and the information is a sort information for the host to determine which storage device the IO should be sent to.

If the port status of the ALUA information is LBD, the host issues a Report Referral command which is a SCSI command to the relevant volume. The host acquires the Referral information via the Report Referral command, and stores the same in a storage area of the multipath software of the host.

Now, it is assumed that the Referral information must store the starting point and terminal point of LBA and port information of two systems, and a entry (UDS) requires 32 Bytes. It is assumed that the minimum particle size of UDS is managed as a segment of 4 Mega Bytes (4 MB). In that case, the Referral information required for a distributed virtual volume of 1 Tera Bytes (1 TB) is 8 MB at maximum. This is a capacity capable of being stored in the multipath software of the host.

On the other hand, it is assumed that a minimum particle size of UDS is managed as an extremely fine segment of 4 Kilo Bytes (4 KB). In that case, a Referral information required for a distributed virtual volume of 1 TB is 8 GB at maximum, which is an extremely large capacity with respect to the memory (a few dozen GB to approximately a hundred GB) that a current host has, and which is not storable. In the present case, the capacity exceeds a maximum capacity of the Referral information that can be managed by the host, so that it is necessary to adopt a method for limiting the information to a highly accessed UDS, for example, and to cut down the Referral information to be notified to the host. In that case, since the host has only a portion of the complete Referral information stored in the storage, the host must provide an independent management information (Referral Hit/Miss information) for correcting erroneous determination of port selection using the Referral information with respect to a highly accessed UDS.

However, regarding the Referral information, if a same port information is denoted in a set of same ports in the entry of a nearby UDS of a continuous LBA, it is possible to integrate the nearby UDS entries to a information to cut down the amount of information.

In the embodiment of FIG. 3, it is assumed that all the Referral information has a sufficiently small capacity that can be stored in the memory of the host. The procedure for cutting down the Referral information notified to the host or the procedure for managing the Hit/Miss determination for correcting the errors of the Referral information that the host acquires from the storage device will be described in detail later.

Now, the outline of a method for issuing a host IO will be described below. A multipath software of the host receives an IO request from the application of the host. The multipath software of the host refers to the Referral information stored in the memory of the host and searches an UDS including the relevant LBA.

Now, if one IO request from the application is an IO request astride two or more UDS, the request is split into IO requests for each UDS (IO Split). Based on one or more TPG (Target Port Group) information stored in the corresponding UDS entry of the Referral information, one port group number of the IO destination is selected.

The multipath software of the host converts the port group number selected as IO destination using an ALUA information stored in the host memory to an RTPI (Relative Target Port Identifier) and WWPN (World Wide Port Name) of the port, and selects a given target port of the physical storage device.

Thereafter, the multipath software of the host uses a driver for controlling the port (such as a FC initiator control driver in the case of an FC port) to issue an IO request having the IO split via the aforementioned step to a target port of an RTPI or WWPN selected via the aforementioned step.

Upon receiving an IO request having been subjected to IO split from the host, the storage device executes the IO request regarding the real data included in the partial volume 7. Now, with the aim to cut down the capacity of the Referral information, a procedure of the IO request processing of the case where the Referral information sent to the host and the Referral information actually managed by the storage do not correspond and when the multipath software of the host issues the IO request subjected to IO split to a target port of the storage device not associated with the same will be described in detail later.

When the IO request from the host having been subjected to IO split is completed correctly by the storage device, the host receives from the storage device a complete response of the IO request subjected to IO split. Upon receiving all complete responses of two or more IO requests subjected to IO split, the multipath software of the host responds a normal complete response to the IO request from the application. The above-described procedure relates to the IO control in a normal system according to the present invention.

Figure 4:
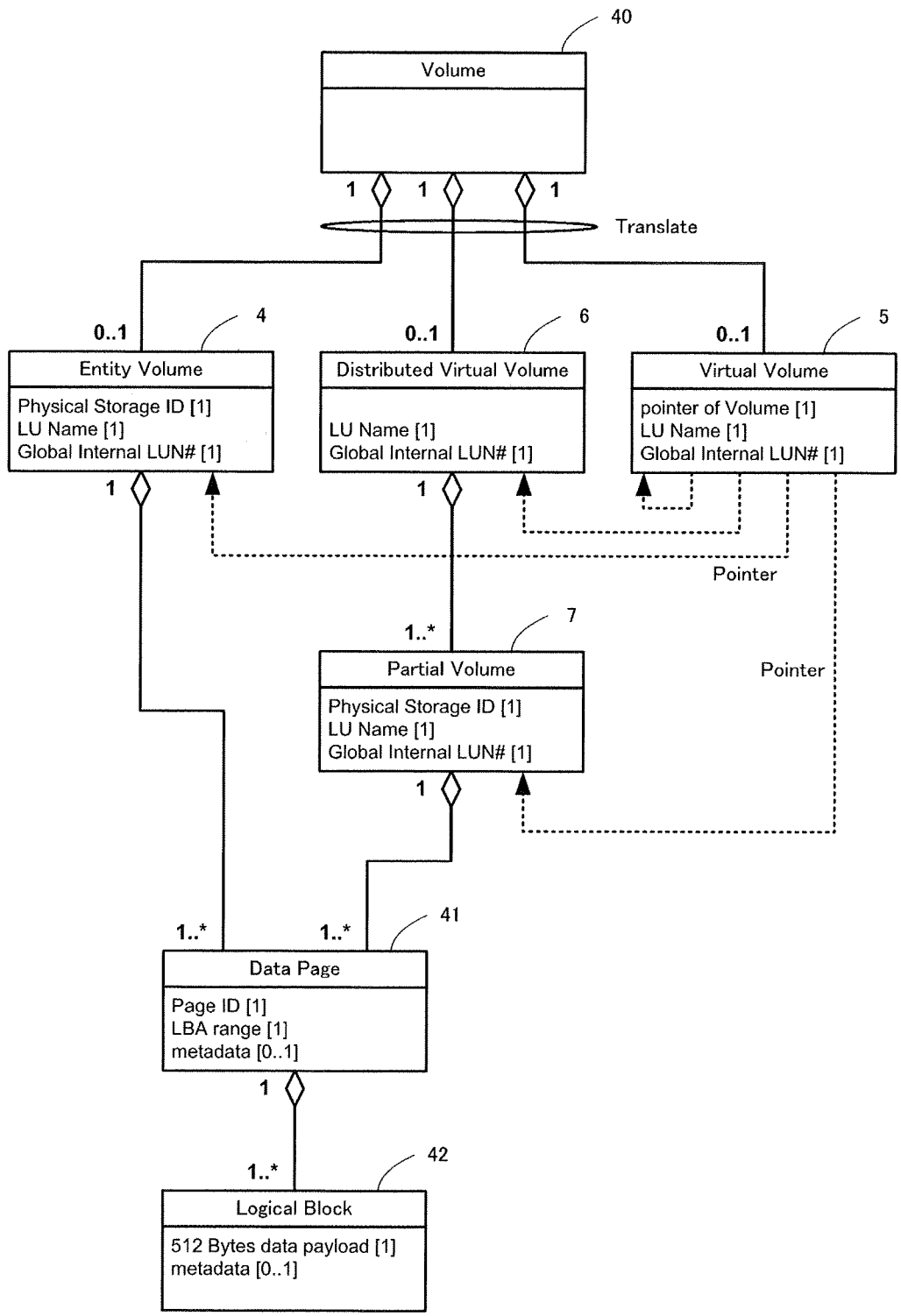
FIG. 4 is a diagram illustrating various volume types and the relationship thereof.

FIG. 4 is a drawing illustrating the types of volumes capable of being created by the storage device 2 and the relationship thereof. The storage device has a plurality of volumes 40. The volume 40 has one attribute selected from three volume attributes, a real volume 4, a distributed virtual volume 6 and a virtual volume 5, as a volume that can be accessed from the host. The partial volume 7 cannot be directly accessed from the host. The partial volume 7 is a special type of volume managed via the virtual storage device.

A real volume 4 has one or more data pages 41 and stores data as real data. The real volume 4 has an LU Name as a volume identifier required for the host to recognize the volume. The real volume 4 includes a global internal LUN (LU Number) as a unique LU identification number for internal management of the virtual storage device.

A distributed virtual volume 6 is a virtual volume for distributing and arranging one or more partial volumes 7 astride one or more physical storage devices. The real data that the distributed virtual volume has is stored in the partial volume 7. The distributed virtual volume 6 stores a distributed virtual volume information that associates the partial volumes 7 and the identifier of the storage device so as to store the information on which storage device corresponds to the partial volumes. Details thereof will be described later.

A virtual volume 5 is a volume that does not store data and that does not have a data page 41. The virtual volume can mount the real volume 4, the distributed virtual volume 6, the other virtual volume 5 or the partial volume 7 within the storage device or among storage devices.

A partial volume 7 has one or more data pages 41 and stores data as real data. The partial volume 7 has a unique LUN (LU Number) among a plurality of storage devices, but it does not need an LU Name. The reason for this is because the distributed virtual volume 6 has an identifier capable of binding one or more partial volumes 7 and responding as representative to the host. In other words, the partial volume 7 is a volume that is hidden within the virtual storage device and that cannot be directly accessed from the host.

The data page 41 is split into granularity that can be easily handled by the program operating within the storage device. The program operating within the storage device can use, for example, Thin Provisioning granularity, capacity reduction (de-duplication, compression) granularity, snapshot copy granularity, and data migration granularity for tier control for migration within the device. Depending on the type of the program, the number of logical blocks 42 included in a page can differ. Further, the size can be different or the same as the size of the User Data Segment of the SCSI Referral described with reference to FIGS. 14A and 14B. The reason for this is because a page granularity that is easily handled as a program within the storage device is not always equal to the granularity of a User Data Segment for determining the IO path in storage device granularity. The data page 41 includes a page identifier, a start offset of a continuous LBA range, and a metadata mapped to its own data page. The details of the page information will be described later with reference to FIG. 41.

The logical block 42 stores real data of 512 Bytes, which is a typical SCSI block size, for example. Further, the logical block has metadata.

Figure 5:
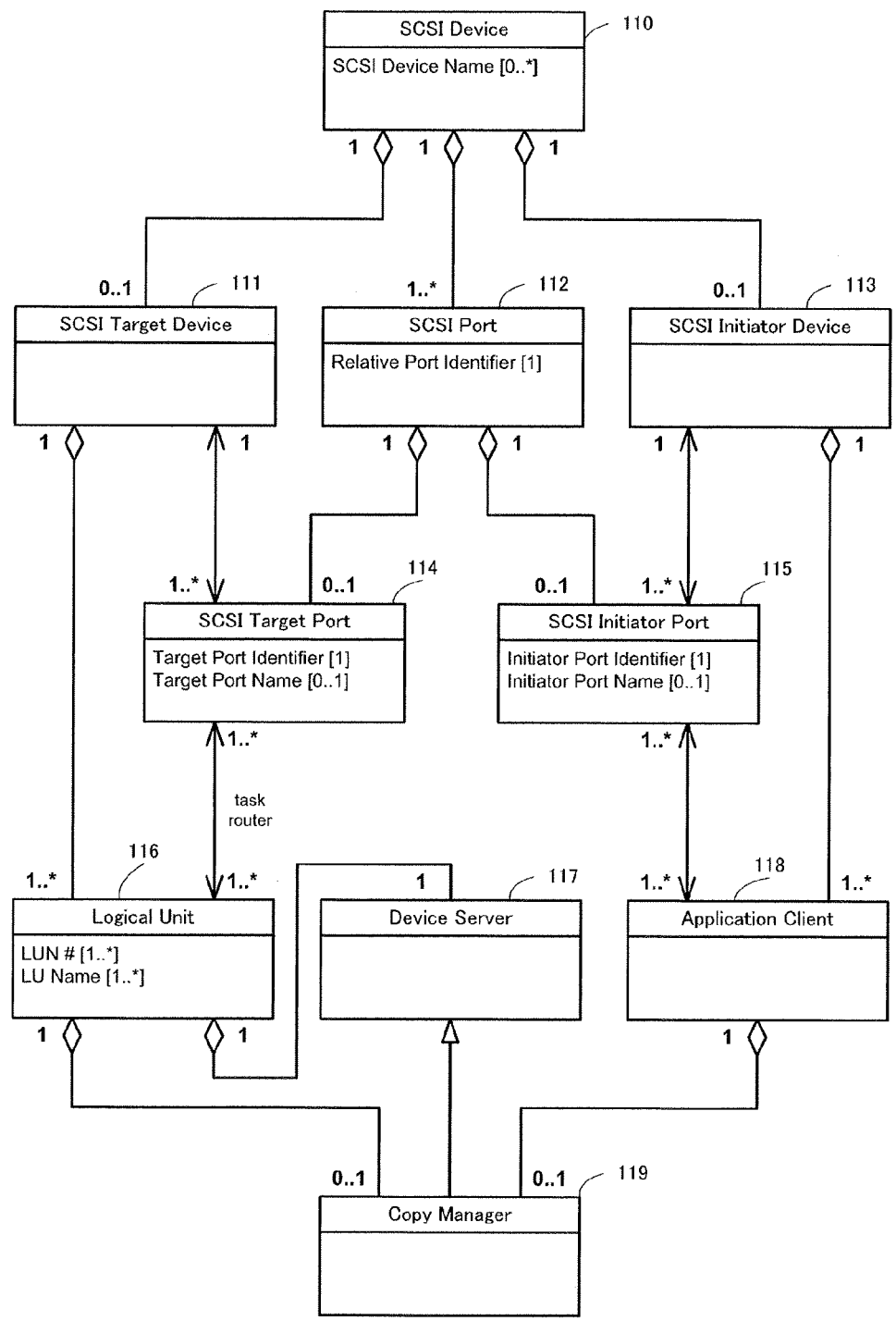
FIG. 5 is a diagram showing components constituting the storage device and the relationship thereof.
Figure 6:
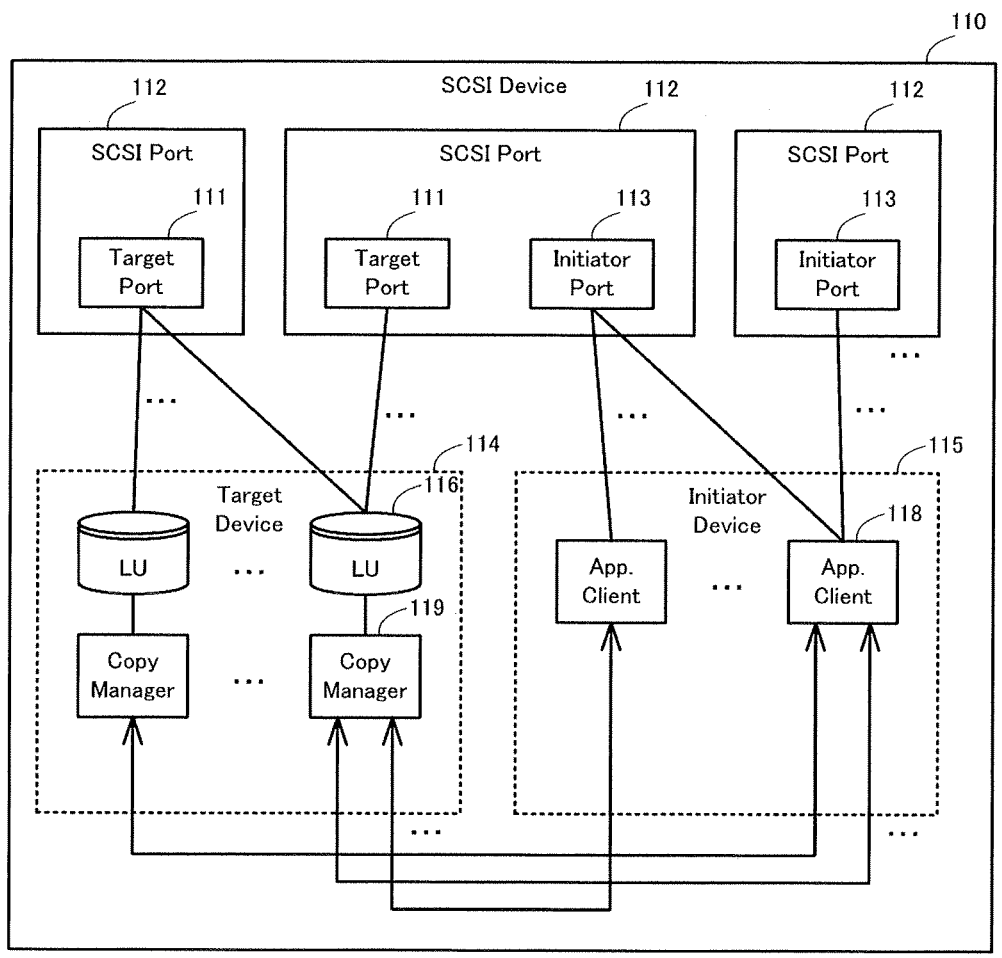
FIG. 6 is a block diagram illustrating an example of components.
Figure 7:
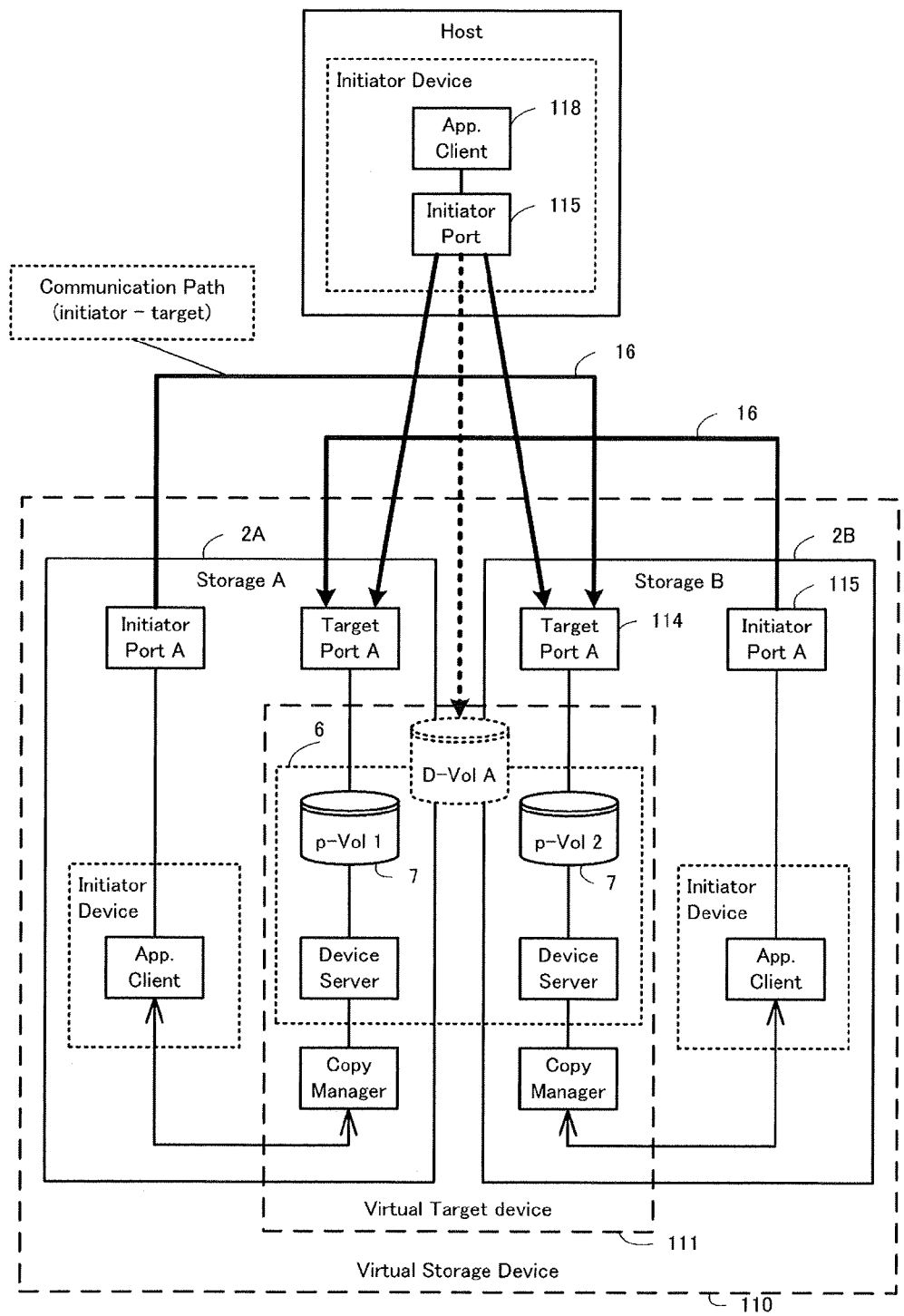
FIG. 7 is a block diagram illustrating an example of arrangement of distributed virtual volumes.

FIG. 5 is a drawing showing the components of a storage device and the relationship thereof. One example is illustrated in FIGS. 6 and 7, but the present invention is not restricted to the configuration of FIGS. 6 and 7 and can be composed within the range illustrated in FIG. 5.

A SCSI Device 110 includes one or more SCSI Ports 112. Further, a SCSI Device 110 has either or both a SCSI Target Device 111 and/or a SCSI Initiator Device 113.

In the present embodiment, upon migrating a volume to another storage device, it is necessary to migrate the data of a volume via a copy manager 119 mentioned later. Therefore, a volume (Logical Unit) has the attributes of both initiator and target. A SCSI Port 112 has an attribute of either or both a SCSI Target Port 114 and/or a SCSI Initiator Port 115.

If a SCSI Device has both the SCSI Target Device 111 and the SCSI Initiator Device 113, a SCSI Port 112 having both attributes of the SCSI Target Port 114 and the SCSI Initiator Port 115 exists, or a plurality of SCSI Ports 112 each has the attribute of the SCSI Target Port 114 or the attribute of the SCSI Initiator Port 115.

A SCSI Target Device 111 has one or more logical units 116. A SCSI Initiator Device 113 has one or more application clients 118. A SCSI Target Device 111 has a plurality of SCSI Target Ports. Further, a SCSI Target Port belongs to a SCSI Target Device. Similarly, a SCSI Initiator Device 113 has a plurality of SCSI Initiator Ports. Further, a SCSI Initiator Port belongs to a SCSI Initiator Device.

A SCSI Target Port is associated with a plurality of logical units. This means that a SCSI Target Port is capable of communicating with a plurality of volumes. Further, a logical unit can be accessed from a plurality of SCSI Target Ports. This means that a multipath structure is adopted in which a plurality of ports can access a volume.

A SCSI Initiator Port is associated with a plurality of application clients. This shows that a SCSI Initiator Port issues a command from a plurality of application clients. Further, an application client can be accessed from a plurality of SCSI Initiator Ports. This means that a multipath structure is adopted in which a plurality of ports can access an application client.

A logical unit has a device server 117. The command issued from an application client 118 is sent via a SCSI Initiator Port 115 to a SCSI Target Port 114, which is then routed via a task router (not shown in the drawing) to a logical unit 116. The device server 117 processes the received command.

A copy manager 119 which constitutes a portion of the device server 117 can send data of the logical unit 116 via an application 118 to another SCSI Device 110 and receive data therefrom.

Although not shown in the drawing, when a plurality of SCSI Devices 110 exist, a SCSI Port 112 can be associated with two or more SCSI Devices 110. For example, if there are two SCSI Devices 110, two different SCSI Ports can be assigned to each SCSI Device or a SCSI Port can be shared by the two SCSI Devices. This is described in detail later in the description of a Host Group information.

A SCSI Port 112 has a Relative Port ID which is an identifier of itself. This identifier is used as an identifier of ALUA described with reference to FIGS. 15A and 16A. The Relative Port ID must be unique within the SCSI Device since it is used for a multipath port identification. However, in the exterior of the SCSI Device where the namespace differs, the same Relative Port ID can be used.

The SCSI Target Port and the SCSI Initiator Port must each have a port ID. Further, the SCSI Target Port and the SCSI Initiator Port must each have a port name identifier. The port ID and the port name identifier must be distinguished with other ports, and must be unique.

In the case of a Fiber Channel protocol, the port ID corresponds to a 3 Bytes N_Port ID (Node Port Identification) assigned from a name server of a fabric upon logging into a fabric. The port name identifier corresponds to an 8 Bytes WWPN (World Wide Port Name) of the N_Port (Node Port). In the case of another communication protocol, the relationship between the port ID and the port name is changed, but a similar arrangement is enabled when it is replaced with a corresponding relationship via the SCSI protocol.

The logical unit 116 has one or more logical unit numbers as identifiers thereof and one or more logical unit names. These identifiers must be distinguished from other volumes and must be unique. If a SCSI Device formed astride a plurality of storages is defined as a virtual SCSI Device, the identifiers must be unique within a same namespace among a plurality of storage devices. In order to realize the same, the identifier must be taken over within the same namespace among storage devices. The logical unit 116 refers to the volume 40 illustrated in FIG. 4.

FIG. 6 shows one example of the components illustrated in FIG. 5. The SCSI Port of FIG. 6 can have only one of or both the attributes of a Target Port and/or an initiator port. The Target Port is associated with one or more LUs. An LU is associated with a plurality of Target Ports, by which a multipath configuration is realized. An LU has a copy manager and is associated with an application client of one or more initiator devices. The LU copy manager outputs an instruction to the initiator device and enables data to be copied or migrated between the initiator port and LUs of other Target Ports.

FIG. 7 illustrates a mounting example of a copy manager when a distributed virtual volume is arranged in a plurality of storage devices. The target port of each storage device is associated with a partial volume 7 of the distributed virtual volume. The copy manager of each storage device is capable of communicating with a target port of both storage devices via an initiator device.

Now, the storage device defines a new partial volume 7, and by ensuring a data storage destination, the real data of the partial volume can be migrated to different storages. Further, the data of a different storage can be migrated to the internal storage device. Thus, a remote copy function is realized in which a volume between storage devices is migrated to another storage device as mentioned in detail later.

Figure 8:
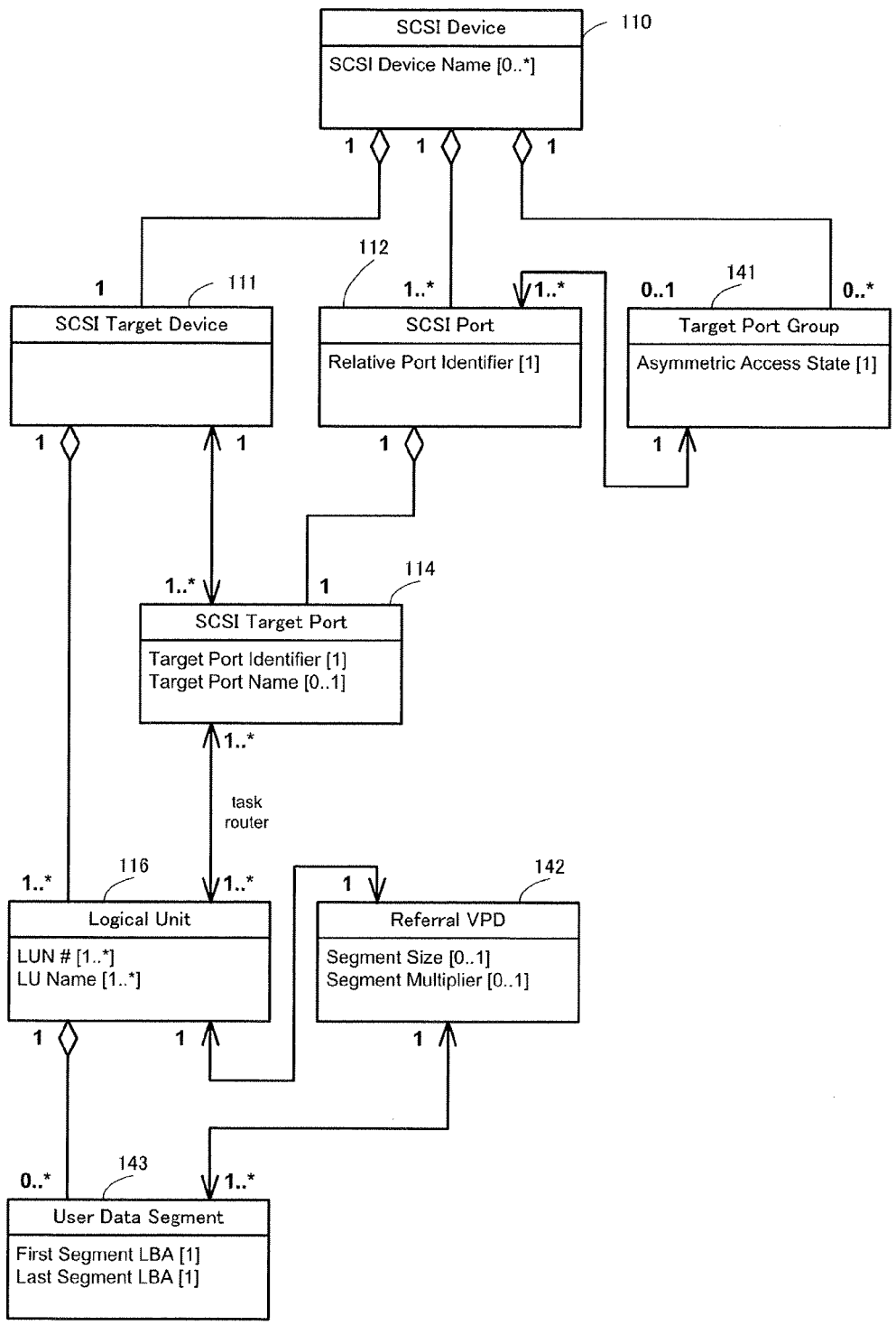
FIG. 8 is a diagram showing components constituting the storage device and the relationship thereof.

FIG. 8 is a partial view of FIG. 5, illustrating a relationship diagram having added the information related to ALUA and Referral of the Target Port. The portion of FIG. 5 related to the Initiator is omitted from the drawing. The SCSI Device 110 stores a number of zero or greater as the Target Port Group 141. A device that does not have even a Target Port Group 141 does not correspond to a multipath of ALUA standard, so according to the present embodiment, the device is set to include at least one or more Target Port Group s 141.

The Target Port Group 141 has a port status AAS (Asymmetric Access State). The AAS maintains the status of the TPG. The TPG has one or more SCSI Ports 112. The SCSI Port includes at least the attribute of a SCSI Target Port 114. A TPG 141 is associated with one or more SCSI Ports via a Relative Port ID. Therefore, when the AAS of the TPG 141 is varied, the status of all the SCSI Target Ports 114 associated with the TPG is changed.

The host issues a command to the logical unit 116. Typical commands issued by the host to acquire and set up information related to the multipath or recognition of the volume are a SCSI Report Target Port Group command which is a command for acquiring the AAS of the TPG, a SCSI Set Target Port Group command which is a command for setting the AAS, and a SCSI Inquiry command which is a command for acquiring the VPD (Vital Product Data) of the logical unit 116.

Figure 28:
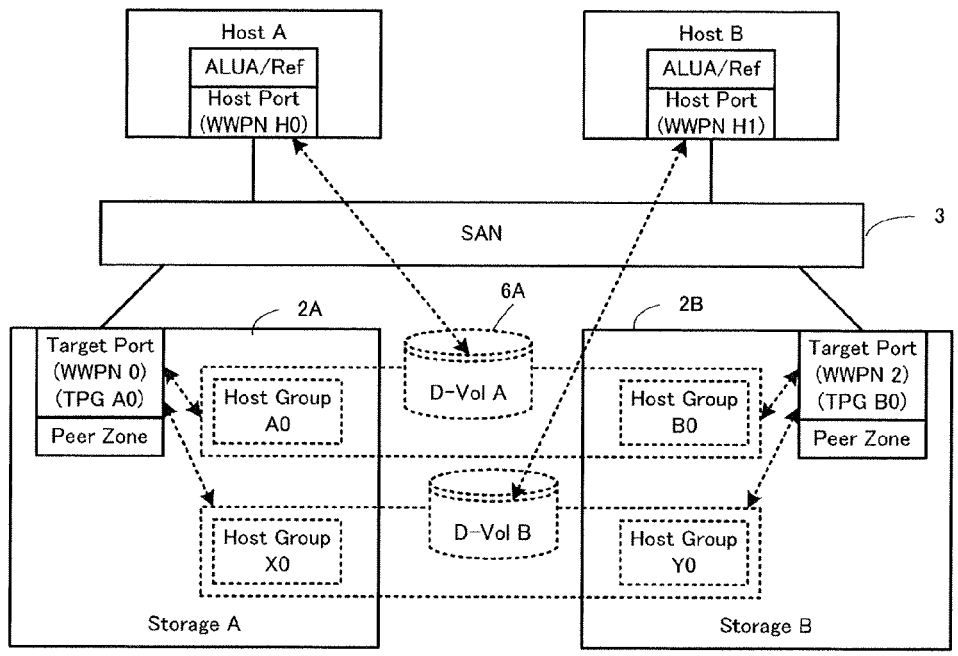
FIG. 28 is a block diagram illustrating one example of configuration of the virtual storage device and management information.

By virtualizing the SCSI Device and associating a SCSI Target Port with a plurality of SCSI Devices, it becomes possible to virtualize the namespace of the TPG. In other words, by separating the namespace of the SCSI Device via the Host Groups described in detail later, the AAS of the TPG which is the state of the SCSI Target Port can be changed for each LU. This arrangement is illustrated in FIG. 28.

If it corresponds to Referral, the Logical Unit 116 holds a Referral VPD information 142. The Referral VPD information 142 stores segment size and segment multiplier. When these values are set, the Referral stores the state of the TPG corresponding to a double number of the segment multiplier via an alignment set via segment size. If the segment multiplier is set to zero, the User Data Segment 143 can arbitrarily set the association between the segment information and the TPG information based on the description of the Referral descriptor according to the Report Referral command, and each UDS can have a segment size set arbitrarily. The details of these information will be described in detail later with reference to FIGS. 15B and 16B. A logical unit 116 has a plurality of User Data Segments 143. The boundaries of the segments 143 follow the information of the Referral descriptor.

Figure 9:
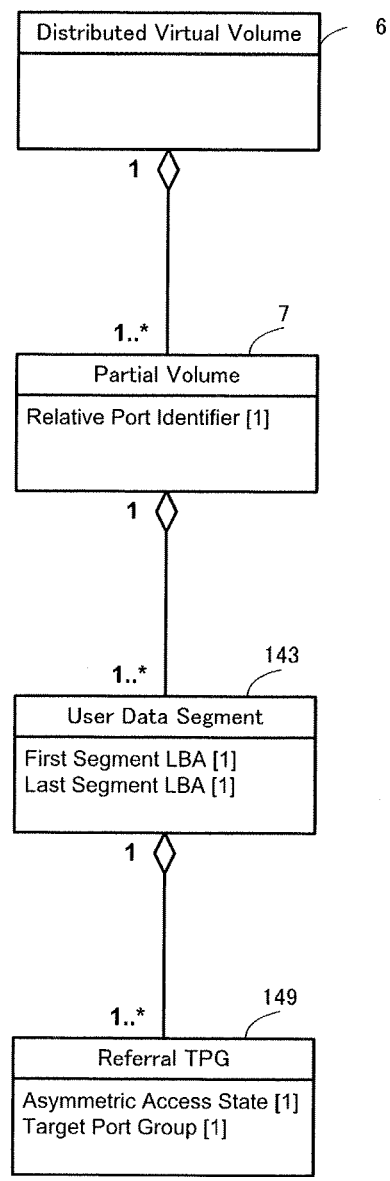
FIG. 9 is a diagram illustrating a configuration of a distributed virtual volume.

FIG. 9 is a drawing illustrating the structure of a distributed virtual volume (D-Volume) 6. The distributed virtual volume 6 includes one or more partial volumes 7. If the distributed virtual volume is defined to be formed astride a plurality of storage devices, the number of partial volumes corresponds to the number of storage devices. A storage device can have one or more partial volumes 7 constituting the distributed virtual volume 6. The partial volume 7 has one or more UDS 143. The UDS 143 has a first segment LBA and a last segment LBA. Further, the UDS 143 has one or more Referral TPG 149. A Referral TPG 149 has only one pair of AAS and TPG number. The port information for accessing the UDS 143 is selected according to the Referral TPG 149. The details of these information will be described later.

Through use of the ALUA, the host can search the port of a usable storage device, update the relationship of usable target ports for the host to access the LU and update the path information of the ALUA so as to enable communication with the storage device via an arbitrary usable target port. Further, when failure of the ALUA occurs with respect to the port, the storage device can replace the port with a usable substitute port and update the path information of the ALUA, so as to enable the ports to be replaced without having to update all Referral information. The details of this processing will be described later with reference to FIGS. 37 and 38.

Figure 10:
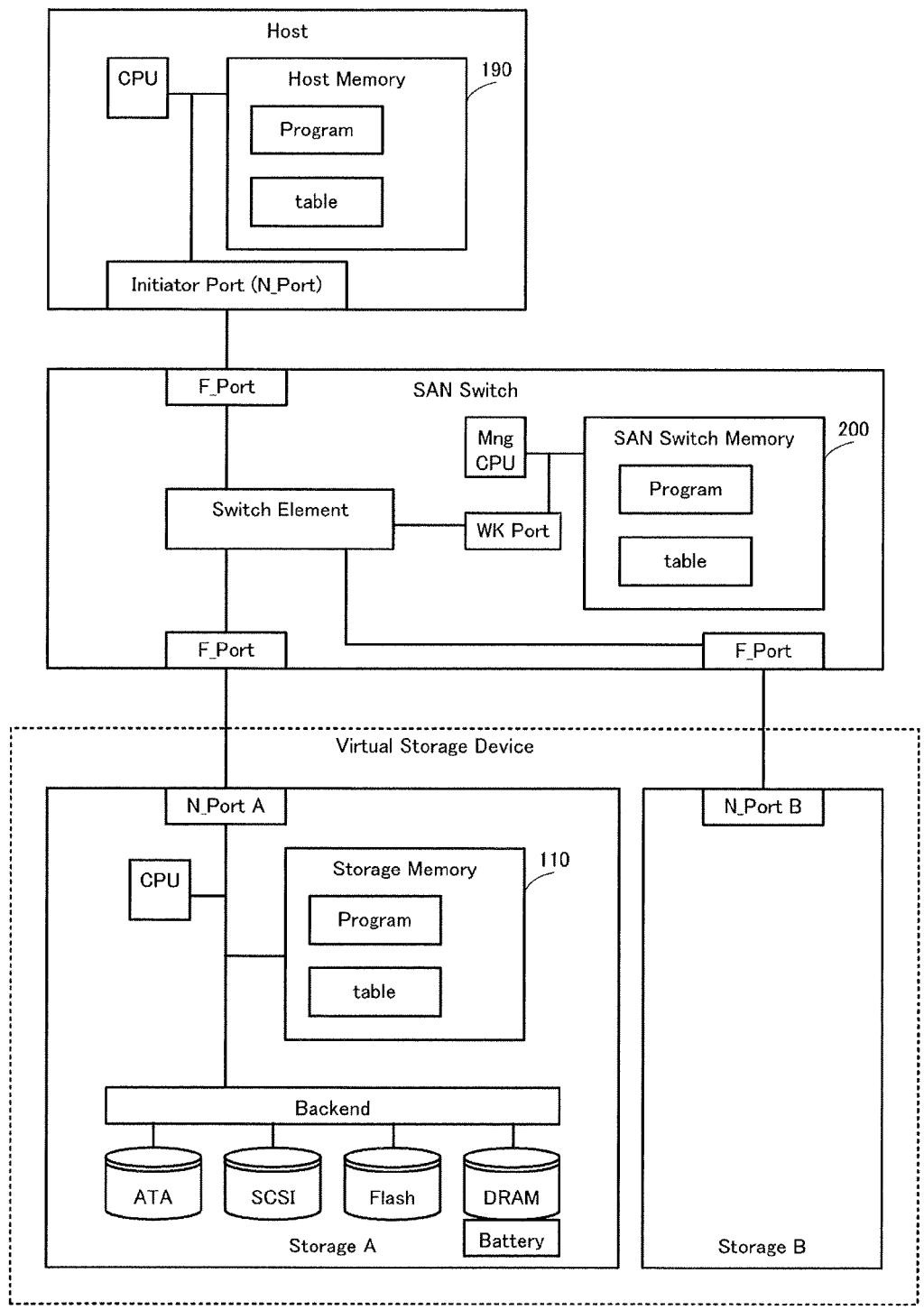
FIG. 10 is a block diagram illustrating an internal configuration of a system.

FIG. 10 is a view illustrating an internal configuration of the storage device according to the system configuration illustrated in FIG. 2. The host, switch and physical storage device illustrated in FIG. 10 each comprises an arrangement for performing processing as an information processing apparatus, such as a CPU, a memory unit and an input/output unit, and the processing performed by each unit is performed in linkage via the respective hardware.

Further, each processing can be formed as an integrated circuit or the like and realized via the respective hardware functioning as a processing unit thereof. The operation mainly performed by the storage device is executed by the CPU of the storage device functioning as a control unit based on a program developed in a memory and referring to the information stored in a memory and the like.

Figure 11:
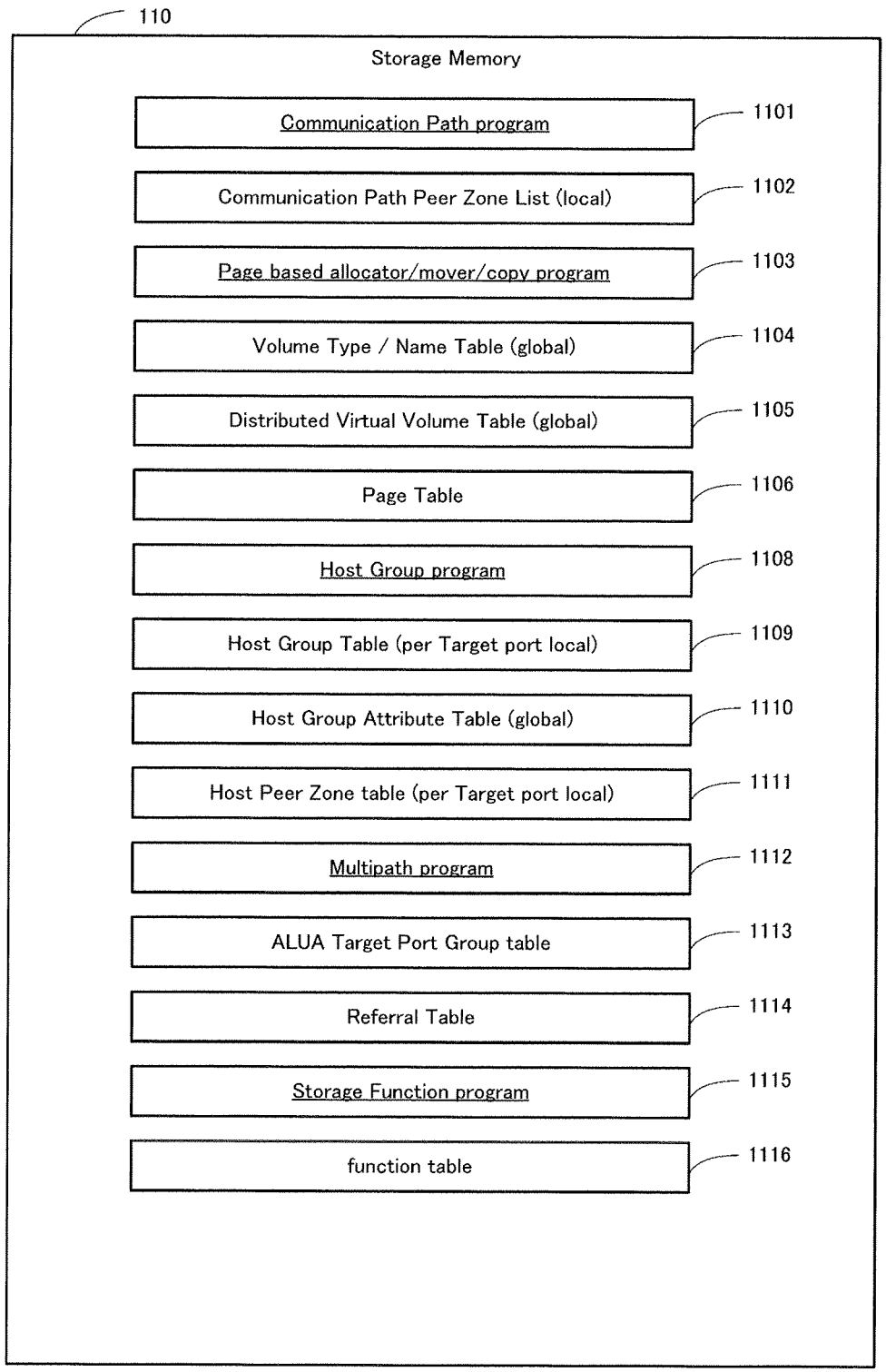
FIG. 11 is a block diagram illustrating information in a memory of the storage device.

FIG. 11 shows the details of a program and information that the physical storage device illustrated in FIG. 10 stores. These information are information and program stored in a memory 110 of the physical storage device illustrated in FIG. 10. The respective information and programs will be described in detail with reference to the subsequent drawings. The information in the present embodiment is described using the term table, but the form of structure of the data is not restricted thereto, and other forms of structure such as a list can be adopted.

FIG. 12A is a volume type table 1104. This table 1104 is information shared among all storage devices within the system configuration illustrated in FIG. 1. Information of a volume type table 1104 is shared for example using a communication path 16 illustrated in FIG. 7 or a communication path for a management terminal (such as an Ethernet (Registered Trademark)).

The volume type table 1104 stores fields including volume type, unique LU name, internal LU number which is a pointer to a volume, and a physical storage device number unique among storage devices with respect to each entry storing a unique internal LU number.

The internal LU number is a number for identifying a volume. According to the system configuration illustrated in FIG. 1, the internal LU number must be unique, but since the number is determined by shortening the LU Name, it is not required to be unique worldwide. For example, a unique internal LU number should be assigned within the data center in the system illustrated in FIG. 1 or within a virtual data center having connected a plurality of data centers together.

The volume type includes the entity volume 4, the distributed virtual volume 6, the virtual volume 5 and the partial volume 7 illustrated in FIG. 4.

The LU name is a unique identifier for identifying volumes. It can be a number assigned uniquely within the system configuration of FIG. 1 or can be a WWULN (World Wide Unique LU Name). However, as for the distributed virtual volume 6 and the virtual volume 5, the LU name of the internal LU number being the pointer to the volume is taken over. FIG. 12A shows such status using brackets.

The internal LU number as pointer to a volume is a number showing a pointer to a parent volume of the virtual volume 5 or the partial volume 7. For example, in FIG. 12A, the internal LU number 0002 is a virtual volume, and denotes a volume 0000 (LU name AAAA_AAAA). Similarly, the internal LU numbers 0003 and 0004 are partial volumes 7 constituting distributed virtual volume 6 having an internal LU number 0001. Each partial volume denotes the same LU name (BBBB_BBBB).

A physical storage device number is a serial number assigned during shipping, or the number can be a number assigned uniquely within the system configuration illustrated in FIG. 1. In the example of FIG. 12A, each partial volume is arranged in physical storages #0 and #1, so that a structure is adopted in which the partial volumes are arranged in distributed manner among physical storages.

FIG. 12B is a table 1105 extracting the structure of a distributed virtual volume according to FIG. 12A. The relationship between the distributed virtual volume and two partial volumes will not be explained here, since it is already explained in FIG. 12A. FIG. 12C shows a function information 1116 for managing the functions of the storage device per each volume. This information is stored in the virtual storage device and shared among respective physical storage devices.

Regarding the entry of the internal LU number, fields including a flag information showing activated functions within the storage device and an internal LU number of the distributed virtual volumes inheriting the functions are provided. Based on these information, the functions of the partial volume belonging to a distributed virtual volume is inherited from a distributed virtual volume to a partial volume. A page granularity allocation program 1103 for managing allocation of volumes and data allocated to the UDS is used to manage the information of FIGS. 12A through 12C.

Now, if the information on volumes of FIGS. 12A through 12C is stored in a management terminal, if failure occurs to the management terminal, it becomes possible to acquire basic information for accessing the volumes in addition to the creation of volumes. In distributed virtual volumes, a failure may occur by which the position of partial volumes may become unclear and access to data becomes impossible. These information are extremely important information, so that they should preferably be stored in a memory of a storage system having redundancy and with a high availability, such as a memory within a physical storage device.

Further, the management network (not shown in FIG. 1 or 10) of a virtual storage device management terminal for collectively managing a plurality of physical storage devices has a low communication reliability, since the network is not redundant, and in the case of the Ethernet (Registered Trademark), packet loss or congestion occurs. Therefore, considering the low reliability of the management network, it is preferable for the communication path to utilize a dedicated path or a path using a SAN.

FIG. 13A is a view illustrating a host group information 1109. A host group information refers to the information used for determining a target port of a storage device given permission to access a volume for each host. This information is managed via a host group program 1108. The host group information 1109 is created based on the information of FIGS. 12A through 12C, so it can be information stored in target port granularity of the physical storage device or can be information shared among the respective physical storage devices of the system illustrated in FIG. 1.

The host group information stores for each entry of the host group number a WWPN of the target port, a WWPN of the host port, a host LU number, an internal LU number and an attribute number. The host group number refers to an abbreviated number assigned for convenience of the program, which is a number used by the other tables for referring to the present table 1108. If the host group number is information stored in target port granularity in the physical storage device, a unique host group number within the target port is assigned. If the information is shared among all physical storage devices in the system illustrated in FIG. 1, the host group number should be unique within the whole system.

The target port WWPN is a WWPN of the target port of the physical storage device given the permission to access the relevant internal LU number. The host initiator port WWPN is a WWPN of the host port given the permission to access the relevant internal LU number.

The host LU number is an LU number seen from the host for mapping the internal LU number managed within the storage device to a different number with respect to a specific host given the access permission. If a multipath configuration or a distributed virtual volume configuration is adopted, it is necessary to assign the same number as the host LU number and to perform settings so that the same LU number is seen from the host.

The attribute number is an index number for referring to the table of FIG. 13B. The details of the meaning of attribute will be described with reference to FIG. 13B. In the case of a distributed virtual volume, the internal LU number corresponds to the partial volume. As for the host LU number, the same number must be seen from the host. The attribute of the distributed virtual volume is confirmed using the information of FIGS. 12A through 12C, and the host group program 1108 performs appropriate management thereof. As can be recognized from the following explanation, the distributed virtual volume must have consistency for all the settings of the target ports for accessing the partial volumes, but the settings thereof are performed consistently via a host group program. Thus, there is no need for the storage administrator to perform settings for each partial volume granularity. Regarding the settings of the host group, regardless of the existence of a SAN, by performing the settings of access control in granularity of host and volume pairs so as not to enable the host to see all the volumes when the volumes are created, it becomes possible to prevent erroneous accesses.

Figure 35:
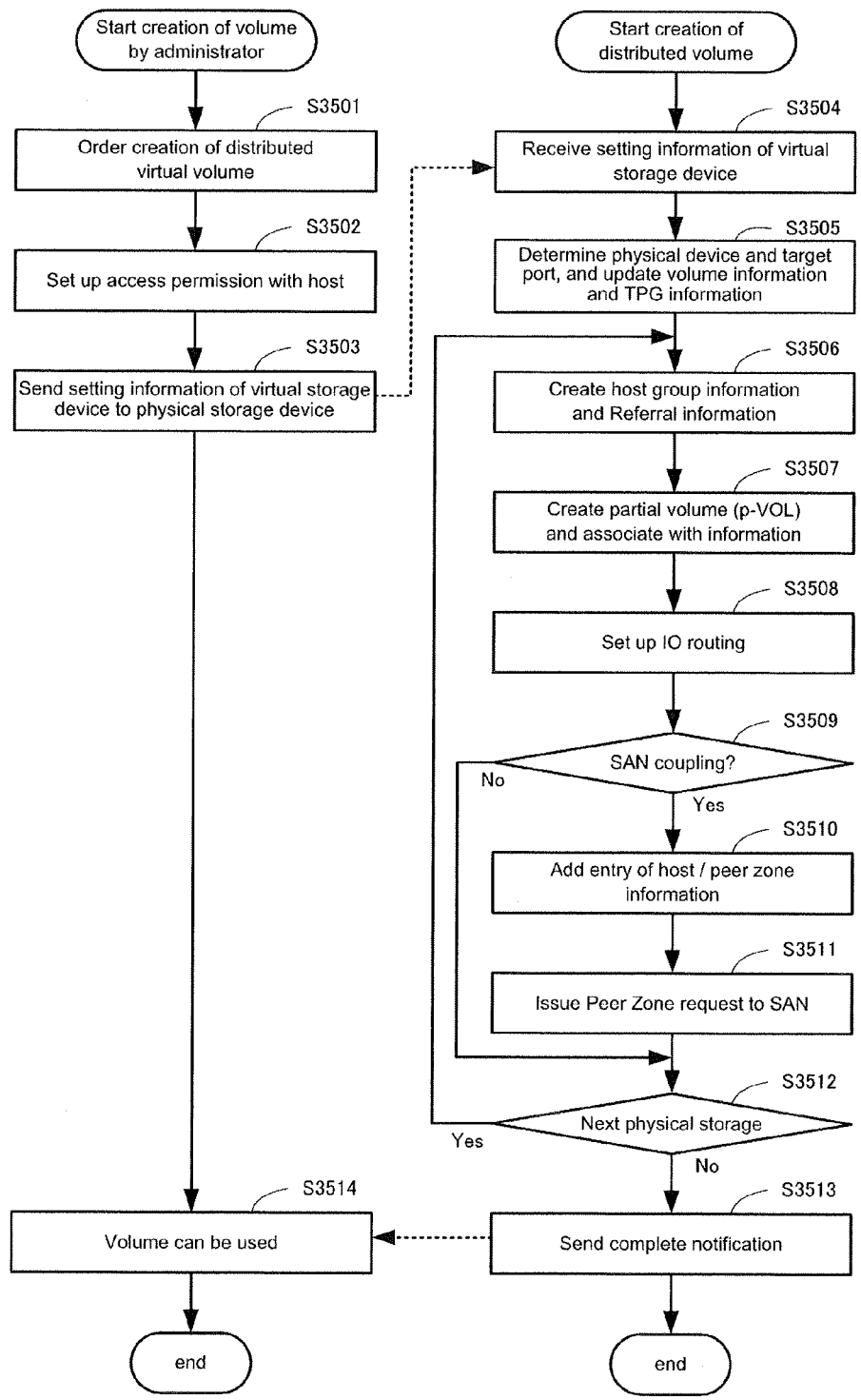
FIG. 35 is a flowchart illustrating the processing for creating a distributed virtual volume.

Similarly, as for the Zoning ACL of the SAN, a complex setting is required since the zoning must be set in partial volume granularity, that is, if the physical storage device is formed astride N number of volumes, zoning must be set with respect to N number of target ports. Further, if a redundant path (multipath) is formed between the physical storage devices and host systems such as according to the structure of a redundant SAN, the administrator of the storage device must set up 2×N paths when forming a distributed virtual volume, and the SAN administrator must set up a zoning of 2×N paths. Regarding the process of hiding the settings and simplifying the same in partial volume granularity during creation of volumes will be described in detail with respect to the processing of volume creation (FIG. 35).

FIG. 13B is a host group attribute table 1110. The host group attribute table 1110 is managed by the host group program and constitutes a set with the host group information 1109. The host group attribute table 1110 is information shared among physical storage devices in the system of FIG. 1 and used by the administrator managing the virtual storage device.

The host group attribute table 1110 is a selection table providing attributes, wherein the storage device administrator initially sets up the table as a setup template when setting a policy selected during creation of a volume, and the table can be reused when creating another volume. The host group attribute table 1110 has fields of a host OS (Operation System) type, a host multipath software type, an automatic data migration variation, and policy for selecting ports of the physical storage device or for switching ports, for each entry of attribute number.

Now, the respective fields of the host group attribute table 1110 will be described. The host OS type field is a field in which the storage administrator sets up and stores the OS vender and the OS name of the host, the version of the OS and so on. Based on this information, the multipath operation of the ALUA and Referral are controlled from the side of the storage device so as to absorb the difference of implementation of OS venders in a multipath of a standard ALUA. For example, it is possible that the behavior of the multipath software may vary according to the version of the OS.

The host multipath software type is a field for storing the standard version number of the host multipath software set by the storage administrator. According to the prior art standard, there is no rule regarding the operation for sorting the IO to target ports in UDS granularity by Referral. Therefore, in order to maintain the connection compatibility with the prior art hosts, the storage administrator sets up this type for connection with a specific old host. Choices such as the prior art standard SPC-3 ALUA, the SPC-4/SBC-3 Referral or future standards can be stored. As for future standards, it is possible to realize connection with a future host multipath software by updating the storage control program. The explanation of the automatic migration type field will be omitted in the present embodiment.

The policy field for selecting ports of the physical storage device or port switching is a field for setting a performance policy for suppressing influences with respect to other volumes when selecting a target port of the physical storage device. For example, the storage administrator sets up the policy so that a port requiring a high transaction performance is assigned to a port in an exclusive manner with other volumes requiring throughput performance, or so that a port is selected to prioritize the transaction performance.

FIG. 14A is information 1111 related to setting up a Peer Zone of hosts and target ports of storage devices. Upon creating distributed virtual volumes, the number of ports for setting a Zoning ACL of the SAN is proportional to the number of physical storage devices, so the information is used to set the zone of the SAN from each physical storage device regarding target ports belonging to distributed virtual volumes. A host/peer zone information 1111 is automatically generated for each target port by referring to the host group information, and is managed via a host group program 1108.

The peer zone information is information managed in target port granularity. The information is obtained by referring to the aforementioned host group information, searching all information of the same target port within the physical storage device from the respective host group information, and recreating the data for each target port. Therefore, the physical storage device manages the individual peer zone information. As shown in FIG. 14A, it is also possible to create all information exceeding physical storage devices and to share the same.

A host/peer zone information 1111 has, with respect to the entry of a storage target port WWPN of the physical storage device, fields of a coupling mode, an initiator port number, a host initiator port WWPN and a list of pairs of host group numbers.

The respective fields of the host/peer zone information 1111 will be described below. The target port WWPN of the storage device is a field for storing the WWPN of the target port to which the host is given the permission to access. One or more hosts access a volume via a target port. However, when there are a plurality of volumes, a plurality of volumes and a plurality of hosts are associated with respect to a target port.

The coupling mode field is a field for storing whether the coupling is a fabric (FC or FCoE switch coupling) coupling, a Point to Point (P2P) mode in which the target port is coupled directly with the host, or a FCoE MP (Fiber Channel over Ethernet Multipoint) in which the host and target port are coupled via the Ethernet (Registered Trademark). In the case of P2P or FCoE MP, the host and target port are directly coupled without a SAN switch, so that there is no need to set up a zone. Therefore, there is no need to perform a Peer Zone registration operation.

There is no need for the storage device administrator to set up this field in a FC, and automatic detection is performed at the time of login to check whether the login is a Port Login or a Fabric Login. However, as for FCoE, it is not possible to automatically determine whether the coupling is a Fabric coupling or a P2P/FCoE MP coupling, so the storage device administrator must set in advance whether the coupling is Fabric or FCoE P2P/MP.

If the host coupling interface is a different SCSI transfer protocol such as an iSCSI (internet SCSI) or a SAS (Serial Attached SCSI) and the like, the transfer mode of the protocol is adopted. In the case of an iSCSI, there is no concept of SAN Zoning, so that there is no need to register a peer zone, but there are cases where takeover of security ACL of the network switch is required, so the necessary information required for setting the ACL of the network switch is taken over. In the case of the SAS, the zone management command set in an SAS is defined as a management protocol for setting the Zoning, such as a Configure Zone Permission Table SMP (Serial Management Protocol) function and the like, so the host/peer zone information 1111 can be applied by replacing these command sets from the Peer Zone of the FC.

The present embodiment mainly describes the FC and FCoE which are the mainstream of interface for coupling the storages and hosts, and a SCSI command set. The number of initiator ports refers to the number of the initiator ports given permission to access one or more volumes via a target port. The entries described hereafter are information stored in pairs corresponding to the number of initiator ports.

The host initiator port WWPN is a field for storing the host initiator port WWPN given the access permission to a target port of the corresponding entry. The host group information is a number associated with the table of FIG. 13A. Thereby, it becomes possible to recognize which volume the information is associated with.

Based on a host/peer zone information created by rearranging the host group information 1109 via a target port, the host group program 1108 issues an Add/Update Active Peer Zone CT (Common Transport) Request from the relevant target port to a Fabric Zone Server (CT_type=0x03) program of the Management Server port of the SAN switch (port ID is a Well Known Address 0xFFFFFA).

The SAN switch program updates the Active Zone Set with respect to the received Update Active Peer Zone CT Request, and updates and reflects the zone of the whole fabric. The Active Zone Set refers to the validated Zone information of the plurality of Zone sets of the SAN switch, and the Active Zone Set is stored in a volatile memory of the SAN switch.

For example, when the host initiator port number related to the target port is set to zero, such as when all the volumes are deleted, a Remove Active Peer Zone CT Request is issued to delete the relevant Peer Zone registered to the Active Zone Set of the SAN switch.

The commands related to Peer Zoning (Add/Update Active Peer Zone, Remove Active Peer Zone) are commands for changing the Active Zone Set information stored in the volatile memory of the switch. Therefore, when a status change of switch occurs (such as the failure of a switch), the setting information of the Peer Zone set from the target port of the storage device will be lost from the volatile memory.

Therefore, when the target port of the storage device detects the status change of the switch by receiving a message of link-down or RSCN (Register State Change Notification), and a get Active Peer Zone CT request is issued to a Management Server port of the SAN switch to acquire the information of the Peer Zone of the relevant target port from the SAN switch.

If the information of the Peer Zone of the target port stored in the physical storage device is inconsistent with the Peer Zone information acquired from the SAN switch via the Get Active Peer Zone CT Request, registration is performed again by the Add/Update Active Peer Zone CT Request. According to this procedure, the storage device acquires the information of the Peer Zone stored only in a volatile memory and compares the same with the host Peer Zone information 1111 that must be registered, and the storage device can check whether the necessary Zone is constantly registered in the SAN switch. The configuration of the Peer Zone of the SAN switch, the Zone Database and the Active Zone Set will be described later with reference to FIGS. 20 through 22.

FIG. 14B is a communication path/peer zone information 1102. The communication path/peer zone information 1102 is information necessary for automating on the storage device side the setting of the SAN Zoning ACL of the communication path 16 which is the communication path set up between initiator ports and target ports of storage devices.

When the number of physical storage devices is N, the number of Zones required to establish a mutual communication path as illustrated in FIG. 7 is n×(n−1), and in the case of a redundant network, the necessary number of zones is 2×n×(n−1). As the number of storage devices increases, the number is increased in the order of $n^2(n \times n)$, so the management load of the storage administrator requesting registration to the SAN administrator increases as the number of storage devices increases.

The communication path/peer zone information 1102 is information required for automating the zone registration of the communication path 16. The communication path/peer zone information 1102 is managed via a communication path program 1101. The communication path/peer zone information 1102 is crated based on the communication path program 1101 sending a query to an Unzone Name Server included in the Management Server of the SAN switch and searching the communication port of the storage device, which differs from the creation of the host group information of FIG. 14A. The Unzone Name Server of the SAN switch will be described in detail in FIG. 20.

Now, the respective fields of the communication path/peer zone information 1102 will be described. However, the present table is very similar to the table of FIG. 14A, so the structure thereof will be described briefly.

The coupling mode field is a field showing whether the communication path port is a fabric coupling is a P2P coupling. When the mode field is P2P or FCoE MP, the storage devices are directly coupled, so that there is no need to set up the Zoning for the SAN switch. The field of initiator port number refers to the WWPN of the initiator port of the storage device and the number of lists storing the entries having united the physical storage devices.

The field of storage initiator port WWPN is a field for storing the WWPN of the initiator port given access permission as a communication path with the counterpart storage device. The field of physical storage device ID is a field for identifying the physical storage device that the initiator port WWPN belongs to. The storage device ID utilizes the ID in the same namespace as the physical storage device ID of FIG. 12A.

FIG. 15A is a TPG (Target Port Group) information 1113. The TPG information 1113 is information stored in each volume. The TPG information 1113 shares the same information among storage devices. The TPG information 1113 is used by the multipath program 1112.

The TPG information has one or more RTPI (Relative Target Port Identifier) which is a target port identification number, and has one AAS (Asynchronous Access State), as described with reference to FIG. 8. The target port of the storage device can control the IO destination issued by the multipath software of the host by changing the AAS with respect to a plurality of target ports included in the TPG. Further, the host can change the status of usability of a target port of a storage by changing the AAS of the TPG of the storage device. The former is an implicit ALUA, and the latter mode in which the host sets up the AAS status is called an explicit ALUA.

Now, we will describe the respective fields of the TPG information 1113. The TPG information 1113 includes a number of AAS and RTPI corresponding to each entry of the TPG number. It also includes a list of pairs of RTPI and target port WWPN corresponding to the number of RTPI.

Now, when there are a plurality of RTPI included in a TPG and forms a group, the AAS statuses of a plurality of target ports must be changed simultaneously. In the present embodiment, status management of the AAS is performed for each target port including the monitoring of the port usage load status when failure occurs to the target port. Therefore, the number of entries of the RTPI that a TPG has is referred to as 1. Although not shown in FIG. 15A, it is possible to store one or more RTPI entries with respect to a TPG.

A TPG number refers to an entry identification number of a Target Port Group. A port status (AAS) is retained in this entry. When a plurality of RTPI are included, the AAS of a plurality of target ports is changed collectively as a group.

An AAS is a field for retaining the port status in an ALUA. The AAS is selected from the following states: an Active/Optimized (Act/Opt) state, an Active/Non-optimized (Act/Non) state, a Standby state, an Unavailable state, a Logical Block Dependent (LBD) state, an Offline state or a Transitioning Between state (Transition).

Now, the details of the respective states of the AAS will be described. The Act/Opt state indicates that the AAS is in a state where the performance is optimized and all SCSI commands are issuable.

The Act/Non state indicates that all SCSI commands are issuable, but compared to the Act/Opt state, the performance is not optimized. When a plurality of TPGs can be selected and accessed via multipath to the same volume and when the Act/Non state and the Act/Opt state exist in a mixture, the host multipath software issues a SCSI IO command prioritizing the Act/Opt state. If failure occurs leaving only the TPG in Act/Non state, the Act/Non TPG is selected and a SCSI IO is issued. If a plurality of TPGs of the same state exist, it is possible to issue the IO to the TPG with an optimized performance using a performance measurement information monitored by the host multipath software, such as a port performance or a delay time of IO response, or in a round-robin fashion.

During the Standby state and the Unavailable state, only limited SCSI commands for management can be issued. The LBD state shows that the target port of the IO destination differs in UDS granularity. When the AAS is set to UDS, the host multipath software refers to the Referral information and determines a target port to be set as the IO destination. The Offline state is a state where no SCSI commands can be issued. The Transition state indicates that the AAS is transiting from a prior state to a different state.

An RTPI entry number is a field for retaining the entry number of RTPIs included in the relevant TPG entry. An RTPI is a field for retaining the ID associating the target port WWPN to a relative number. The RTPI is an index number having shortened the WWPN, and should not be overlapped with the RTPI of other target ports. Further, since the storage device is formed astride physical storage devices, the multipath program 1112 assigns a unique RTPI within the system of FIG. 1 to the target port WWPN of the physical storage device so that the RTPI is not overlapped with other storage devices. The WWPN of the storage target port is a WWPN of a storage device corresponding to the relative number of the RTPI.

FIG. 15B shows a Referral information 1114. The Referral information 1114 is information stored for each distributed virtual volume. The Referral information 1114 shares the same information among storage devices, and shares an arrangement information of the UDS of the distributed virtual volume. The information should be shared among physical storage devices to which the partial volumes constituting the distributed virtual volume belong. However, it is not necessary to share the information with unrelated physical storage devices that do not constitute the distributed virtual volume. The Referral information 1114 is information used for managing the corresponding relationship between the UDS and the path information of the distributed virtual volumes and for appropriately managing the target port of the IO destination in UDS granularity via the multipath software of the host.

Now, we will describe the respective fields of the Referral information 1114. An internal LU number is a field for retaining the internal LU number of the volume having an attribute of a distributed virtual volume. The internal LU number corresponds to the internal LU number of FIG. 12A. An internal LU number of a partial volume is a field for retaining the internal LU number of the partial volume. It corresponds to the internal LU number of the partial volume of FIG. 12B.

A start/end LBA (Logical Block Address) is a field for retaining a set of a start LBA and an end LBA of the UDS. For data consistency, the start and end segments should not overlap. This is because the physical storage device storing the newest data could not be recognized if the write data in an overlapped LBA range is distributed in a plurality of physical storage devices.

A TPG number is a field for retaining the number of lists of the TPG/AAS pairs as described in detail later. A TPG/AAS pair is a field for retaining the TPG number and the AAS corresponding to the TPG. The AAS shows states other than Standby, Logical Block Dependent and Offline states (which are Active/Optimized, Active/Non-Optimized, Unavailable, and Transitioning between states). The basis of the host multipath software selecting an IO request destination TPG when there are two or more TPGs corresponding to a UDS is as described earlier.

It is possible to switch the target ports within the TPG by separating the TPG information 1113 and the Referral information 1114. In other words, by rewriting the RTPI and WWPN pair in the TPG information 1113 denoting the TPG number and notifying the same to the host without having to update the Referral information 1114 which is an extremely large table information, it becomes possible to collectively change only the entity of the WWPN of the target port denoted by the TPG number by merely updating only the information of the TPG information 1113 having a small capacity without having to re-notify the table set via the Referral information 1114 to the host.

Thus, when failure occurs to the target port, fail-over to another target port within the same physical storage device can be performed. At this time, by updating the host group information, changing the related host/peer zone information and registering the Zone to the SAN, it becomes possible to maintain a redundant configuration by performing automatic fail-over without any care from the administrator when failure occurs to the target port, by switching the target port to another target port coupled to the same SAN, and when it is coupled to the SAN, registering the setting of Zoning via Peer Zone. The administrator can replace the port module (replacement component corresponding to Host Bust Adapter) of the storage device and rolling the program within the storage device back to the host/peer zone information and the TPG information prior to failure, according to which the storage device can be returned to the state before failure occurs and fail-over is performed.

Further, by using the communication path between storage devices, when failure occurs to all the ports coupled to a specific physical storage device, as long as a target port coupled to a host of another physical storage device exists, it is possible to perform fail-over operation of the port to the other physical storage device and to access the partial volume of the physical storage device in which failure has occurred through a communication path between storage devices, by which the host IO to the distributed virtual volume can be continued. The details of this processing will be described in detail with reference to FIGS. 37 to 40.

FIGS. 16A and 16B show the TPG information and the Referral information. The differences with the information of FIGS. 15A and 15B will now be described. The TPG information and the Referral information of FIGS. 16A and 16B adopt a structure in which the TPG and the Referral are managed in granularity of host-volume pairs having permission for access. A field of a host group number is added with respect to FIGS. 15A and 15B to notify difference information to each host in volume granularity.

According to the structure of FIGS. 16A and 16B where a plurality of volumes share a target port by a host group information, the AAS state of the target port can be retained in different states for each volume.

For example, if a TPG A and a TPG B including the same target port WWPN correspond to different volumes via host group information, it is possible to have the state of AAS A of TPG A of volume A set to Act/Opt state and have the state of AAS B of TPG B of volume B set to LBD state, which are in different states. The reason for this is because by splitting the namespace of TPG and Referral via host group information, it becomes possible to have the entity volume and the distributed virtual volume exist together with respect to a target port. The details of this process will be described in detail with reference to FIGS. 28 and 30.

According to the arrangement of FIGS. 16A and 16B, if a plurality of hosts share a volume, it becomes possible to respond different TPG information and Referral information to different hosts. Thereby, it becomes possible to correspond to the difference in attribute of host OS information or load distribution of target ports. The details of this processing will be described later with reference to FIG. 31.

The correspondence between the example of table information stored in the storage memory of the storage device as described with reference to FIGS. 11 through 16B and the device configuration example will be described later with reference to FIGS. 26 through 31.

Figure 17:
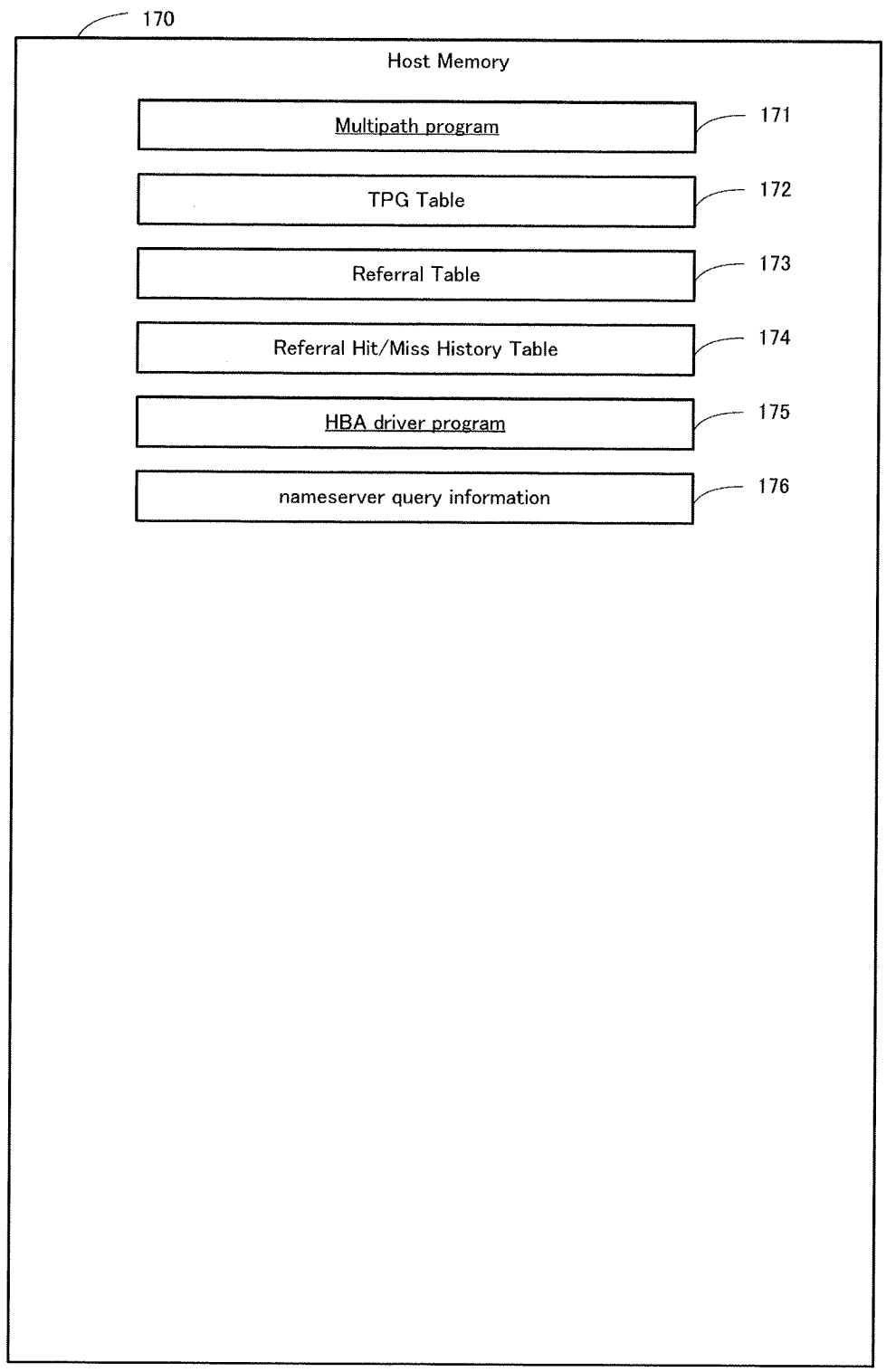
FIG. 17 is a block diagram illustrating the information in a memory of the host.

FIG. 17 is a view showing the program and table information stored within a host memory of the host system. FIG. 18A illustrates a host TPG information. Now, the respective fields of the host TPG information 172 will be described. Volumes accessible via the host group setting of the storage device are shown for each target port that the host initiator port is capable of accessing.

An LU number is the number of LUs that the host initiator port has acquired via a SCSI Report LUN command. An LU number is the list of LU numbers that the host initiator port has acquired via the SCSI Report LUN command. The LU number recognized by the host is the host LU number within the host group information of the storage device. An internal LU number of the storage device is a number for managing the real volume within the storage device, which is not visible from the host. Since a initiator port manages a plurality of volumes, the fields described hereafter are set for each LU.

A Vender/Device/LU Name field is the information related to the SCSI Inquiry command (Standard Inquiry information, and 0x83 Device Identifier VPD page) issued with respect to the LU number. The host multipath software determines whether the identifier (ASCII code) of the Vender/Device stored in the host multipath software corresponds so as to determine whether to perform multipath operation or not. An LU Name is a name identifier for confirming that that host multipath program is of the same volume. When this name corresponds, it is determined that the same volume is involved, and it is determined that the target port forms a multipath.

An RTPI is a field for retaining the identification number of the target port. A TPG is a field for retaining the TPG number to which the RTPI belongs. An AAS is a field for retaining the AAS corresponding to the TPG number. The RTPI and TPG number are each information acquired for each target port by the SCSI Inquiry command (0x83 Device Identifier VPD page) issued to the LU number. Therefore, the host multipath program issues a SCSI Report LUN command and a SCSI Inquiry command with respect to all recognizable paths for the initial volume identification. Since the target port differs, Different Device Identifier VPD page information can be acquired from each of the target ports.

The AAS information stores the current port access status corresponding to the TPG number. A list of one or more TPG structures that the corresponding volume has is acquired via the SCSI Report Target Port Group (Report TPG) command issued to the volume. The TPG structure stores the list of one or more RTPIs constituting the TPG and the TPG and AAS pair at the time the data is acquired.

An ALUA Support is a field for retaining an ALUA and Referral support mode by the volume of the corresponding LU number. An ALUA support flag is a flag for acquiring whether support is enabled or not of an Explicit ALUA and an Implicit ALUA acquired via the TPGS field of the SCSI Inquiry command (Standard Inquiry information). An R_SUP is an R_SUPPORT (Referral Support) flag of the SCSI Inquiry command (0x86 Extended VPD page information).

In addition, the host multipath program sets and refers to a D_SENSE flag of a Control Mode Page (page code 0x0A) via a SCSI Mode Sense/Mode Select command. The D_SENSE flag is a set bit for validating the SCSI response of the Referral Sense Data (D_SENSE=1) when the Referral supports the corresponding volume (R_SUPPORT=1).

FIG. 18B is a view illustrating a Referral information 173 of the host. In FIG. 18A, the host Referral information of the corresponding LU becomes effective when the volume is supported by the Referral and the AAS of the TPG is LBD. The Referral information acquired by the host multipath software issuing a SCSI Report Referral command to the corresponding LU is stored in the Referral information 173 of the host.

Upon receiving the SCSI Report Referral command, the physical storage device uses the Referral information of the storage device to create an information regarding the SCSI Report Referral command (Referral structure) and returns the same to the host. At this time, the physical storage device must return without fail every UDS of all the partial volumes (including the partial volume stored in other physical storages) constituting the distributed virtual volume. In other words, the storage device must return a list of UDS similar to the range of the end LBA acquired by the SCSI Read Capacity command.

Now, each field of the host Referral information 173 will be described. An LU number is a field for storing the host LU number in a distributed virtual volume of the storage device. A UDS start/end LBA is a field for storing the start and end LBA of the UDS. A TPG number refers to the field for storing the number of lists of the TPG/AAS pair. A TPG/AAS refers to the field for storing the TPG number and the AAS of the TPG structure within the UDS.

FIG. 19A is a view showing a Referral Hit/Miss information 174 of the host. The multipath program of the host stores the Referral information acquired via the SCSI Report Referral command to the host Referral information 173 of FIG. 18B. In the Referral information, in order for the storage device to cut down the capacity of the number of entries of the UDS in the Referral information, a number that differs from the actually accessed TPG may be associated. In that case, the host issues a SCSI 10 command to a TPG that is not the associated storage device.

When a command that is not related to the associated storage device is received, the storage device returns as a SCSI Response an inspect Referral Sense Descriptor by an ASC/ASCQ (Additional Sense Key/Qualifier) of a Check Condition (status=0x2)/Aborted Command (0xB). If the aforementioned D_SENSE flag is 1, the Referral information is stored in a Sense Data of the SCSI Response. Based on the Referral Sense Data, it becomes possible to re-issue the SCSI IO command issued to a TPG that is not the storage device in charge to a correct TPG.

Therefore, the host multipath program retains the history information of Hit/Miss when a TPG that is not the storage device in charge is selected when the SCSI IO is issued, using a Referral Hit/Miss information 174 of the host.

FIG. 19A is similar to FIG. 18B, so only the different fields are described below. The host multipath software retains the history of Hit/Miss of the issued IO for every TPG of the UDS. The host multipath program creates an entry of a start/end LBA related to the IO having missed the Referral Sense Data response if necessary, and stores the TPG number of the response information of the Referral Sense Data with respect to the SCSI IO command. Further, the TPG having missed the issued IO is set to miss.

Now, the UDS does not need to have the start/end LBA correspond with the UDS of the information acquired from the storage device in FIG. 19A. Further, according to FIG. 18B, the history of Hit/Miss of the TPG is all stored, but it is also possible to cut down the entry by retaining only the hit information. Based on this information storage method, compared to the Referral information described with reference to FIG. 18B, only the UDS of the portion having a high IO issue frequency is stored partially in the Referral Hit/Miss information 174 of the host.

Subsequently, the host multipath program refers to the Referral Hit/Miss information 174 of the host to select a TPG having a hit information and issues the IO. If there is no corresponding TPG in the Referral Hit/Miss information 174 of the host, the host multipath program refers to the Referral information 173 of FIG. 18B.

Thereby, the multipath software of the host can cut down the frequency in which IO miss occurs by the check response of the Referral Sense Data. Further, it can cut down the capacity of the host Referral information 173 returned to the host via the SCSI Report Referral command responded from the storage device to the host.

FIG. 19B shows a name server query information 176 in a storage configuration coupled to a SAN. The information is acquired by sending a query to a name server of the SAN from an HBA driver program 175 of the host. The name server query information 176 retains the coupling relationship between the respective physical storage devices and the ports. This coupling information is formed automatically when creating a distributed virtual volume by creating a zone from a target port of each physical storage device from a storage device. The details of this process will be described in detail later. The corresponding relationship of the example of a table information stored in the host memory of the host system described with reference to FIGS. 17 through 19B and the system configuration example will be described in detail later.

Figure 20:
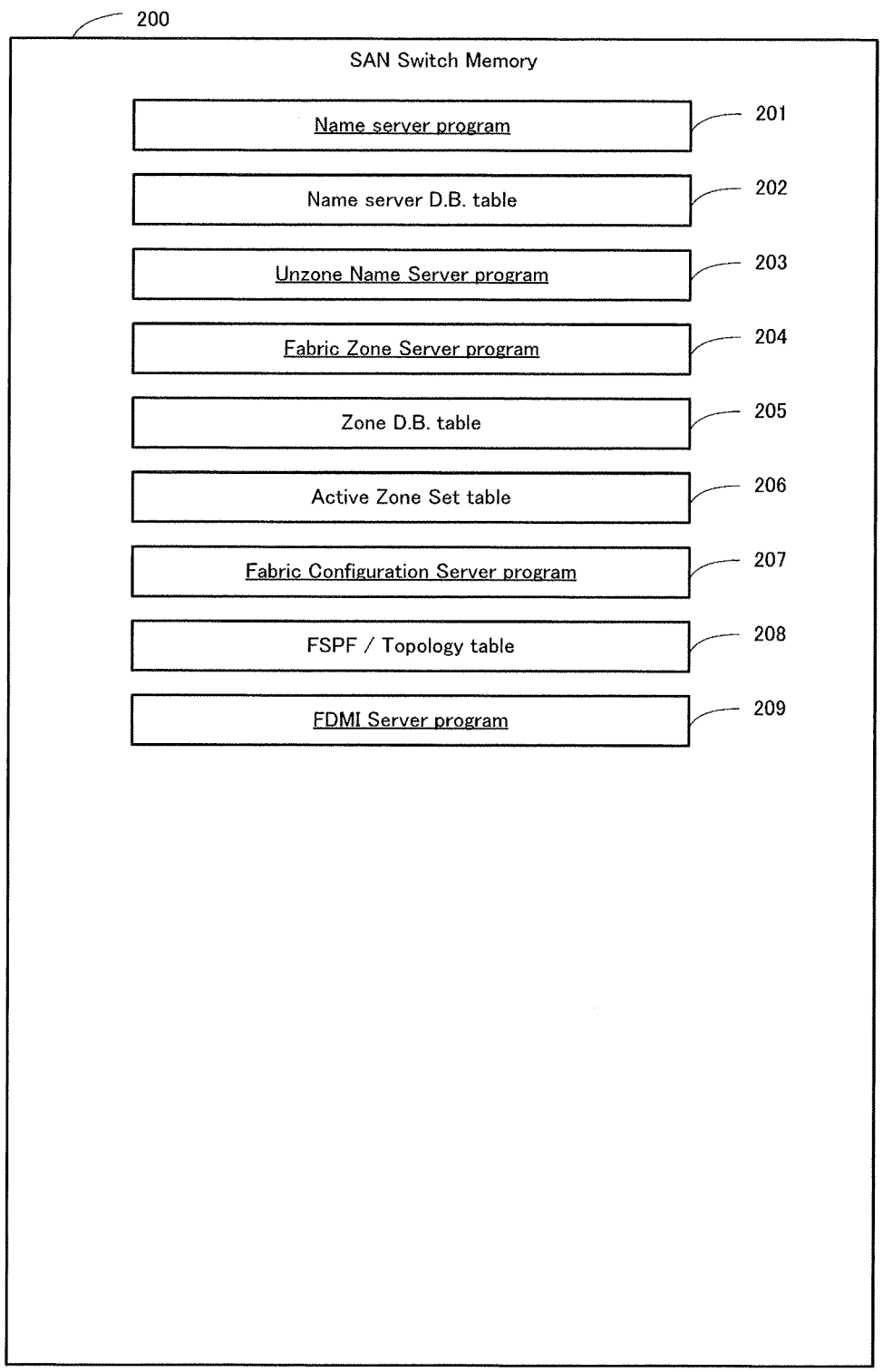
FIG. 20 is a block diagram showing the information in a memory of the SAN switch.

FIG. 20 is a view showing the programs and tables stored in a memory of a SAN switch storage constituting a SAN. FIG. 21A shows a name server database information 202 of the SAN switch.

When a SAN is included in the system configuration, the host system and the physical storage device performs login to a Fabric Port (F_Port) of the SAN. An N_Port_ID assigned at this time retains the port WWPN of the login source, the port type of the login source (support protocol and type of initiator and target), the name of the storage device, and the host information stored in the host HBA (the host name, the OS name, the HBA vender, the firmware version and so on).

FIG. 21B shows a zone database information 205 of the SAN switch. This information is created when the SAN administrator registers a zone to a SAN switch via the management terminal.

The zone set has a plurality of zones. The name of a zone set must be in ASCII codes and the name of the zone set must not overlap with other names. Each zone has a zone name. The zone name must be in ASCII codes and the zone name must not overlap with other names. The zone includes fields of a number of ports having an access permission included in the zone, an identifier of the port having access permission (in the present case, WWPN) and a zone attribute (in the drawing, WWPN Zoning). The zone attribute can include other attributes determined by standard or a Peer Zone attribute, but the detailed description thereof is omitted.

FIG. 22 shows information on an active zone set in a SAN switch. An active zone set is a list of all active zones including the validated zone set information and the entries of the Peer Zone registered from the target port out of the zone database information 205 of FIG. 21B. The zones registered in this list are distributed to all SAN switches, set thereto and enabled communication.

In the case of a Peer Zone, the zone name can be set so that the target port is not overlapped. If the zone name is overlapped with other zone names, the SAN switch returns an error response with respect to the Peer Zone registration request from the target port. In that case, the target port avoids overlap of the Zone name by registering the zone name as a value having converted the target port WWPN to ASCII codes.

When a plurality of SAN switches are coupled to the SAN, each of the name server information, the zone information and the active zone set information is distributed and merged to each SAN switch via the name server program and the zone server program, and all the SAN switches retain the same information Therefore, the zone name and the like must be unique within the whole SAN.

An unzone name server program is a name server program capable of sending a query with respect to all information registered in the name server information regardless of the zone (access permission). Prior to creating a zone via the peer zone, the target port of the storage device sends a query to collect the name server information. The details will be described later with reference to FIGS. 32 through 34. The corresponding relationship between the example of a table information stored in the memory of the SAN switch described with reference to FIGS. 20 through 22 and the example of the device configuration will be described later.

Figure 23:
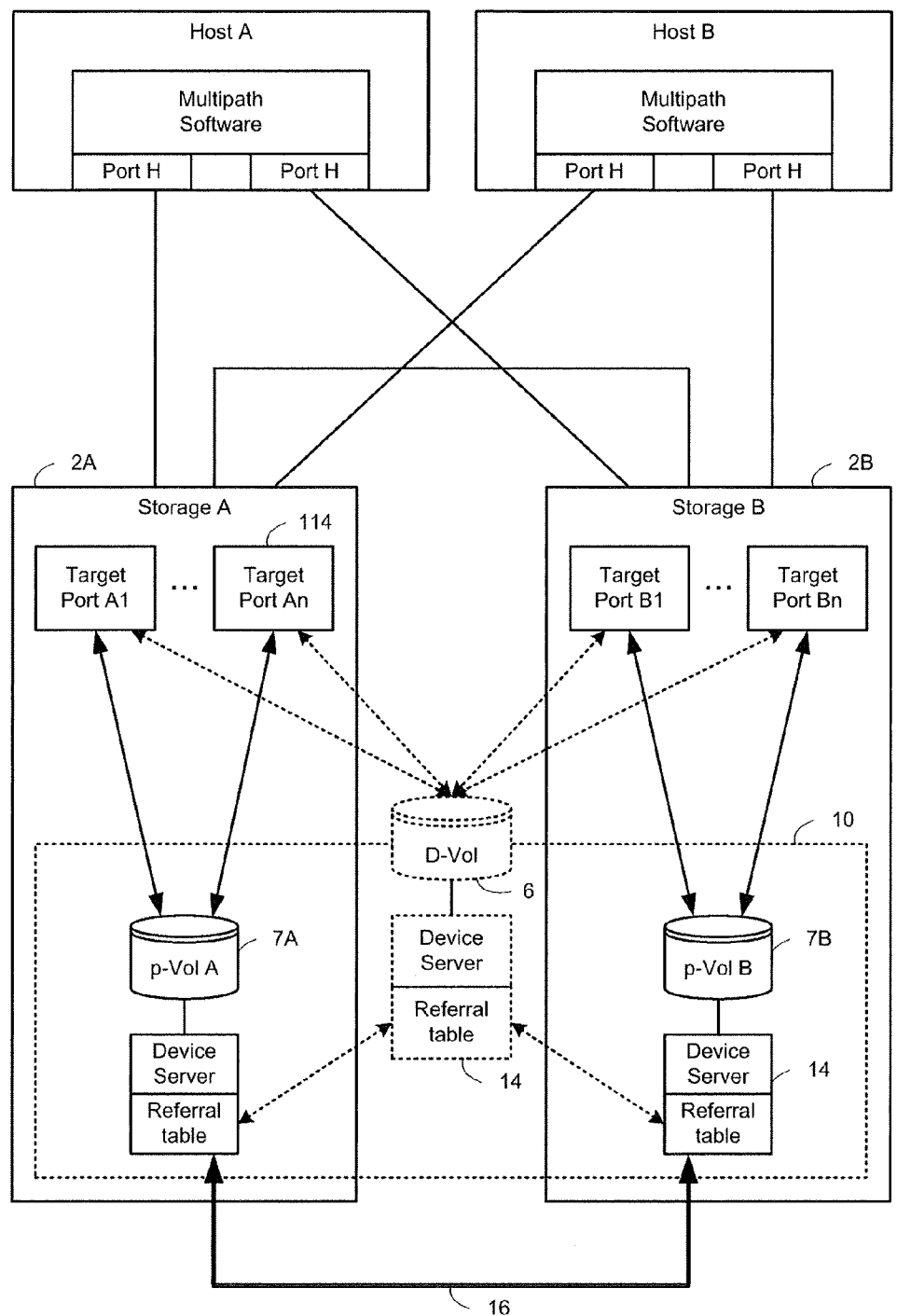
FIG. 23 is a block diagram illustrating one example of configuration of a virtual storage device.
Figure 24:
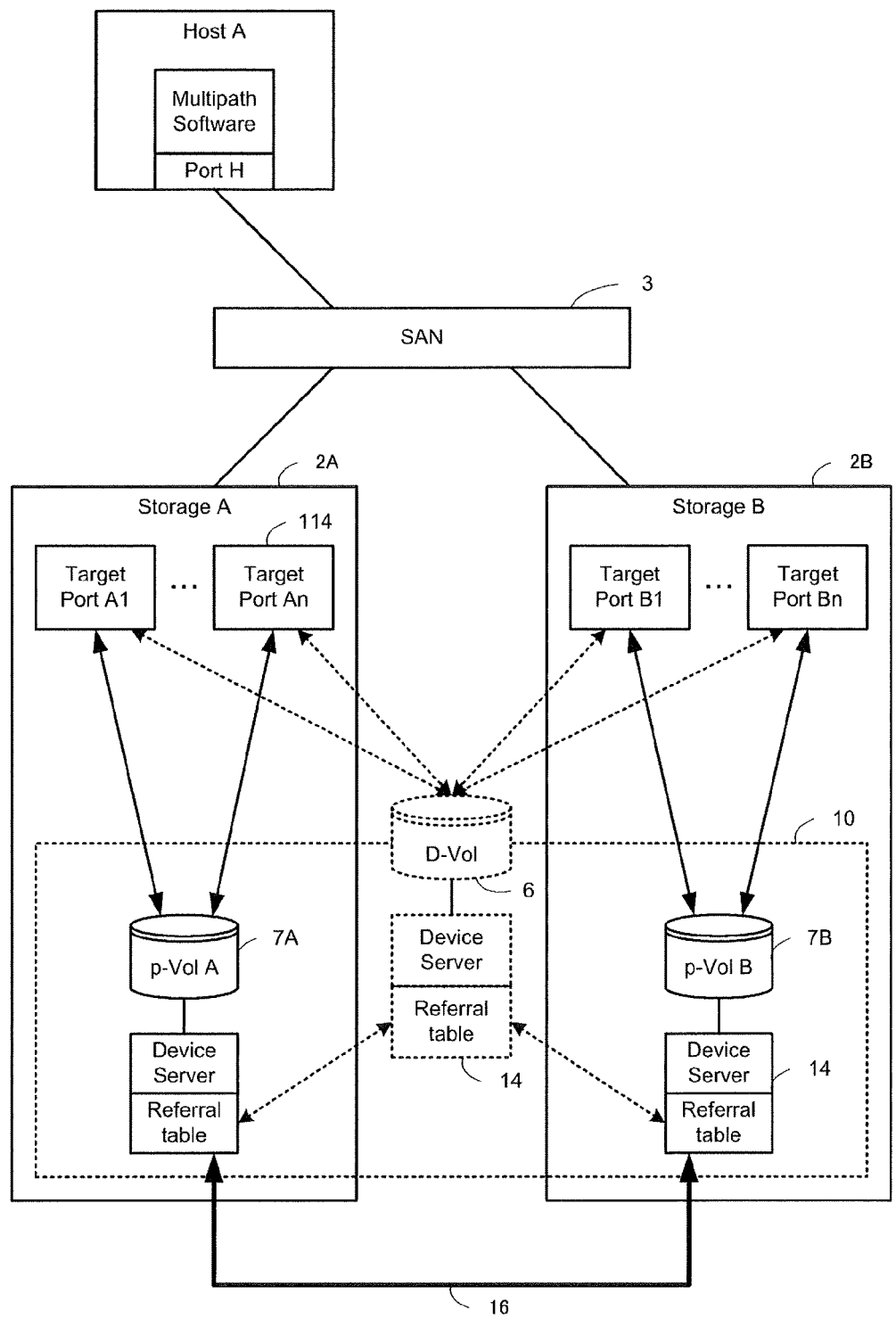
FIG. 24 is a block diagram illustrating one example of configuration of the virtual storage device.
Figure 25:
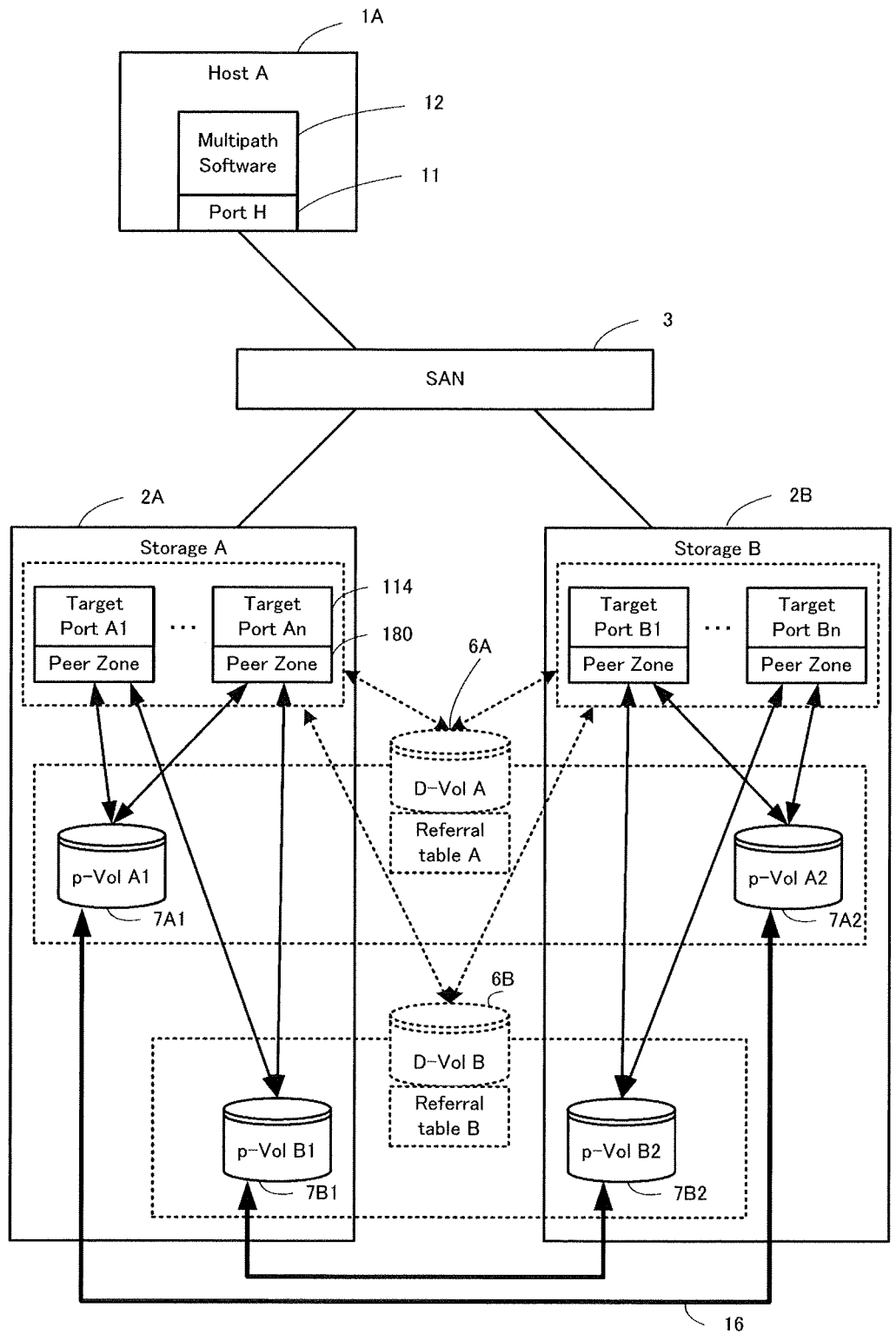
FIG. 25 is a block diagram illustrating one example of configuration of the virtual storage device.

FIGS. 23 through 25 illustrate examples of configuration of a computer system constituting the distributed virtual volume. FIG. 23 is an example of a system configuration in which the host and storage device are directly coupled and storage devices are also mutually directly coupled to establish a communication path 16. The distributed virtual volume 6 is formed astride a plurality of storage devices. The distributed virtual volume 6 stores the Referral information. Physically, the partial volume 7 stores the same information.

Upon accessing the distributed virtual volume 6, the host 1 acquires the Referral information in advance. The Referral information is a table storing a plurality of pairs associating the segments (UDS) and Target Port Groups, and the information is located in distributed manner in the storage device 2. The host 1 is capable of accessing the partial volume 7A via the target port of the storage device 2A.

FIG. 24 illustrates a system configuration in which the host and the storage device or the storage devices are mutually coupled via a SAN. FIG. 25 illustrates a system configuration in which the host and the storage device or the storage devices are mutually coupled via a SAN and forming a plurality of distributed virtual volumes.

Figure 26:
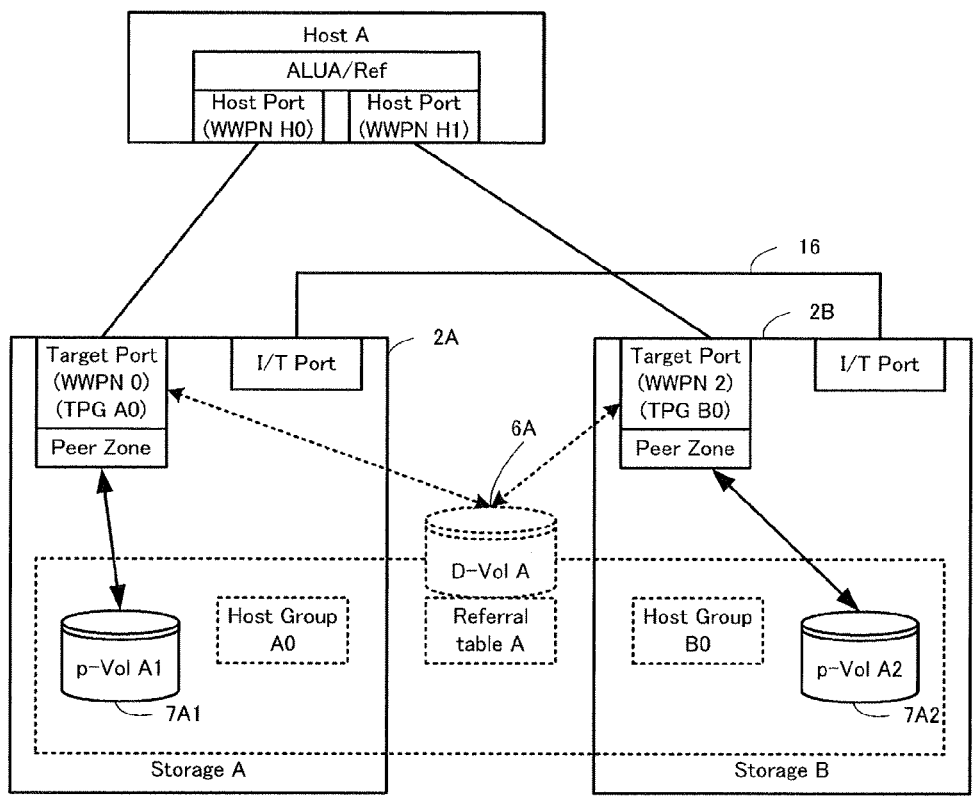
FIG. 26 is a block diagram illustrating one example of configuration of the virtual storage device and management information.

FIGS. 26 through 31 illustrate configurations of a computer system constituting a distributed virtual volume and a portion of the information stored in each device. FIG. 26 is a drawing showing a system configuration in which the host and the storage devices are directly coupled and the storage devices are also mutually directly coupled to establish a communication path 16, and a portion of the management information.

It is assumed that the storage device has already established a communication path 16 between storage devices. In the following drawings, the communication path 16 is omitted from the drawing. The communication path 16 can be an independent network or can be directly connected. Further, the communication path 16 can be shared with a network coupled to the host. The initiator/target port of the communication path 16 can be mutually independent. The target port coupled to the host and the initiator/target port of the communication path can be shared as a SCSI Port. These combinations can be appropriately configured within the range of assembly as described with reference to FIGS. 5 through 7.

When the storage administrator creates distributed virtual volume A, it performs a host group setting for permitting access of the host A. Actually, the virtual storage device administrator registers the host initiator ports H0 and H1 as host group information of the distributed virtual volume A. In a procedure described later, the virtual storage device selects storage device A or B for defining the distributed virtual volume according to the performance request. The virtual storage device selects usable target ports 0 and 2 via a procedure described later. In this case, each storage device searches a target port capable of reaching the initiator ports H0 and H1 of host A. Further, the administrator of the storage device can explicitly designate the physical storage device and the target port to be used.

As for the host group information (initiator ports H0 and H1) registered to the virtual storage devices, the program within the storage device creates a host group information independently as a setting required for the two physical storage device, and generates a host/peer zone information required for each target port. However, in the configuration illustrated in FIG. 26, since there is no SAN (P2P coupling mode), no peer zone information is generated, and the host port field is set to N/A. Upon creating a distributed virtual volume, the program of the storage device creates a TPG information and a Referral information. The details of the procedure for creating a volume will be described in detail later with respect to FIG. 35.

The host sequentially issues SCSI commands (Report LUN, Inquiry, Report TPG and Report Referral) when preparation for the communication with the storage device and volume creation is completed. Thereby, the host multipath software forms a TPG information and a host Referral information. The details of the procedure for volume creation will be described in detail later with reference to FIG. 36.

Figure 27:
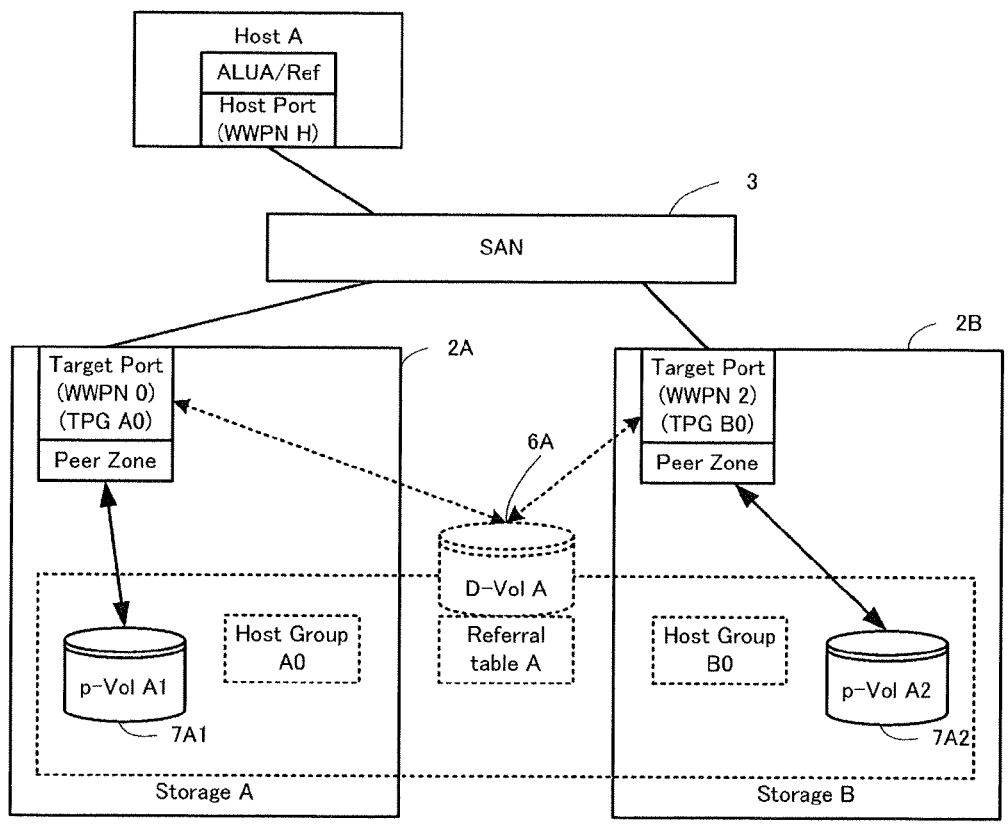
FIG. 27 is a block diagram illustrating one example of configuration of the virtual storage device and management information.

FIG. 27 is a view showing a system configuration in which the host and the storage devices or the storage devices are mutually coupled via a SAN, and a portion of the management information. The differences of the present drawing and FIG. 26 will be described. The coupling mode of the host/peer zone information is Fabric. The program of each physical storage device creates the host/peer zone information based on the host group information.

The storage administrator creates a distributed virtual volume and sets up a host group. The target ports of each physical storage device constituting the virtual storage device performs registration of access permission using a Peer Zone to the SAN. Upon receiving change of setting of the peer zone, the program within the SAN switch updates the access permission of the SAN, and enables communication between the host and the storage device. The host performs a procedure of volume recognition with respect to the storage device.

FIG. 28 is a view showing a system configuration in which the host and the storage devices or the storage devices are mutually coupled via a SAN, and a portion of the management information. The differences between the present drawing and FIG. 27 are explained. FIG. 28 omits the description on the partial volume and the Referral information, but the two distributed virtual volumes adopt the configuration of a partial volume similar to FIG. 27. Two distributed virtual volumes A and B are set with respect to a target port using the host group setting.

Regarding distributed virtual volume B, the storage administrator instructs volume creation and sets up an access permission of host B to the host group. The virtual storage device converts the setting of the distributed virtual volumes created in the virtual storage devices into two physical storage device host groups X0 and Y0. Further, in response to a volume creation request from the administrator, the virtual storage device distributes the TPG information and the Referral information to the two physical storage devices via the communication path 16 (omitted in FIG. 28).

Each physical storage device updates the host/peer zone information based on the distributed host group information, respectively sets up access permissions with respect to the host B, and updates the Zoning ACL of the SAN in the Peer Zone. Thereby, the access permission of host B and distributed virtual volume B is added to the access permission of host A and distributed virtual volume A. When an instruction is received from the management terminal, the storage administrator sees a virtual storage device, and there is no need to repeatedly perform the settings of a plurality of physical storage devices.

According to the information storage method, a plurality of distributed virtual volumes can share the target ports of each physical storage device. Further, it is possible to set up access permissions of distributed virtual volumes independently with respect to a plurality of hosts. According to this arrangement, the states of the AAS of the TPG information and the AAS of the Referral information stored in the respective distributed virtual volumes can be set independently without depending on the information of the other distributed virtual volume.

Figure 29:
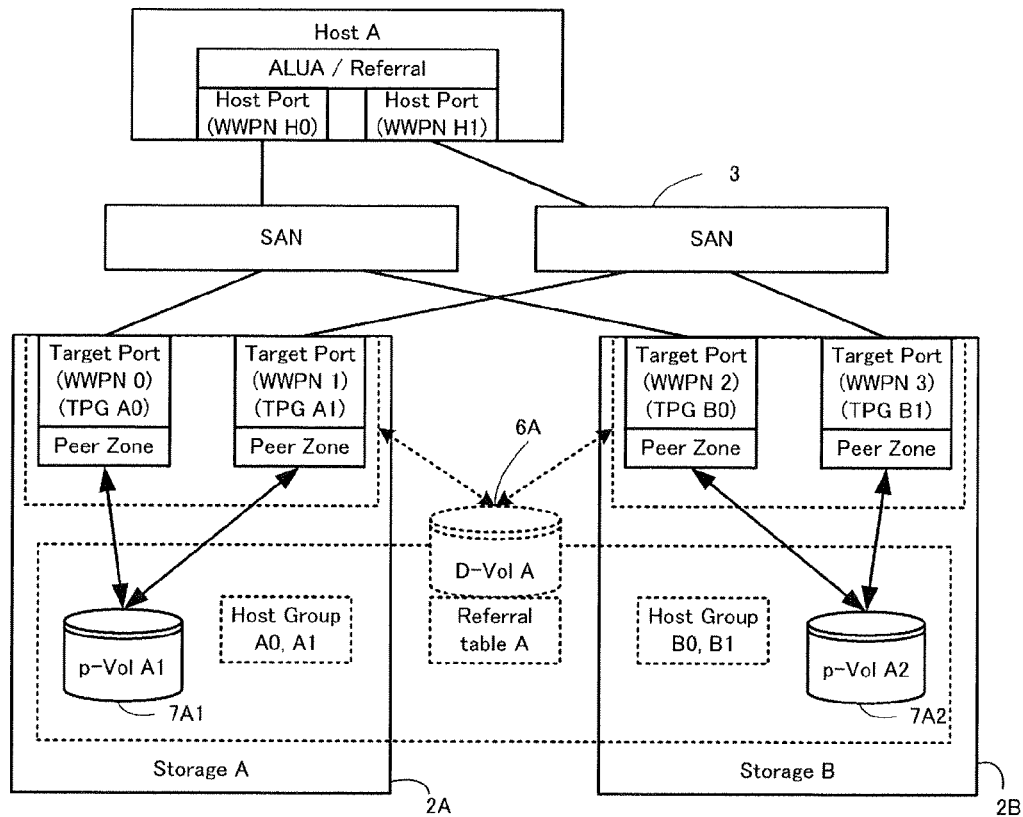
FIG. 29 is a block diagram illustrating one example of configuration of the virtual storage device and management information.

FIG. 29 is a drawing illustrating a system configuration in which a host and storage devices or storage devices are mutually coupled via a redundant SAN, and a portion of the management information. The differences between the present drawing and FIG. 27 are explained. The configuration of each information in a case where two or more target ports are set up with respect to a physical storage device will be described.

The storage administrator creates a distributed virtual volume A, sets up a host group of the virtual storage device, and provides an access permission of host ports H0 and H1 to a distributed virtual volume A. The virtual storage device provides to the host port H0 an access permission of target ports 0 and 2 of the respective physical storage devices and to the host port H1 an access permission of target ports 1 and 3 of the respective physical storage devices.

The virtual storage device converts the setting of the distributed virtual volume created in the virtual storage device to host groups A0, A1, B0 and B1 of the two physical storage devices. Further, based on the volume creation request of the administrator, the virtual storage device distributes the TPG information and the Referral information to the two physical storage devices using a communication path 16 (not shown in FIG. 29).

Each physical storage device updates the host/peer zone information based on the distributed host group information, respectively sets up access permissions for host ports H0 and H1, and updates the Zoning ACL of the SAN in the Peer Zone. Thereby, two paths are set in the respective UDS as access permission of host A and distributed virtual volume A. This process enables to save the work related to setting a redundant SAN structure.

FIG. 30 shows a system configuration in which the host and the storage devices or the storage devices are mutually coupled via a SAN, and a portion of the management information. The differences of the present invention and FIG. 28 are explained. The physical storage device A sets up a entity volume A and a distributed virtual volume B with respect to a target port (WWPN0) using a host group setting.

The storage administrator instructs volume creation with respect to entity volume A, and sets up a WWPN H0 to the host group as an access permission of host A. The virtual storage device converts the setting of the entity volume created in the virtual storage device to a host group A0 of the physical storage device A, and distributes the same to the physical storage device A. Since the entity volume A does not require Referral information, the physical storage device A will not register the Referral information. The physical storage device A registers the information of entity volume A of physical storage device A to the TPG information.

Each physical storage device updates the host/peer zone information based on the distributed host group information, respectively sets up access permissions with respect to the host B, and updates the Zoning ACL of the SAN in the Peer Zone. Thereby, an access permission of host B and distributed virtual volume B is added to the access permission of host A and distributed virtual volume A.

Based on the host group setting, the physical storage device A refers to the internal LU number from the host group information (the internal LU number is omitted from the entry of the host group information in FIG. 30), and determines that only entity volume A is an accessible volume. When the host A issues a SCSI command necessary for recognizing a volume to the entity volume, the host recognizes that the volume is a Referral non-support (R_SUPPORT=0) volume. Therefore, the host A will not issue a command for acquiring the host Referral information. Regarding host B, only the permission to access a distributed virtual volume B is provided, similar to FIG. 28.

Thereby, since the virtual storage device stores TPG information and Referral information for each host group number, that is, for each volume, and since a state that differs for each volume (in the case of E-VO1 A, AAS=Act/Opt, in the case of D-VO1 B, AAS=LBD) is stored with respect to the physical port of the physical storage device (WWPN 0), a different type of volume can perform access by sharing the target port of the same physical storage device.

FIG. 31 shows a system configuration in which the host and the storage devices or the storage devices are mutually coupled via a SAN, and a portion of the management information thereof. The differences between the present drawing and FIG. 30 will be described. The host A is an old host having a multipath software that does not support Referral. It is assumed that both host A and host B access the distributed virtual volume B. The distributed virtual volume B is a cluster volume shared and accessed by host A and host B.

The storage administrator creates the distributed virtual volume B with respect to the virtual storage device and sets up a host group information for each host. The OS version of the host and the attribute information of the host multipath software are set for each host as attribute information described with reference to FIG. 13B. Now, the host A registers a SPC-3 ALUA support and the host B registers a SPC-4/SBC-3 ALUA/Referral support via the host group.

The information of the host group settings of the virtual storage device is shared by the respective physical storage devices via a communication path 16 (not shown in FIG. 31). A host port H0 of the host A only has access permission to target port WWPN 0 as an access permission of host group A0 which is a distributed virtual volume and has a Referral non-support attribute. The host port H0 of host A cannot directly access the partial volume A2 of distributed virtual volume B via the target port of physical storage device B.

Therefore, the host port H0 of host A must access the partial volume A2 of physical storage device B from the physical storage device A through an IO routing path and via a communication path 16. Therefore, the host A is also capable of accessing the entity of the distributed virtual volume B.

Now, a host group number is registered as Referral information, and by referring to the volume information (FIG. 12A or FIG. 12B), it becomes possible to determine which physical storage device the volume is arranged in (the storage ID field of Referral information in the drawing is determined uniquely by referring to the volume information). Therefore, the IO routing path of the physical storage device is capable of determining whether it is necessary to perform routing to the physical storage device by referring to the volume information from the Referral information.

According to the arrangement of FIG. 31, even in an environment in which multipath software of different versions exist in a mixture, it becomes possible to maintain the compatibility of mutual coupling while sharing a distributed virtual volume via a plurality of hosts.

Figure 32:
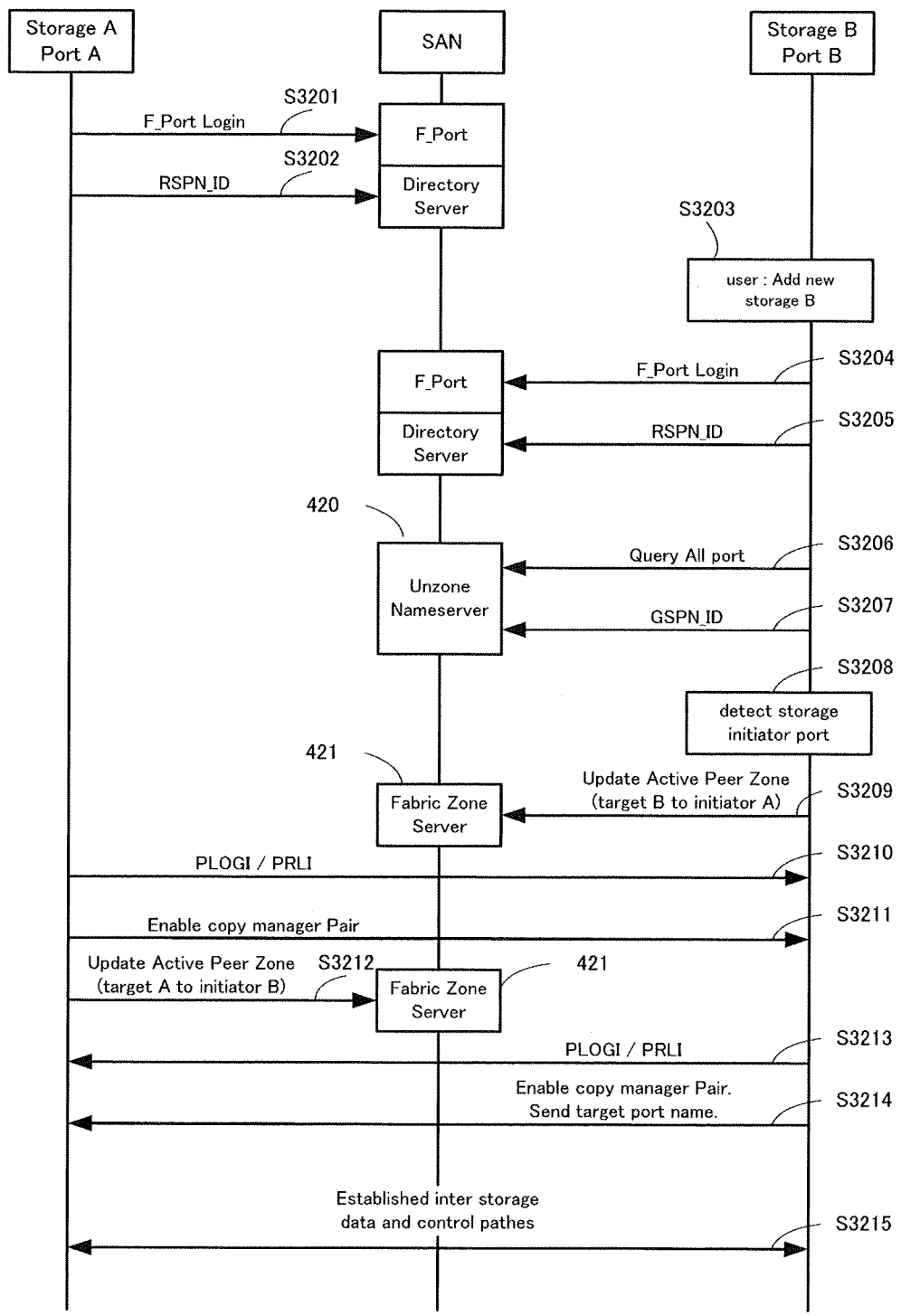
FIG. 32 is a sequence chart showing the establishment of a communication path coupling storage devices via a SAN.

FIG. 32 is a sequence chart for facilitating the work of the administrator in an arrangement in which a communication path is established between storage devices via a SAN. Based on this sequence, the recognition of the physical storage device is automated, and the setting of Zoning of the SAN required for establishing a communication path 16 arranged between storage devices is automated.

Figure 34:
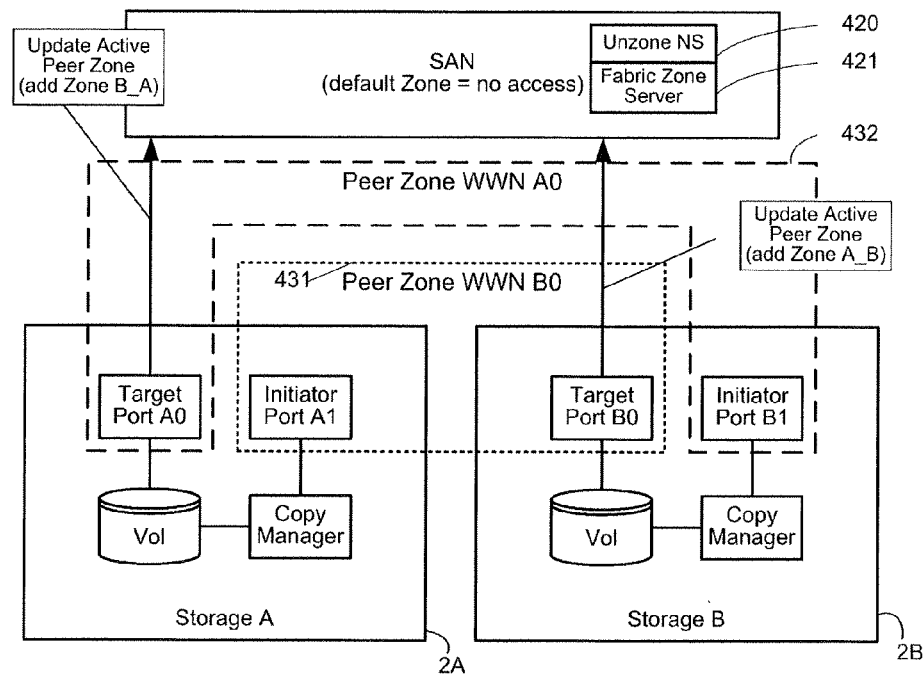
FIG. 34 is a block diagram illustrating one example of configuration of the virtual storage device and management information.

FIGS. 33 and 34 show system configurations prior to and after setting a communication path via the sequence of FIG. 32, and a view showing changes of various information. The sequence of FIG. 32 will be described with reference to FIGS. 33 and 34. The configuration, program and storage information within the SAN switch of FIGS. 32 through 34 respectively correspond to the configuration, program and storage information within the SAN switch described with reference to FIG. 10 and FIG. 20.

The storage device stores an Unzone Name Server information and a Name Server information in the memory. Since the Name Server information in FIGS. 33 and 34 is information generally required to store the list of SCSI initiator and target information, it is omitted from the description of FIG. 11. The Unzone Name Server information is inevitable information for searching a counterpart (peer) for providing access permission in order to create a zone automatically.

At first, the storage device 2A and storage device 2B perform fabric login to an F_Port (Fabric Port) of the FC SAN (S3201, S3204). Next, the storage devices 2A and 2B store information capable of identifying that a function exists to enable communication between storage devices in a directory server, such as a Symbolic Port Name, with respect to the SAN using an FC standard message such as a RSPN_ID (Register Symbolic Port Name based N_Port_ID) request (S3202, S3205).

The administrator adds a new storage device. The management screen of the storage device displays on the screen the newly added storage device in this state. The administrator sets the storage devices 2A and 2B as a pair capable of realizing a distributed virtual volume configuration (S3203).

Next, in response to the request (S3203) from the administrator, the storage device 2B sends a query to the Unzone Name Server. This query to the name server can acquire all the name server information exceeding the range of access permission range of the Zoning. For example, an already linked-up N_Port_ID is acquired collectively via a GPL (Get Port List) request, a node name identifier is acquired via a request such as a GNN_ID (Get Node Name based N_Port_ID), then the acquired information is compared with the storage device information stored in the management terminal of a plurality of storages so as to perform refinement (S3206).

Next, a GSPN_ID (Get Symbolic Port Name based N_Port_ID) or the like is issued, and an information capable of identifying the function registered via the aforementioned steps (S3202, S3205) is acquired (S3207). The port registered as a communication port out of the initiator ports of the storage device 2A in the previous step is detected (S3208).

A portion of the information of the SAN switch and the storage device up to the present step is as shown in FIG. 33. Based on the information obtained by the target port of the physical storage device sending a query to the Unzone Name Server, the initiator port of another physical storage device is searched, and in the subsequent step, a zone is set from the physical storage device to the other physical storage device.

Thereafter, the storage device B issues an Update Active Peer Zone request to the Fabric Zone Server 421. Thereby, Zoning of the communication path between the storage devices 2A and 2B (Zone A_B 431 of FIG. 33) is formed (S3209).

Next, the storage device performs initialization of the port (S3210) and activating of function via information transmission and reception via the communication path (S3211). Similarly, the communication path is established from the storage device 2A side. Thereby, Zoning (Zone B_A 432 of FIG. 33) of the communication path between the storage devices 2A and 2B is fanned (S3212 to S3214). Thereby, a communication path between storage devices is mutually established (S3215).

Up to this step, the states of a portion of the information of the SAN switch and the storage device are changed as shown in FIG. 34. The physical storage device creates a Peer Zone information based on the information obtained via the query sent to the Unzone Name Server. In the case of the storage device A, WWN B1 which is an initiator port of the storage device B is registered to the communication path/peer zone information 1102. The physical storage device sets up a zone for the communication path in the SAN switch based on the Peer Zone request. The physical storage device receives an RSCN after setting of the zone is completed, and a query is sent to the normal name server to establish a communication path.

Further, the operation explained with reference to FIG. 33 is applicable for searching the initiator port of the host. By searching an initiator port via the target port by sending a query to the Unzone Name Server, the virtual storage device can search which target port of the physical storage device can reach the initiator port of the host having access permission without the administrator designating the target port. Further, the name server database information of the SAN switch (FIG. 21A) stores HBA information of FC FDMI (Fabric Device Management Interface) standard, and information can be acquired from the FDMI server of the SAN switch. By sending a query asking for the host name included in the FDMI structure or the like, it becomes possible to search a candidate of the initiator port of the host without the designation of the storage administrator.

FIG. 35 is a drawing showing an operation sequence of a physical storage device when a storage administrator of the virtual storage device creates a distributed virtual volume. The storage administrator of the virtual storage device (hereinafter referred to as storage administrator) orders to create a distributed virtual volume from the management terminal of the virtual storage device. The virtual storage device selects the number of physical storage devices, the type of the volume (distributed virtual volume in the present example), a total capacity of the volume, a storage device function, and a requested performance (throughput performance, transaction performance, and performance and ability of the storage function) (S3501). In the present step, the storage administrator can register the candidate of the physical storage device and Referral information. In other words, the corresponding relationship of the physical storage device and the range of the UDS included in the partial volume can be registered manually.

Further, in the case of a virtual machine cluster volume in which the volume storing the files of the virtual machine disk is shared among a plurality of servers, the program of the virtual storage device or the program of the physical storage device computes the UDS information which is the information of the LBA range based on the fixed size of the virtual machine disk. Thereby, it is possible to determine the UDS information so that the information is distributed in virtual machine disk file granularity to a plurality of physical storage devices, and to determine the arrangement of the virtual machine disk files (S3501).

Next, the storage administrator sets up a host group with respect to the distributed virtual volume. The storage administrator registers the host for providing access permission. Here, the storage administrator can independently register the name identifier (WWPN) of the virtual port assigned to the virtual machine of the host. In another example, the storage administrator can register the host name of the virtual machine and to have the virtual storage device perform an automatic search. As mentioned earlier, also based on the host name of the virtual machine, it is possible to search a port information associated to the host from the FDMI information registered to the name server information 202 of the SAN switch. Further, the storage administrator can independently select the identifier or the number of the target port of the physical storage device. The storage administrator selects a host OS attribute information formed as a template of the host OS information if necessary for the compatibility of the host OS, and associates the multipath information supported by the host OS to the host group (S3502).

Next, the virtual storage device management program of the management terminal sends an access permission information having been set to the physical storage device (S3503). In this step, the access permission setting set up by the administrator has not collected complete information capable of constituting a host group information, a TPG information or a Referral information. Therefore, the virtual storage device collects necessary information from the SAN switch or the host, searches the initiator port of the host, a candidate storage device and a candidate target port, and collects necessary information. The storage administrator can perform operation for creating another volume or the like in parallel until the physical storage device completes a volume creation sequence and receives a message notifying that the volume can be utilized.

The physical storage device receives a request to create a volume and receives necessary information from the virtual storage device management program (S3504). If the storage administrator does not explicitly register the WWPN of the initiator port of the host but registers another identifier such as a host name, the physical storage device searches the WWPN of the initiator port via the procedure described in FIG. 32. Similarly, if the storage administrator has not selected a target port, the physical storage device searches a candidate of the target port capable of communicating with the initiator port of the host via the procedure described with reference to FIG. 32.

The virtual storage device adds to the volume management information 1104 an entry of a partial volume planned to be added to the distributed virtual volume, and assigns an internal LU number of the partial volume. The virtual storage device refers to the volume management information 1104 and updates the distributed virtual volume information 1105. Further, the physical storage device updates the function information 1116 and inherits to the partial volume the function set in the distributed virtual volume. The virtual storage device creates ("updates" in FIG. 35) a TPG information 1113 based on the information of the target port and the initiator port (S3505).

If a plurality of target port candidates are searched via the present step (S3505), the virtual storage device narrows down the candidate of the physical storage device and the target port based on the performance requirements of the distributed virtual volume, the function requirements and the port performance requirements set by the administrator. If there are no candidates, or if the number does not satisfy the number of physical storage devices denoted by the administrator, or if the pool capacity is insufficient, the virtual storage device discontinues the subsequent procedures, notifies an alert of partial volume creation failure to the storage administrator, and ends the procedure. In the present step (S3505), a candidate of the physical storage device capable of reaching the host is determined, the relationship between the target port and the initiator port is determined, and the physical storage device completes preparation of the necessary information for creating the host group information.

If a plurality of target port candidates are searched, it is possible to create a partial volume to each of the physical storage devices having the searched candidate target port. The number and capacity of creation of the partial volume should be determined based on the performance requirements of the distributed virtual volume required by the administrator, the function requirements which are the performance of the physical storage device, the port performance requirements, the free space and so on.

Steps S3506 through S3512 can be operated in parallel in the respective physical storage devices, but for explanation, the flowchart illustrates a loop performed for each physical storage device. The physical storage device creates a host group information 1109 based on the TPG information created in step S3505. The physical storage device creates a Referral information 1114 corresponding to the distributed virtual volume information 1105 (S3506).

Next, the physical storage device creates a partial volume. The physical storage device provides an access permission to the partial volume based on the TPG information 1113 and the host group information 1109 associating the partial volume, the target port and the access permission of the host initiator port (S3507). Further, if the request to create a distributed virtual volume of S3501 is a request to change an already existing real volume to distributed virtual volume, a partial volume is created and then a volume to be allocated to the partial volume is migrated from the real volume.

Next, in the case of a host multipath software not corresponding to Referral, the physical storage device performs a setting so as to realizing routing of the IO to another physical storage device using the communication path if necessary. The present step is not necessary in the host supporting Referral, but it is necessary in the system configuration as illustrated in FIG. 31 (S3508).

Next, the physical storage device confirms whether the coupling mode is fabric (SAN coupling) or not based on the host/peer zone information. In the case of a SAN coupling, the procedure advances to S3510 (S3509). Whether the coupling is Fabric coupling or not is determined based on whether Fabric Login is performed or not.

Thereafter, the physical storage device adds a host WWPN given the access permission to the entry of the target port given the access permission to a distributed virtual volume of the host/peer zone information (S3510). Next, the physical storage device creates a Peer Zone request based on the host/peer zone information created in the former step, and registers the access permission information including the added host WWPN to the SAN switch (S3511).

Next, it is determined whether a next physical storage device constituting a distributed virtual volume exists or not. If the next physical storage device exists, the steps of S3506 through S3512 are repeatedly performed. When the setting of all physical storage devices constituting the distributed virtual volume is completed, the procedure advances to S3513. On the other hand, if the coupling mode is not a SAN coupling, coupling with the physical storage device being the candidate of coupling searched for every physical storage device is established, and a host group is set according to the established coupling.

Next, the completion of creation of the distributed virtual volume is notified to the program of the virtual storage management terminal (S3513). Lastly, the storage administrator receives completion of creation of distributed virtual volume, and confirms that the setting of the host, the SAN, the distributed virtual volume of the virtual storage device and the partial volumes of all physical storages are completed, and further confirms that the issuing of IO is ready (S3514).

According to this flowchart, the storage administrator provides to the virtual storage device information on the required performances, the number of storage devices, the capacity and the host to be permitted access, so as to enable the virtual storage device to search the initiator port of the host, search the target port capable of reaching the host, determine a plurality of physical storage device candidates, and perform setting of access permission and creation of partial volumes with respect to each physical storage device. Thus, the storage administrator can complete the setting of a distributed virtual volume without regard to the setting of the distributed virtual volume.

The present flowchart was described focusing on the distributed virtual volume, but even regarding the creation of a entity volume or a virtual volume, the effect of automated settings is exerted, wherein the setting only becomes the setting of a specific physical storage.

Figure 36:
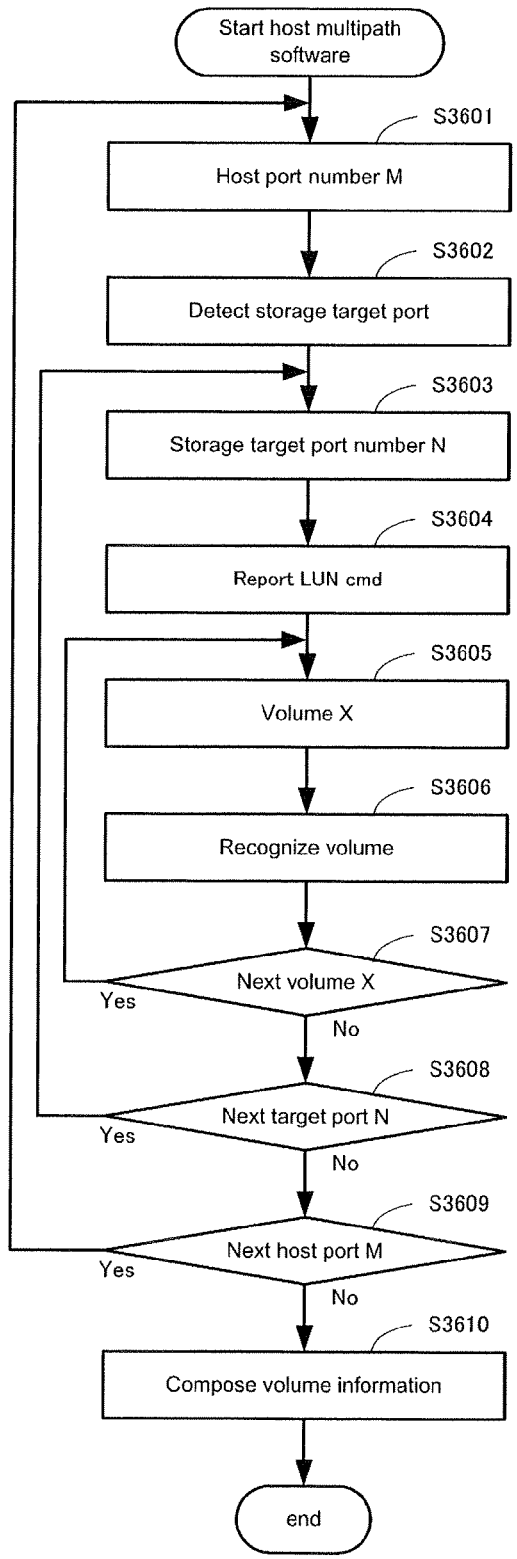
FIG. 36 is a flowchart showing the processing for recognizing a distributed virtual volume.

FIG. 36 is a flowchart of a process for the host to recognize a distributed virtual volume. In the following flowchart, it is possible for the commands to be issued in parallel from each host port, but in order to facilitate explanation, the flowchart only illustrates sequential execution of commands.

First, the one or more host ports of a host is sorted for example in order of Relative Port ID, and the following control is executed with respect to a port having a host port number M (S3601). Next, the host port M sends a query to the name server of the SAN. Now, the SAN switch only responds information having access permission via Zoning.

Now, the host executes only the port having a target port attribute (a port to which a target attribute is registered in RFF_ID CT_IU). If the host is not coupled to the SAN, one target port is detected at the timing of login. In the case of a FCoE MP (multipoint) topology, it is possible that a plurality of target ports are detected. The host HBA driver program sorts and retains the detected target ports for example in the order of number of the N_Port_ID (S3602). If no target port has been detected, the steps of S3603 through S3608 are skipped.

Next, the host performs the following sequence to the detected target port number N of the of the storage device (S3603). Thereafter, the host issues a SCSI Report LUN command. The storage device searches the host group information from the access source host port WWPN, creates a list of the host LU number of the volume having an access performance, and returns the same as a SCSI Report LUN command. Here, one or more volumes are returned (S3604). If not even a volume has been created, the steps of S3605 to S3607 are skipped.

Next, the host performs the following sequence to volume X of the detected target port number N of the storage device (S3605). Thereafter, the host issues a SCSI Inquiry command. Now, the issued page and the acquired information will be explained. The Standard Inquiry page acquires a vender name, a product name, and a TPGS flag which is an ALUA support availability flag. If the TPGS flag is not 00b, the ALUA is supported. If the combination of the vender name and product name are already registered in the host multipath software, the multipath software determines that the volume is a multipath volume and requires formation of the TPG information and the Referral information.

Next, the host issues a command to acquire a Device Identifier VPD page (0x83) of the Inquiry, and acquires the LU name identifier of the volume (LU Name), the name identifier of the Target Port being accessed, RTPI, and TPG. Next, the host multipath program supporting Referral issues a command to acquire an Extended VPD page (0x86) of the Inquiry, and acquires information on whether the volume supports Referral or not. If the R_SUPPORT bit of the page is set to 1, it is determined that the volume supports Referral.

If the volume supports Referral, the host issues a command to acquire a Referral VPD page (0xB3) of the Inquiry, and confirms whether the segment size of the UDS is a fixed-length striping or a variable length. According to the present embodiment, the UDS assumes a variable length acquired via the Report Referral command, but it can simply be a striping mode adopting a multiple of the UDS multiplier and a fixed Segment Size.

Next, if the volume supports ALUA, the host issues a SCSI Report Target Port Group command. Thereby, a list of all TPG of the access path of the volume storing a list of target port RTPI constituting the TPG is acquired. Based on this information, the configuration of all target ports constituting a multipath of a volume can be determined. However, since the association of the WWPN of the target port as an entity of the RTPI information is only stored in the Device Identifier VPD page of the Inquiry information, it is necessary to issue an Inquiry to all target port paths.

In the case of a host multipath supporting Referral and supporting Referral based on the information acquired from a volume, and wherein the AAS state of the TPG is in LBD state via the Report TPG command, the host issues a SCSI Report Referral command. According to this process, the start LBA, the end LBA, the number of accessible TPGs and the states thereof of all UDS can be acquired. Optionally, a Mode Sense/Mode Select command is issued, and a D_SENSE flag validating the Referral Sense Data response of the Control mode page (0x0A) is set (S3606). These commands and information are based on a format determined by SCSI standard, so the descriptions thereof are omitted.

Next, if there are other volumes (Yes), the host repeatedly performs the steps of S3605 through S3607. When recognition of all volumes has been completed (No), the procedure advances to the next step (S3607). Then, if there are other target ports (Yes), the steps of S3603 to S3608 are repeatedly performed. When recognition of all target ports has been completed (No), the procedure advances to the next step (S3608). Thereafter, if other host initiator ports exist in a redundant system configuration or the like (Yes), the steps of S3601 to S3609 are repeatedly performed. When recognition of all volumes has been completed (No), the procedure advances to the next step (S3609).

Finally, the host registers the acquired information in the host TPG information and the host Referral information to each of the volume name identifier (LU Name) (S3610). Thereby, preparation for acquiring information necessary for issuing an IO of the entity volume or the distributed virtual volume of the virtual storage device is completed, and IO can be issued.

Now, during these steps, when the host administrator performs an operation for volume re-recognition after a volume has been created by the administrator of the virtual storage device (FIG. 35), all necessary information can be performed by the HBA driver program and the multipath program of the host to complete the settings of various information tables, and IO can be issued automatically.

Figure 37:
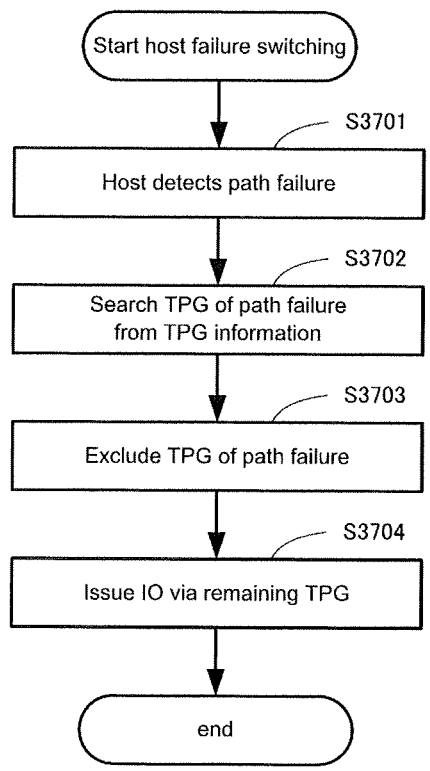
FIG. 37 is a flowchart showing a fail-over processing.

FIG. 37 is a flowchart showing a fail-over operation of the host multipath software in response to a storage port failure or a SAN failure. It is assumed that the storage device has two or more paths set with respect to a UDS of a volume and that a redundant structure is adopted.

At first, the host detects some type of path failure. The failure can be detected, for example, when a response is not returned within a given time-out time when an IO is issued, a cable coupling disconnection event is received, or a target port of the IO destination cannot be found since the topology has been changed via the RSCN (Register State Change Notification) response from the SAN switch (S3701).

Next, the host multipath software searches the TPG number of the target port where failure has occurred from the TPG information (S3702). Next, the host multipath software changes the AAS of the relevant entry of the TPG information of the TPG number experiencing path failure from LBD state to Offline state, for example. The Offline state is an AAS where no SCSI command can be issued (S3703).

Lastly, the host multipath software issues an IO from the remaining TPG in an LBD state which are not in an Offline state. Now, the host multipath software can refer to the host TPG information updated by the occurrence of failure to recognize the unusable TPG number. Therefore, even if the TPG number experiencing failure is in a usable AAS state by referring to the host Referral information, the program determines that the TPG number cannot be used by prioritizing the Offline state of the host TPG information. Thereby, the SCSI IO can be continuously issued by all UDS in the volume using a path other than the path of the excluded TPG number set to Offline state (S3704).

Thereby, the host can perform failure processing speedily by rewriting the AAS of the host TPG information which is a table having a small capacity so as to exclude the path experiencing failure without having to rewrite the host Referral information which is an enormous table.

Figure 38:
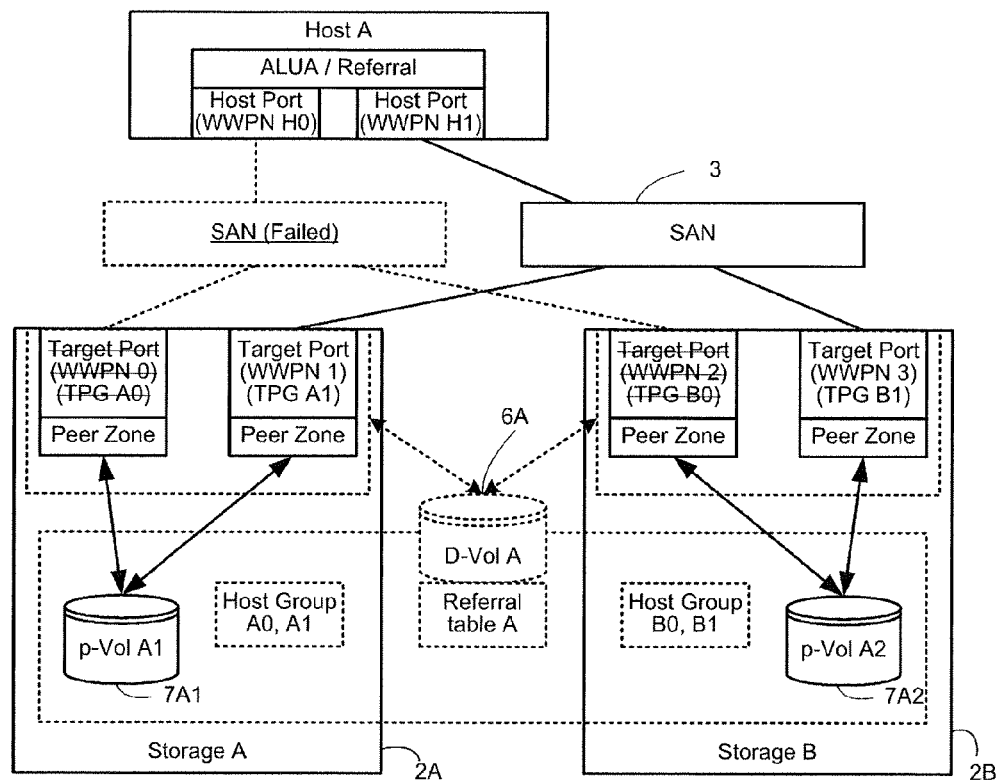
FIG. 38 is a block diagram illustrating one example of configuration of the virtual storage device and management information.
Figure 39:
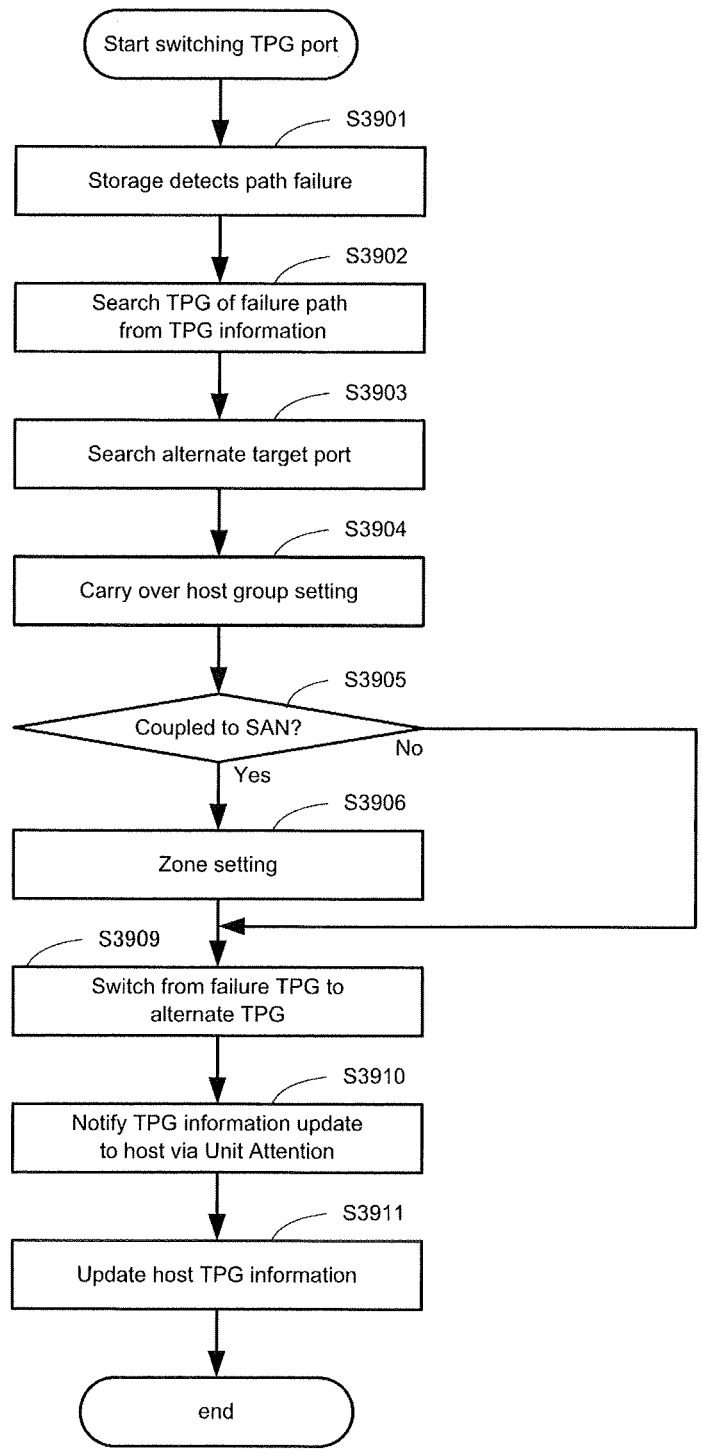
FIG. 39 is a flowchart showing the operation for searching and switching to an alternate port of the storage device.

FIG. 38 is a view illustrating one example of a failure recovery processing described with reference to FIG. 37. The view shows the change of host TPG information before and after occurrence of failure. Now, if the alternate path after switching is a physical storage that differs from the storage destination of the UDS, the host ID is routed to a given physical storage device using the communication path. The routing operation of the issued host IO is similar to the path described with reference to FIG. 31. FIG. 39 is a flowchart illustrating the searching and switching operation of an alternate port of the storage device with respect to storage port failure and SAN failure.

At first, a path failure is detected by one of the plurality of physical storage devices constituting the distributed virtual volume. The failure is detected for example by the physical storage device receiving an RSCN notification from the SAN switch or by detecting a Link failure error and the like (S3901). Thereafter, the storage device searches the TPG of the failure path from the TPG information of the storage device (S3902).

Next, the multipath program of the storage device searches an alternate target port. As for the means of searching, if the storage device is coupled to a SAN, whether the port belongs to a same fabric or not is compared using Fabric WWN based on the login information. Zone setting is performed in a later step, but if the port does not belong to the same fabric, communication cannot be performed with the host even if the zone setting is performed. If direct coupling is adopted, the program searches whether the port is of a same host or not based on the FDMI (Fabric Device Management Interface) information (HBA and Host, OS information) from the host (S3903). If an alternate port does not exist based on this step, the present flowchart is ended without switching to the alternate path. If an alternate port is found, the procedure advances to the next step.

Next, the multipath program of the physical storage device carries over the host group setting to the alternate target port (S3904). Next, the multipath program of the physical storage device determines whether the alternate path is coupled to a SAN (S3905). When the path is coupled to a SAN, the procedure advances to the next step, where zone setting is registered using a Peer Zone request, and setting is performed so as to enable communication between the host and the alternate target port (S3906). When the path is not coupled to a SAN (No), the procedure advances to S3909.

Next, the multipath program of the physical storage device switches the TPG information of the storage device from the target port information of the failure path to the information of the alternate target port in order to switch to the alternate target port (S3909).

Thereafter, the multipath program of the physical storage device returns a SCSI Check Condition response in synchronization with the SCSI IO of the host, and notifies that the TPG information on the storage device side has been updated (S3910). This SCSI Check Condition response is, for example, the ASC/ASCQ of Unit Attention (Sense Key=0x6) set to Asymmetric Access State Changed (2A/06).

Next, the host multipath software determines that the TPG information of the storage device has been changed from the response of the aforementioned step, by which the host issues a SCSI Report Target Port Group command and updates the host TPG information. At this time, the TPG number is the same, but the associated RTPI and WWPN differ. Therefore, by updating the host TPG information without having to update the whole host Referral information, the path can be switched from the failure path to an alternate path, and there is no more any need to communicate the enormous Referral information table.

Now, if the Referral information itself should be updated, a response code for notifying update of the storage Referral information should be newly defined and responded to the ASC/ASCQ of Unit Attention (sense key=0x6) of the SCSI Check Condition response, for example.

Figure 40:
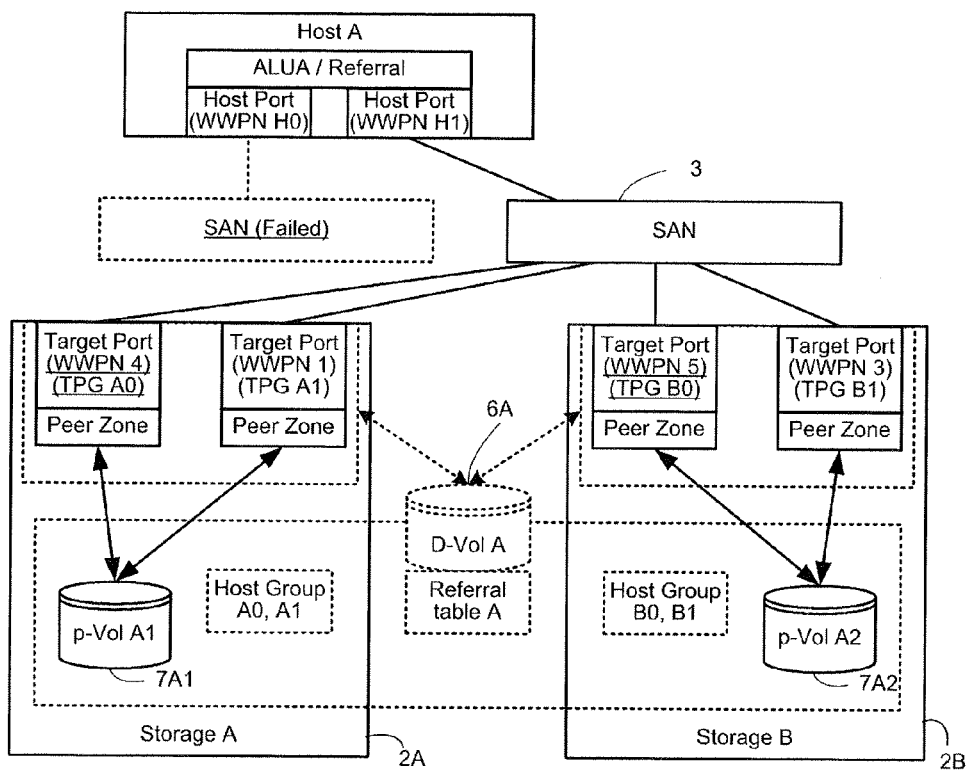
FIG. 40 is a block diagram illustrating one example of configuration of the virtual storage device and management information.

FIG. 40 is a view illustrating one example of the failure recovery processing described in FIG. 39. FIG. 40 shows the change in host TPG information before and after occurrence of failure. With reference to FIG. 40, the fail-over operation by switching ports of the storage device in response to storage port failure or SAN failure will be described. It is assumed that the storage device has two or more paths set with respect to the UDS of a volume, and that a redundant structure is adopted. When the host detects failure, the operation illustrated in the flowchart of FIG. 37 is performed.

It is assumed that one of the SAN of the redundant configuration has failed, and WWPN 0 which is the target port of the physical storage device A and WWPN 1 which is the target port of the physical storage device B cannot be used (state of FIG. 38).

Generally, the storage device has a large number of target ports and communication ports among storage devices which are coupled to the same fabric, and the usable host is restricted via access control such as SAN zoning. By adopting Peer Zoning, it becomes possible to switch ports to realize a new alternate path when failure occurs. Actually, it becomes possible to switch the relationship of TPG and WWPN to other storage device ports until the path of WWPN 0 and WWPN 2 experiencing failure is restored.

The TPG number A0 of the TPG information of the storage device is switched from the access permission to WWPN 0 where failure has occurred to the access permission to WWPN 4 which is a target port of storage device A (FIG. 40). Similarly, the TPG number B0 is switched to WWPN 5 which is a target port of storage device B. By changing the AAS to LBD and notifying a Unit Attention response to the host to update the TPG information of the host (table of bottom area of FIG. 40), the ports can be switched by updating only the TPG information without having to update the Referral information of the storage device and the host. Thereby, even when a port failure of the storage device after the failure of the SAN occurs, the system can correspond to such failures.

Further, the switch destination storage device can either be inside or outside the physical storage device. The reason for this is since even if the physical storage device in which the UDS is actually located differs from the storage device in which the target port exists, the host IO can be routed to a given physical storage device via a communication path as illustrated in FIG. 31 to continue the host IO.

Based on the control illustrated in FIGS. 37 through 40, the failure tolerance of the distributed virtual volumes can be exerted by minimizing the IO interruption time and maintaining redundancy without having to update the enormous Referral information that the host and the storage store.

Now, the relationship of the present invention with respect to the storage device functions will be described. FIG. 41 shows a page management information 1106 for realizing functions of capacity virtualization (Thin Provisioning) and tier migration in page granularity in a distributed virtual volume. This information is managed within the physical storage device. In the case of a distributed virtual volume, the information is associated with the Referral information shared among storage devices. In FIG. 41, only the example of the distributed virtual volume is illustrated for sake of simplification, but a configuration can be adopted in which the volume is mixed with a entity volume.

The page management information 1106 has entries of a physical storage number, a pool number, a pool media type, a page number, a page address (start/end), an internal LU number unique within the virtual storage device and a UDS number associated with the Referral information. The physical storage number is a number assigned uniquely for each physical storage device.

A pool number is a number assigned uniquely within the physical storage device. A pool is an actual domain for capacity allocation for each storage media in page allocation for realizing the capacity virtualization function and the page tier migration function described later. Each page information has metadata, and as one metadata, the information on whether the page is allocated or not is retained (not shown in FIG. 41).

The pool media type stores a type for identifying a volume having a difference in performance for realizing the page tier migration function mentioned later. For example, the type of the storage media can be stored, or information classifying the media by performance indexes can be stored.

A page number is a number for identifying the pages uniquely allocated within the pool. The page size can be variable or can be a regular size. In order to facilitate tier management of the pages, the size can be the same among the pools. In order to reduce management tables, the capacity per page can be varied within each pool.

The internal LU number is a number having been explained with reference to FIGS. 12A through 12C. The UDS is the number of UDS of the Referral information explained with reference to FIGS. 16A, 16B and the like. The UDS is unique within a distributed virtual volume and must be arranged in order of LBA. This is because the information must be arranged in order of LBA when returning the Referral information to the host. Thereby, the page management information is associated with the UDS information.

Figure 42:
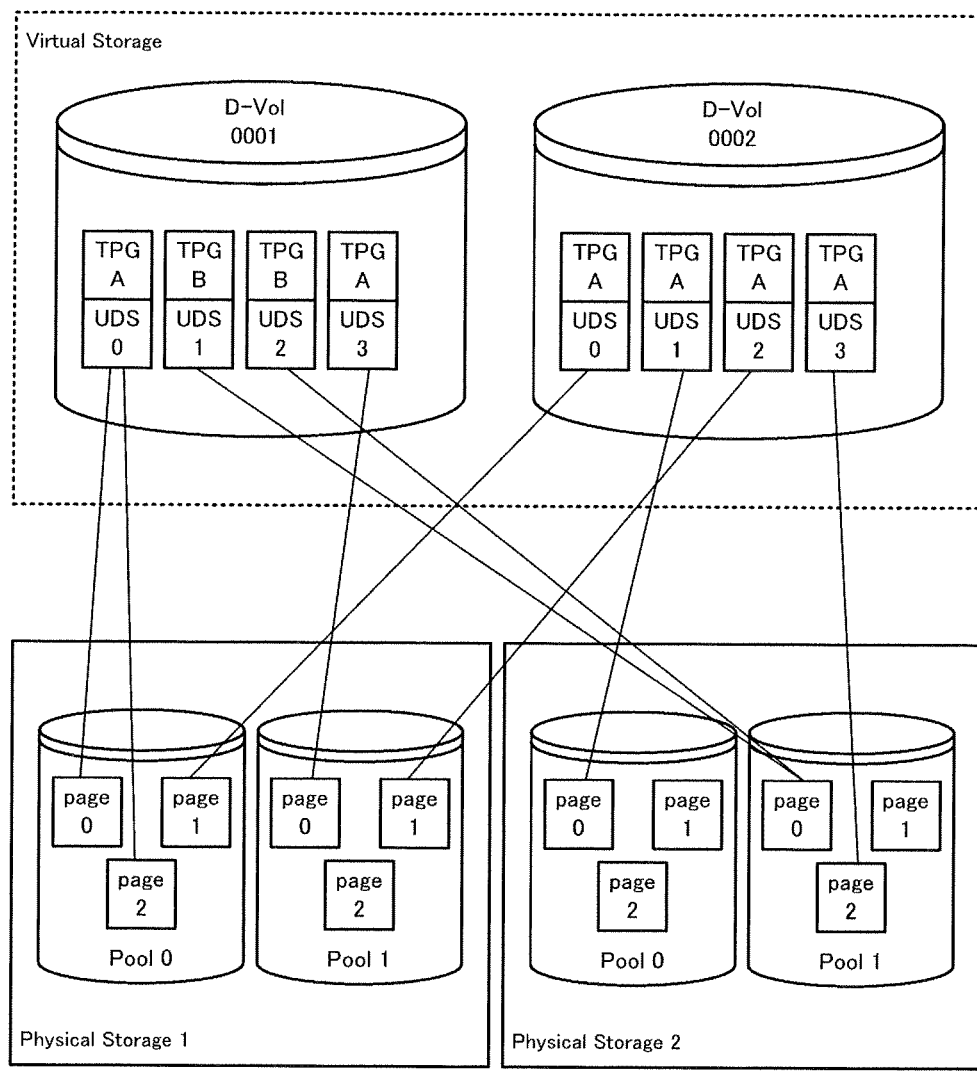
FIG. 42 is a block diagram showing the page management information.

FIG. 42 is a view illustrating one example of the corresponding relationship of information of FIG. 41. It illustrates the relationship between the UDS in the distributed virtual volume of the virtual storage device and the pages within a pool having a physical storage area within the physical storage devices.

A UDS can retain a plurality of pages, or a page can be retained astride two UDS. However, the two UDS must be linked when updating information if a domain is allocated or tier migration is performed. Further, a UDS can be formed of a page within a pool formed astride physical storage devices. However, since the host sends an IO request to the target port having the TPG number associated with the UDS, the IO request must be routed appropriately among physical storage devices. It is also possible to assign a plurality of pools having a plurality of media types to a UDS.

Figure 43:
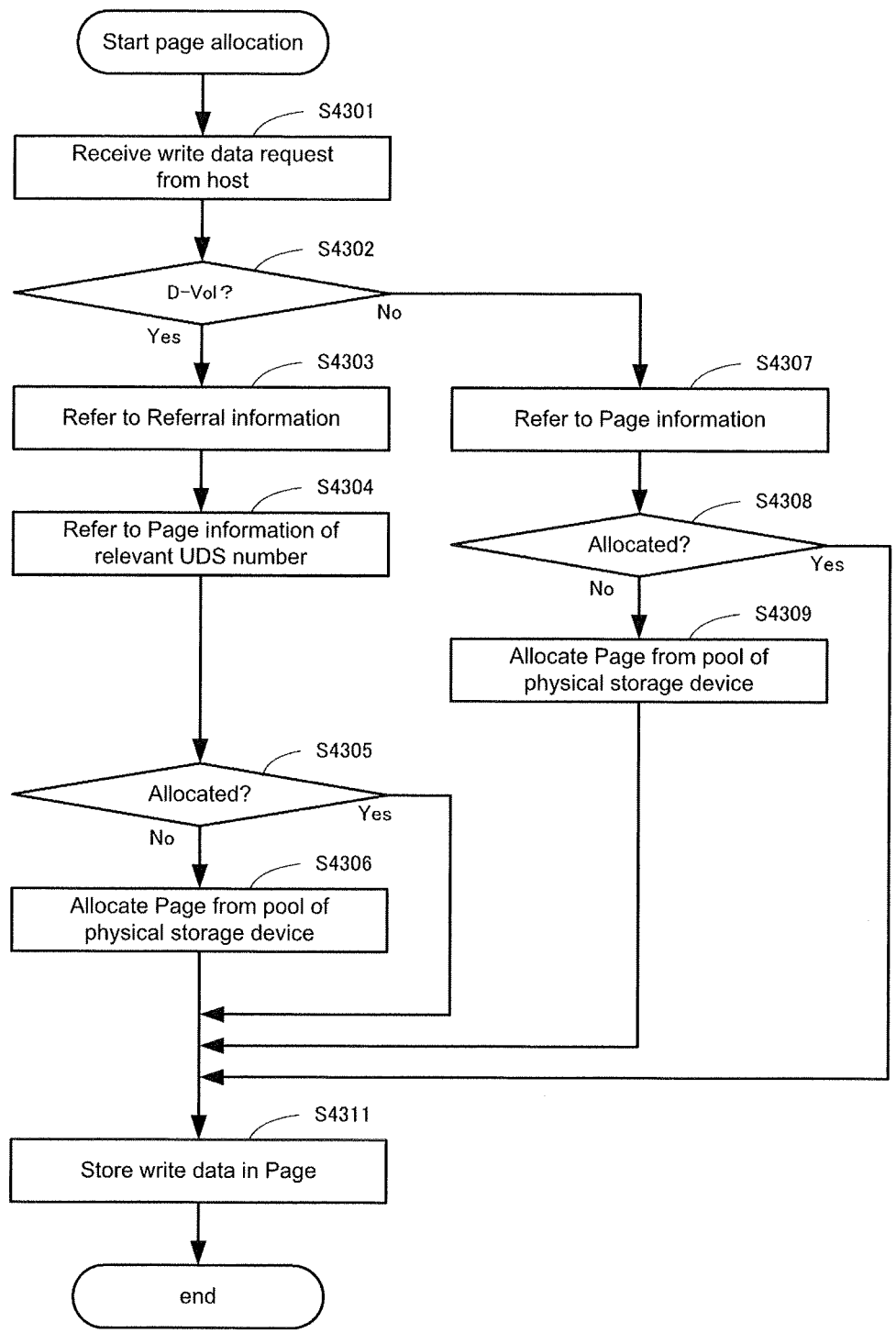
FIG. 43 is a flowchart illustrating a write request processing.

FIG. 43 is a flowchart of a write request in a capacity virtualized volume. At first, the physical storage device receives a write request from a host (S4301). Then, the physical storage device searches an internal LU number from the write command from the host, and determines whether the volume is a distributed virtual volume or not (S4302). If the volume is a distributed virtual volume, the procedure advances to S4303, and if not, the procedure advances to S4307.

Next, based on the LBA of the write request, the physical storage device refers to the Referral information of the distributed virtual volume and searches the UDS number (S4303). Further, the physical storage device determines whether a Page is unallocated or not by referring to the Page information using the UDS number (S4304). At this time, it is also possible to search the Page information directly from the LBA of the write request to confirm the UDS number and determine whether a Page is unallocated or not (S4303 to S4304). If the corresponding UDS Page is already allocated, the procedure advances to S4311. If not, the procedure advances to S4306.

Thereafter, in S4306, a pool is selected for allocating a page to the UDS. The pool can be a pool area of a different storage device constituting the distributed virtual volume. In that case, the path for issuing the IO adopts the routing path as illustrated in FIG. 31. After page allocation, the procedure is advanced to S4311 (S4306). Thereafter, write data is stored in the page number allocated in S4304 and S4306 (S4311).

If it is determined in S4302 that the volume is not a distributed virtual volume (but a normal entity volume), the physical storage device refers to the page information in S4307 and determines whether a page is already allocated or not (S4308). If a page is not allocated, a page of a pool of the physical storage device is allocated in S4309 and the procedure advances to S4311. Now, a capacity can be allocated from a pool of a different storage device using the Referral information managed within the physical storage device. When a page is already allocated, the procedure advances to S4311, and stores the write data in the storage destination page number of S4307.

A read request differs from the processing of the write request when the area is unallocated. When the area is unallocated, an unallocated block is referred to, and a predetermined specific value (such as all zero information or an initial value of a specific format pattern information designated when the volume is created) is generated as data and sent to the host, while maintaining the unallocated block.

Figure 44:
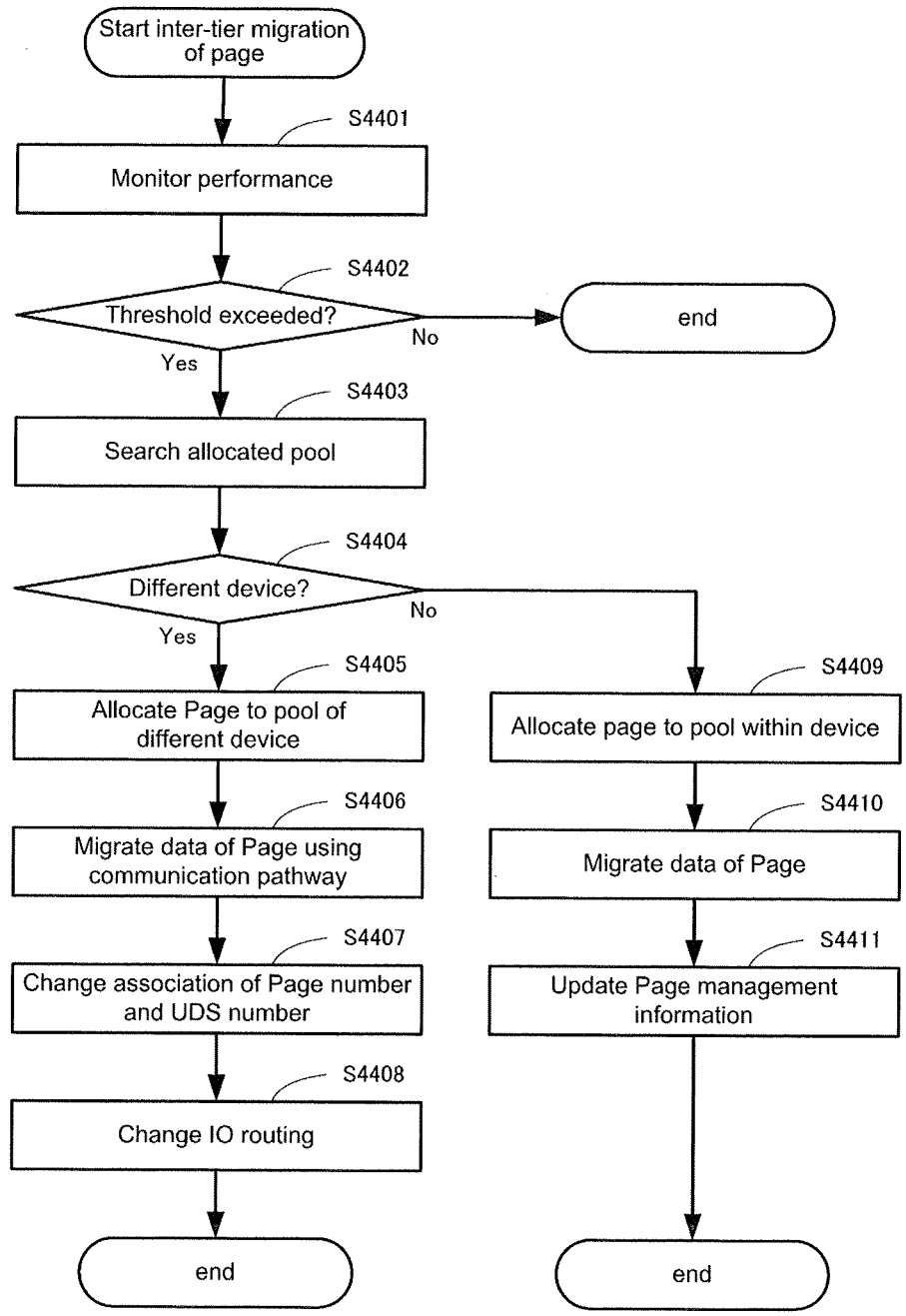
FIG. 44 is a flowchart showing page migration.

FIG. 44 is a flowchart of page migration when the function for tier migration of a page data among pools is adopted. At first, the storage device monitors the performance in page granularity and stores the same in a page information (S4401). When the monitored value exceeds a threshold value (Yes in S4402), the inter-pool migration of a page is started. As for a page not having exceeded the threshold, the processing is ended without performing page migration (No in S4402).

Now, the conditions for determining the threshold value will be described. There are cases where it is determined that higher performance is required and where it is determined that access rarely occurs and data is migratable to a pool having a lower performance. Examples of the performance includes the port throughput, the performance of the processor within the storage device, the transaction performance and so on. When an IO routing path as shown in FIG. 31 occurs in a distributed virtual volume, the performance of the communication path coupling the storage devices is also considered.

Next, an allocatable pool is searched. When a higher performance is required, an allocatable pool is searched from the pools having a superior performance based on media type (S4403). If capacity is insufficient, the pool is searched from a different physical storage device. If the pool is determined to belong to a different physical storage device based on the search, the procedure advances to S4406 (S4404).

Next, we will describe a case where a pool is allocated to a different storage device. The physical storage device allocates a migration destination page in a pool of a different physical storage device (S4405). Thereafter, data is migrated from a migration source page to a migration destination page among storage devices through the communication path 16. At this time, when a new write data is received, both the migration source page and the migration destination page are updated to maintain consistency (S4406). Then, the storage device changes the association between the page number of the page information and the UDS number (S4407).

Next, the physical storage device of the relevant UDS number of the Referral information is changed and the IO routing path is updated (S4408). Lastly, the page storing the page number of the migration source page number is released so as to release the allocation of the migration source page (the entries of UDS information and the LU number in FIG. 41 are deleted), and the page is returned as an unallocated page to the pool.

Next, an example of assigning a pool to the same storage device will be described. The physical storage device allocates the migration destination page to the pool within the physical storage device (S4409). Next, data is migrated from the migration source page to the migration destination page within the storage device. If a new write data is received at this time, both the migration source page and the migration destination page are updated to maintain consistency (S4410). Next, the storage device changes the association between the page number and the UDS number of the page information (S4411).

Figure 45:
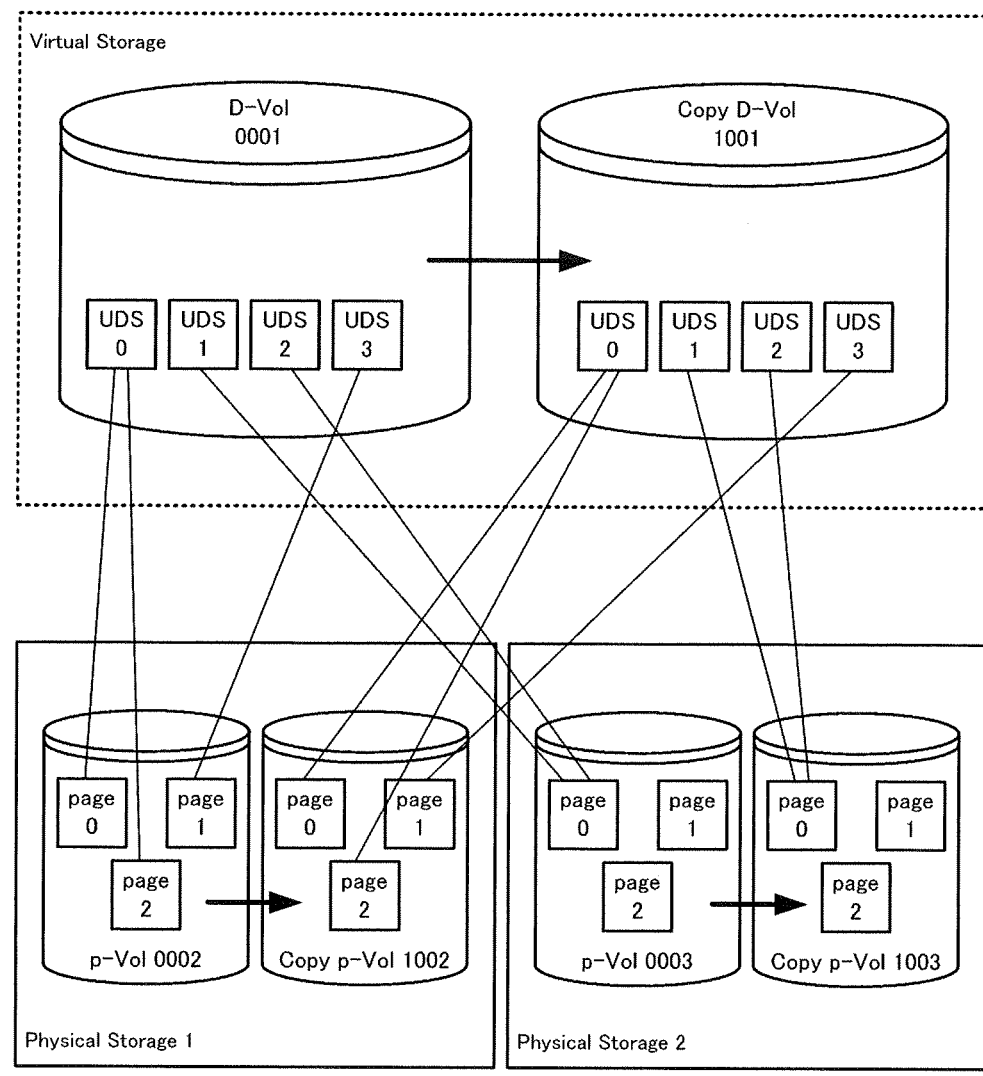
FIG. 45 is a block diagram showing one example of the relationship of distributed virtual volumes and partial volumes having applied a volume copy function and a snapshot function.
Figure 46:
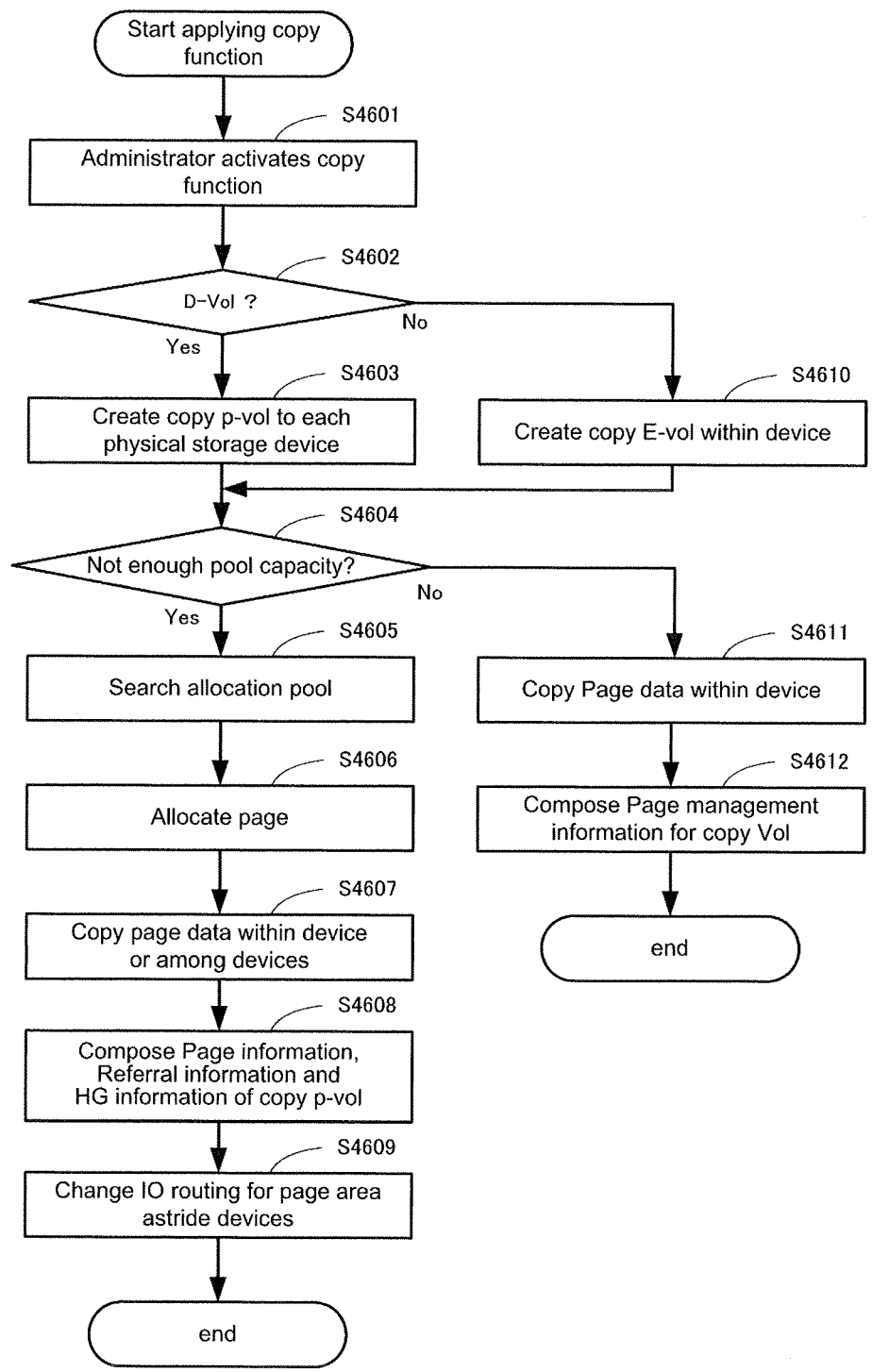
FIG. 46 is a flowchart showing a distributed virtual volume processing having applied a volume copy function and a snapshot function.

FIG. 45 is a view showing the relationship between the distributed virtual volumes and the partial volumes in the case where the volume copy function for copying the entity volume or the snapshot function for retaining the update history of the write data of a portion of the volume are applied to the distributed virtual volume. FIG. 46 is a flowchart of the example where the volume copy function for copying the entity volume or the snapshot function for retaining the update history of the write data of a portion of the volume are applied to the distributed virtual volume.

An example is illustrated in which the volume copy function is applied to the distributed virtual volume. The flow is also similar in an example in which the snapshot function is applied, the only difference being that the volume being created is a volume for managing the history of the write data instead of for copying the whole volume. Therefore, the flowchart for validating the snapshot function will be omitted.

First, the administrator of the virtual storage device activates the distributed virtual volume function (S4601). Thereafter, the virtual storage device determines whether the volume is a distributed virtual volume or not (S4602). If the volume is a distributed virtual volume, the procedure advances to S4603. If not, the procedure advances to S4610.

Next, in the case of a distributed virtual volume, each physical storage device creates all the partial volumes constituting the distributed virtual volume with a corresponding relationship with the partial volume of the copy destination of the partial volume. Further, a distributed virtual volume of the copy destination partial volume is created, which is registered to the volume information (FIGS. 12A through 12C) and distributed as shared information to all storage devices (S4603). Thereafter, the procedure advances to S4604.

If the volume is not a distributed virtual volume, a entity volume for copying is created within the storage device (S4610). Next, the procedure advances to S4604. Next, in S4604, the virtual storage device checks whether there is enough pool capacity of the physical storage device. If there is not enough capacity, the procedure advances to S4605. If not, the procedure advances to S4611.

Next in S4605, [the system] searches an allocation pool including the other physical storage devices. Now, since the page allocation of the partial volume of the physical storage device is allocated from the pool of other storage devices, regarding the IO received from the host as shown in FIG. 31, the host IO path routing must be changed using the communication path between storage devices. Next, pages having necessary capacities are each allocated from the pool of a different storage device being searched and the pool allocated within the storage device (S4606).

In the subsequent procedure, according to the snapshot function, each time an update data is received from the host the history information and the update data history is stored in response to the host IO, so that volume copy is not necessary at this time. Further, each time the host issues a write request, the information and data regarding the history of write data is stored and the various information are updated.

Next, the copy source distributed virtual volume data is copied within a storage device or among storage devices. At this time, it is possible to copy only the effective storage data in page granularity, or if the capacity allocation virtualization function is invalid, all the data can be copied (S4607).

Next, the allocation destination page information of the partial volume as the volume copy destination is composed for each physical storage device. Thereafter, the host group information associated with the partial volume of the copy source distributed virtual volume is copied. Further, regarding the copy destination partial volume, the Referral information is copied. Since the allocation of Pages may differ from the copy destination distributed virtual volume, the association between the Page information and the Referral information is changed if necessary. This is because the Page information differs from the Page information of the copy source due to lack of capacity or capacity allocation from other pools. According to each information formed to the copy destination volume, the association between the copy source volume and the copy destination volume mentioned later is switched, which is used when enabling the host to write data to or read data from the copy destination volume (S4608).

Next, regarding the area where page allocation has been performed from a pool astride storage devices, the IO issue path is changed as shown in FIG. 31, and the physical storage device location of the Referral information is updated so that the host IO is routed to the allocation destination page (S4609).

Next, we will describe an example in which the capacity is allocated within the physical storage device. In S4611, data is copied from the entity volume within the storage device or from the partial volume within the storage device to the created copy destination volume (entity or partial volume). At this time, it is possible to copy only the stored data effective in page granularity, or if the capacity allocation virtualization function is ineffective, all the data can be copied (S4611). At this time, in the case of a snapshot function, since the history information and the update data history is stored in response to the host IO whenever an update data is received from the host, volume copy is not necessary at this time. Various information should be updated each time a write request is received.

Next, the allocation destination Page information of the volume copy destination partial volume is created. Thereafter, the host group information associated with the partial volume of the copy source distributed virtual volume is copied. In the case of a partial volume, the Referral information is copied to the copy destination partial volume. Since the Page allocation may differ from the page allocation of the partial volume of the copy source distributed virtual volume or the page allocation of the entity volume, the association between the Page information and the Referral information is changed if necessary (S4612). Thereby, the volume copy function and the snapshot function of the distributed virtual volume can be validated.

Figure 47:
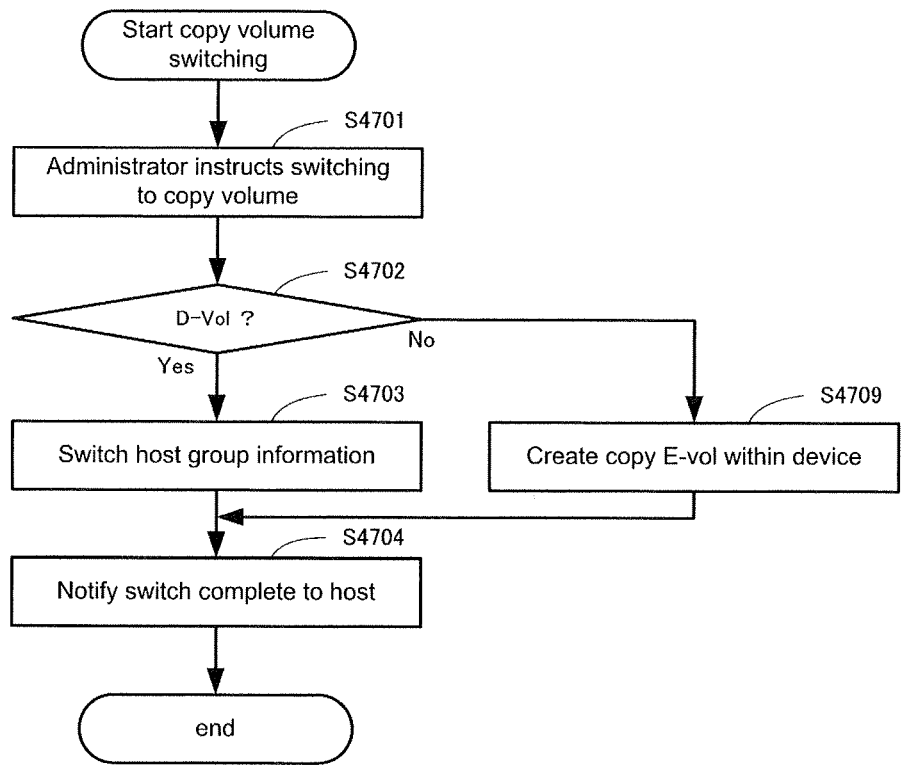
FIG. 47 is a flowchart showing a process for switching volumes being copied.

FIG. 47 is a flowchart in which the copy source and copy destination volume are switched as the volume capable of being accessed from the host in the volume copy function. At first, the administrator switches the volume capable of being accessed from the host from the copy source volume to the copy destination volume. At that time, the storage device is linked with the file system of the host or the like to have a quiescent point of the volume so as to maintain a consistent state of the copy destination volume with respect to the fie system and the application (S4701).

Next, the virtual storage device determines whether the volume is a distributed virtual volume or not. If the volume is a distributed virtual volume, the procedure advances to S4703, and if not, the procedure advances to S4709. Next, the internal LU number registered as host group information is switched from the internal LU number of the distributed virtual volume of the virtual storage device to the internal LU number of the distributed virtual volume created in the interior of the virtual storage device. Thereby, the switching can be performed by changing only the information of the distributed virtual volume without having to change the whole partial volume settings of the distributed virtual volume (S4703).

Further, since the host group information has already been copied in the flowchart described with reference to FIG. 46, the host can immediately access the copy destination distributed virtual volume even after the volume has been switched as accessible volume from the host.

Next, the internal LU number registered as host group information is switched from the internal LU number of the entity volume of the physical storage device to the internal LU number of the entity volume. Correspondence is enabled by merely changing the information of a physical storage device (S4709).

Figure 48:
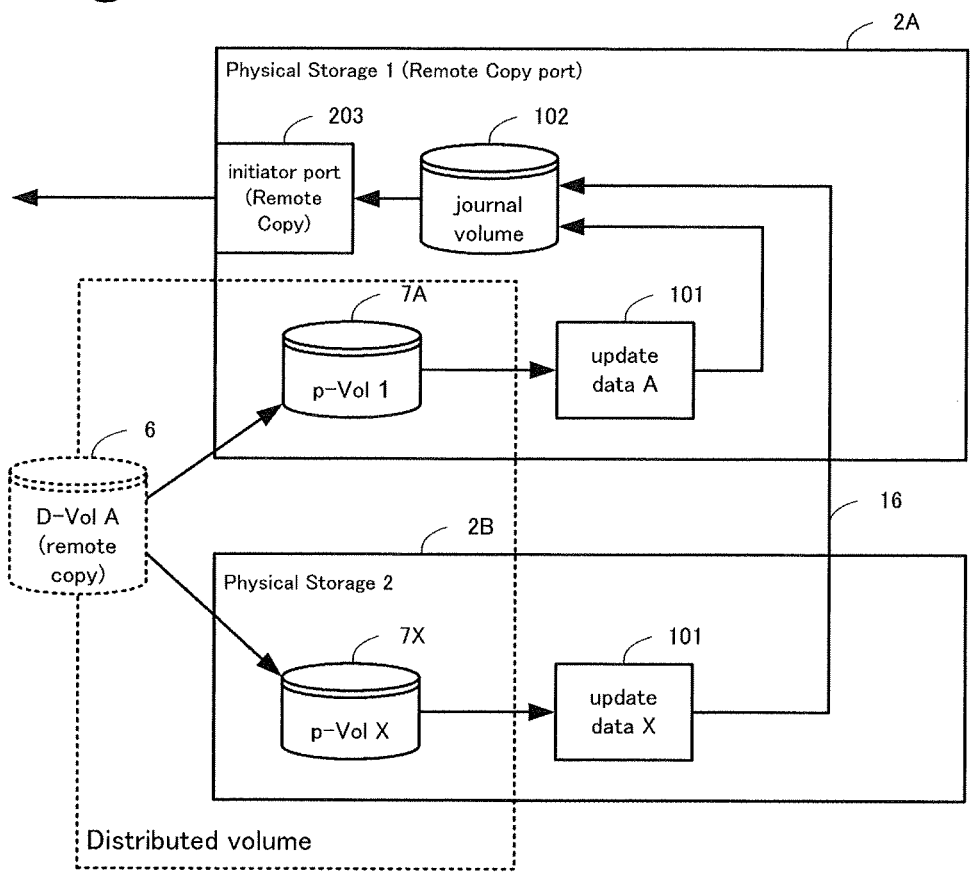
FIG. 48 is a block diagram showing one example of configuration of the virtual storage device having applied a remote copy function.

FIG. 48 is a view showing a load distribution method in a real volume in which the remote copy program is operated. A remote copy has a journal volume and an initiator port for communicating with a pair storage device located in a remote site. When update data is generated, the data is temporarily stored in the journal volume and the update data 101 is transferred asynchronously to the remote site. Even when a method is adopted in which the communication is performed synchronously without having the journal volume intervened, an initiator port of a representative storage device is required.

Since the initiator port is coupled to a peripheral long-distance communication system (extender), it is difficult to perform load distribution and a system administrator is required. The distribution of control load of the journal volume can be realized by handling the journal volume itself as a distributed virtual volume.

Figure 49:
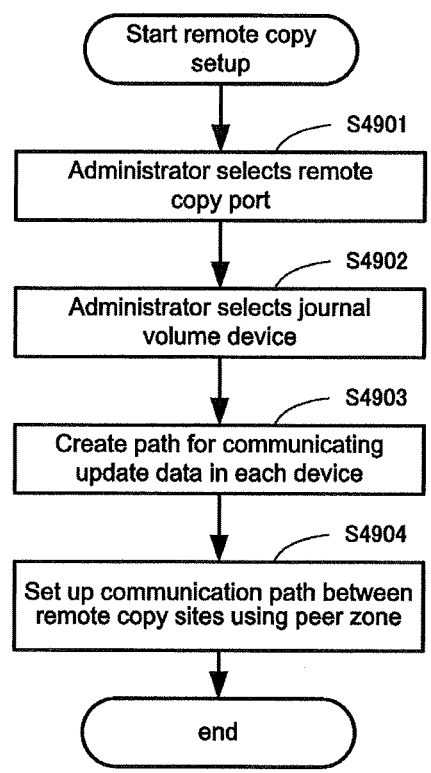
FIG. 49 is a flowchart showing the distributed virtual volume processing having applied the remote copy function.

FIG. 49 is a flowchart showing an example where a remote copy is set up in the distributed virtual volume. At first, the administrator selects a remote copy port to the representative physical storage device (S4901). At this time, it is possible to select a remote copy port of a physical storage device, or the distributed virtual volume can be set up for all the physical storage devices constituting the distributed virtual volume. This operation is performed in two sites.

Next, if it is necessary to acquire the order of update time of the write data from the host, a journal volume is created in the representative physical storage device. The journal volume can be distributed as a distributed virtual volume, but in the present configuration, a mechanism for maintaining the update order must be selected as the representative storage device (S4902). This operation is performed in the local site.

Next, each physical storage device selected as a remote copy port creates a path for communicating update data to the journal volume (S4903). This sequence is performed only in a local site. When the remote site journal volume is also a distributed virtual volume, the process is also performed in the remote site.

Next, in order to establish a communication path of remote copies between sites, an inter-site communication path is established using a Peer Zone. If an FC router having an FC routing function such as an extender exists in midway of the path, the FC routing setting is performed at first, the port for performing communication between fabrics of two sites is set up as a proxy port, and the remote copy port is set to be visible from both sites (S4904).

Moreover, in S4904, by transmitting the FC routing attribute together to the Peer Zone format, it is possible to perform the setting of the FC routing from the storage. Actually, after the administrator sets up the FC routing path to the FC router, the fabric ID of the other fabric is registered to the local site virtual storage device. A similar setting is performed in the remote site. Thus, by selecting the communication destination fabric ID during the remote copy port setting, and transmitting the attribute of the router proxy port visible to the other fabric by expanding the Peer Zone attribute, the FC router having received the setting can automate the setting for showing the proxy port to the corresponding fabric.

Figure 50A:
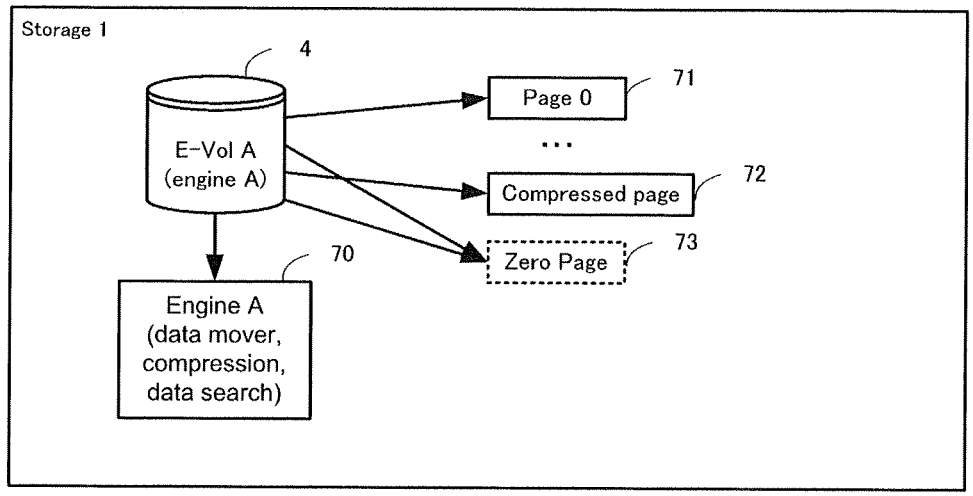
FIG. 50A is a block diagram showing one example of configuration of the distributed virtual volume having applied a data compression function.
Figure 50B:
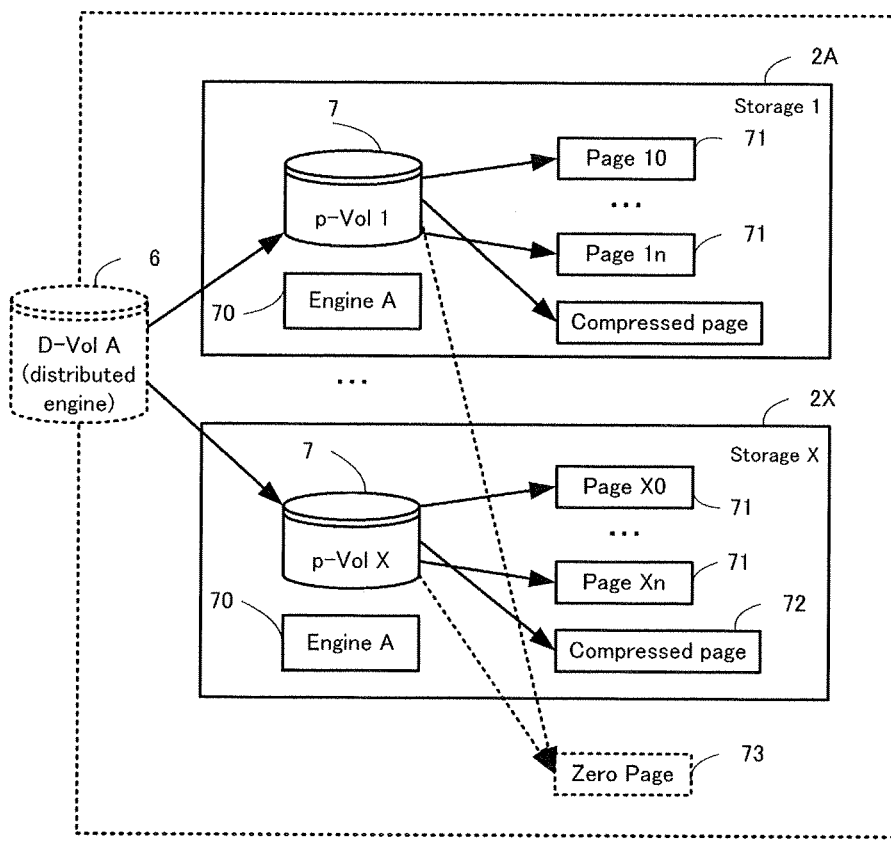
FIG. 50B is a block diagram showing one example of load distribution of a real volume of FIG. 50A.

FIGS. 50A and 50B are drawings showing an example where load distribution is performed when activating a function with respect to the system of a plurality of storage devices having a data compression function. The present example is restricted to a case where the function program within the storage device can be activated in the storage device in which the partial volume 7 is located. Actually, the data page 41 stored in the partial volume is not in dependent relationship with the data page 41 of the partial volume 7 of other storage devices. Since the definition of a format page (shown as Zero Page in the drawing) 73 accompanying capacity allocation is the same from all storage devices, it is not necessary to perform a special process by communicating data among storage devices.

FIG. 50A is a configuration example showing an interior of the storage device for activating the compression function in the real volume 4. Compression of data of the real volume 4 stored in the storage device is executed by an engine 70. The engine is assumed by a control unit in the storage device.

FIG. 50B is an example in which the real volume 4 of FIG. 50A having the compression function activated is subjected to load distribution. If the storage device detects engine 70 as the performance bottleneck, the real volume 4 is converted to a distributed virtual volume 6, and the data processing of one or more partial volumes is subjected to load distribution in a plurality of storage devices. Thereby, the load of the real volume 4 requiring an engine 70 having a high processing load and requiring bandwidth is subjected to load distribution in a plurality of storage devices, by which the performance of the volume can be improved.

Now, we will describe a method for splitting a distributed virtual volume to a plurality of partial volumes after converting a real volume to a distributed virtual volume. When it is determined that the processing ability (bandwidth) for data storage processing and data copy processing is not insufficient, there is no need to perform distribution arrangement of the real data in a plurality of storage devices. However, if the processing and calculating processing of data is insufficient or if a greater cache memory is required, the partial volume is mounted in a virtual volume and a structure for using the resources of other storage devices is adopted without migrating the storage media of the data storage destination.

If the bandwidth is not enough or a data storage destination storage media of higher speed is required, the splitting of a partial volume belonging to a distributed virtual volume is determined by judging whether a capacity belongs to other storage devices and whether a load distribution effect is exerted when data is migrated.

When the storage device determines that the processing ability will not be improved if real data is not migrated, the split partial volume data belonging to the distributed virtual volume is migrated to the storage device of the load distribution destination. Also according to this example, not all the data of the storage device originally storing the real volume 4 is migrated.

If a portion of the real data is migrated to other storage devices as partial volume, it is necessary to perform calculation of the capacity of the migration destination storage device. If there is enough capacity in the migration destination storage device, migration is started.

If load distribution is necessary but a migration destination storage device satisfying the required performance and required capacity does not exist, the split level of the distributed virtual volume is fined down, or only the data having a high reference frequency is migrated, so that only the data of the storage tier contributing to enhancing the performance is migrated with priority.

If satisfactory capacity and performance could still not be achieved, the storage device prompts the administrator to add the capacity of a specific storage device, add the resource of a specific storage device or add another storage device to the whole system. The details of the present flowchart will be described in detail.

Figure 51:
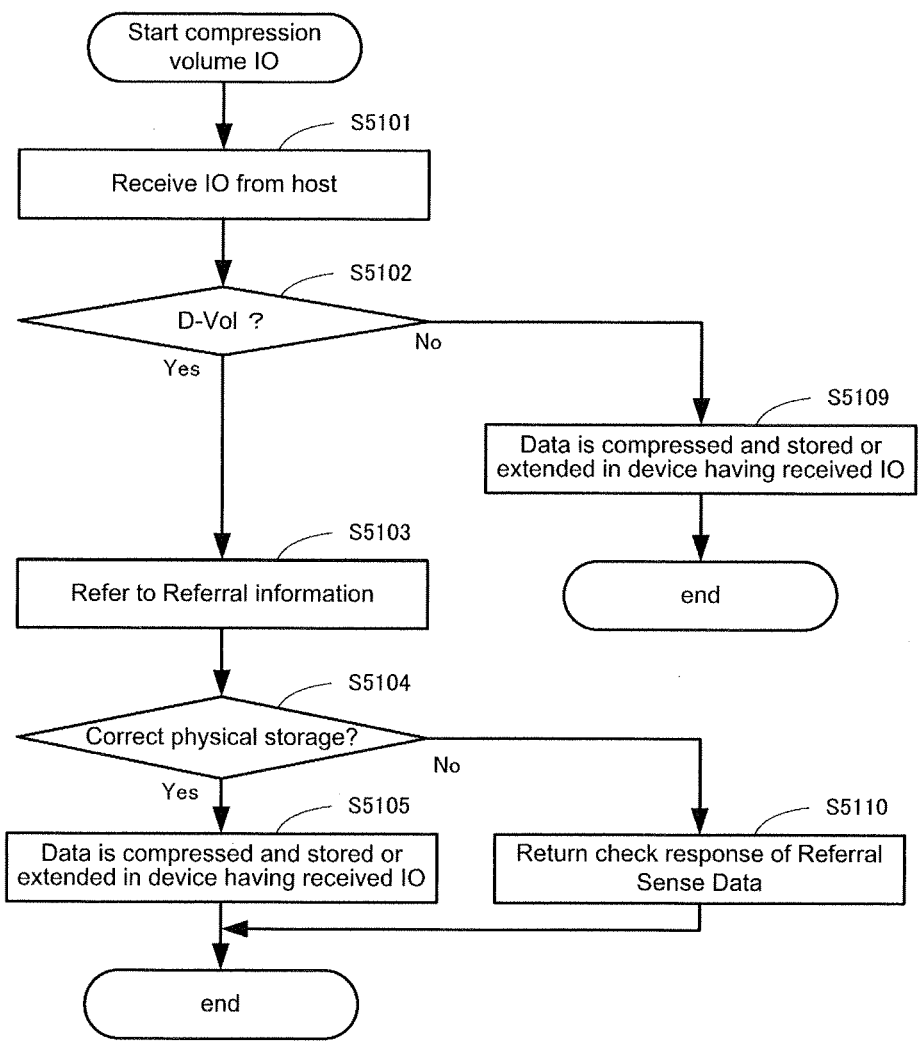
FIG. 51 is a flowchart showing a distributed virtual volume processing having applied a data compression function.

FIG. 51 is a control flowchart of a physical storage device when an IO is received from the host in a compression volume. At first, the physical storage device receives an IO from the host (S5101). Next, the physical storage device determines whether the received IO is a distributed virtual volume or not (S5102).

At this time, when the volume is not a distributed virtual volume, the storage device having received the IO executes the IO. If the IO request of the host is a write request, the storage device compresses the data, and if the data size is reduced, the result is stored in the area allocated within the capacity pool. If the data size is increased, the capacity necessary to store the non-compressed data is allocated in the capacity pool, and the non-compressed data is stored therein. If the IO request of the host is a read request, the already-stored data is extended and data is returned to the host. The result of having compressed the data or not having compressed the data due to bad compression efficiency is stored in the metadata stored in page granularity which is the granularity of compression (S5109).

If the volume is a distributed virtual volume, the procedure advances to S5103. In S5103 the entry of Referral information corresponding to the IO request is searched, and determination is made on whether the physical storage device is capable of processing the IO (S5104). At this time, as a result of determination of the entry of the Referral information in S5104, if a different storage device has authority to control the UDS, a Check response having attached the Referral Sense Data is returned (S5110). No compression or extension is performed at this time. Next, the host determines the content of the check response, and re-issues the IO to a target port of the physical storage device having the correct UDS. The control within the storage device during reissuing of the IO in the host starts from the present flow.

When it is confirmed in S5104 that IO is received by the correct physical storage device, data is compressed and stored in the physical storage device having received the IO, or data is extended and returned to the host. According to the present flow, the compression and extension operation can be load-distributed statically to a plurality of physical storage devices as described in the Referral information which is the location information of the UDS of the distributed virtual volumes.

Figure 52A:
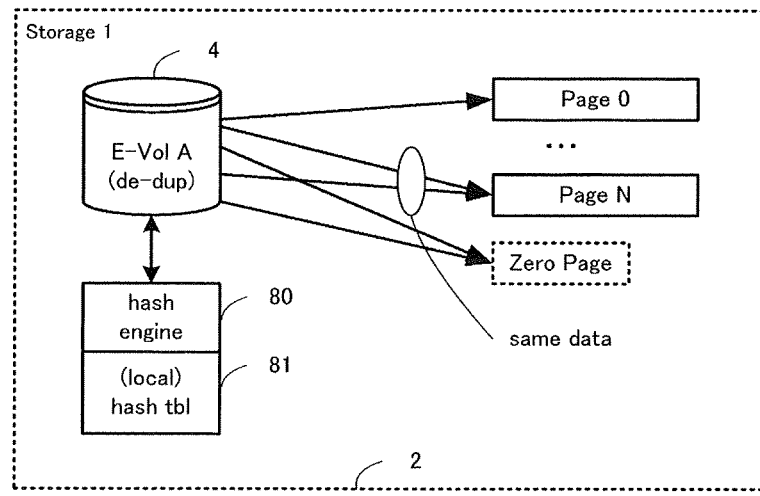
FIG. 52A is a block diagram showing one example of configuration of a distributed virtual volume having applied a de-duplication function.
Figure 52B:
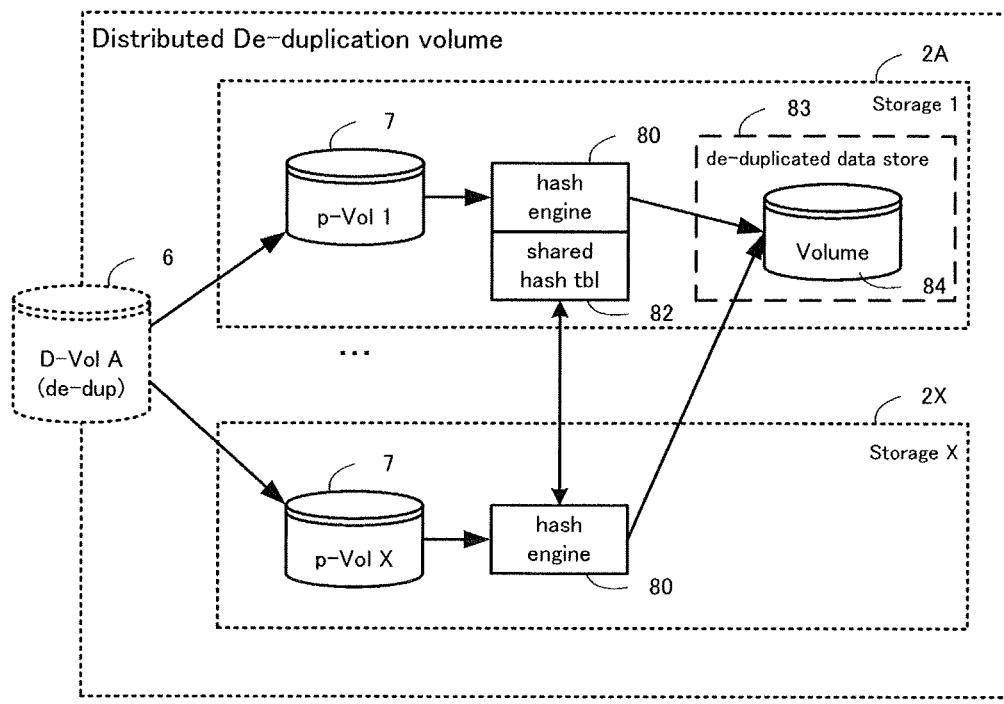
FIG. 52B is a block diagram showing one example of load distribution of a real volume of FIG. 52A.

FIGS. 52A and 52B illustrate a function of the storage device, which is the load distribution processing of the real volume for executing the data de-duplication processing. FIG. 52A is a view showing the de-duplication processing in a storage device. The storage device generates a hash value for checking de-duplication of data in a hash engine 80 with respect to the storage data of the real volume 4 having validated the data de-duplication processing. Next, the storage device associates the aforementioned hash value and with corresponding page and stores the same in a hash table 81.

In the case of a data writing process to the real volume, it is necessary to perform hash processing to the write data and to compare whether the data is the same data or not if necessary. The calculation processing of a hash function is a resource that generally requires a large amount of calculation processing. Since the process also requires searching of the hash table 81, the process becomes a bottleneck of the controller performance of the storage device. However, since the capacity is reduced by de-duplication, the need for throughput performance of the process is relatively decreased as the capacity reduction efficiency increases.

In de-duplication processing, a plurality of identical data having different LBA locations are stored in a data storage destination using a pointer (hash table 81), so that when data is split to partial volumes of distributed virtual volume 6, the execution of the de-duplication processing within the partial volume does not lead to data deduplication among a plurality of storage devices, and the capacity reduction effect is lost.

Therefore, there are two possible patterns for performing distribution processing of the real volume 4 in which data de-duplication processing is activated. The first method is to collectively store the real data after performing de-duplication calculation in a cluster volume 84. The other method is the distribution arrangement of the storage destination as described later with reference to FIG. 53.

FIG. 52B illustrates an example of load distribution of a de-duplication volume. The host issues an IO request to a plurality of storage devices directly via the distributed virtual volume. Each storage device is capable of executing the IO processing using the hash engine 80 independently. The hash engine 80 of each storage device 2 refers to a shared hash table 82 and stores data to or reads data from a cluster volume 84.

If the write request relates to a new data page, a new storage destination is allocated in the cluster volume 84 and the data page is written thereto. In the write request, when identical data are detected, a pointer points to the real data page of the cluster volume 84. At this time, other storage devices can access the storage device having the cluster volume using the communication path coupling the storage devices.

In FIG. 52B, in case the hash engine processing relatively requires a processing ability compared to the cluster volume performance or the communication of shared information on the communication path coupling the storage devices, the effect of storage device distribution is enhanced.

Figure 53:
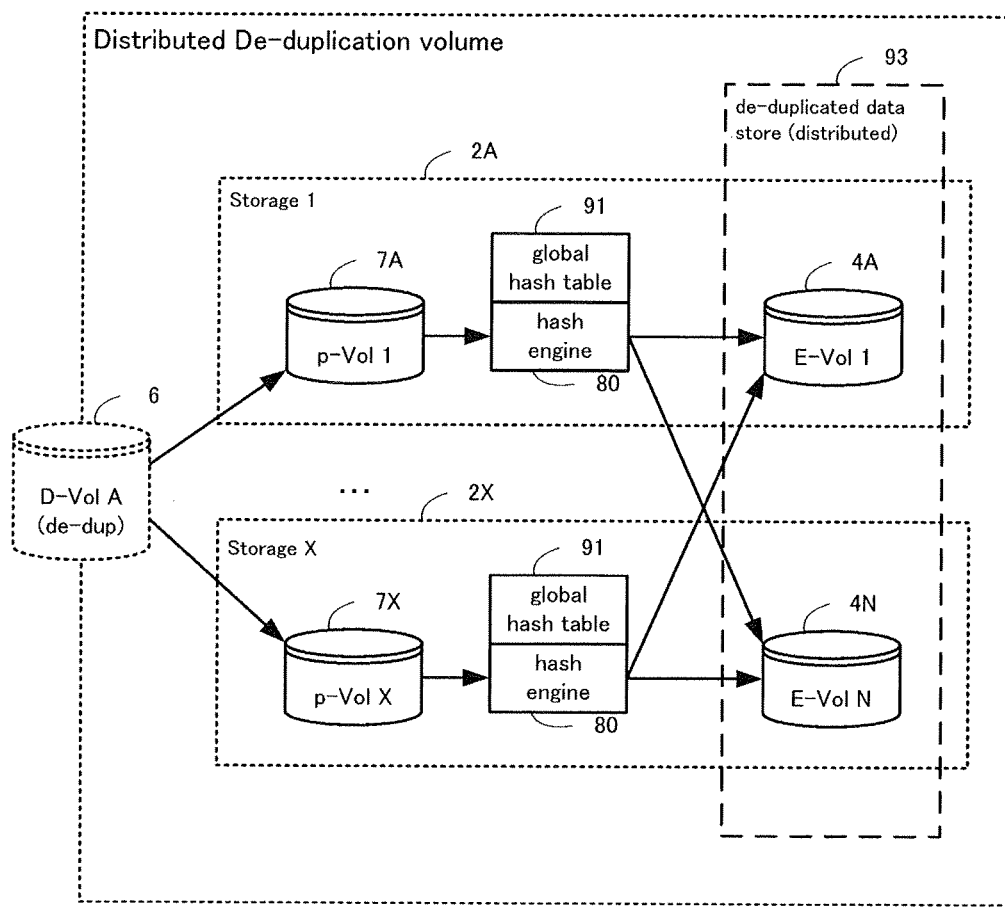
FIG. 53 is a block diagram showing one example of configuration of a distributed virtual volume having adopted the de-duplication function.

FIG. 53 shows another embodiment of load distribution of a de-duplication volume. The difference between FIG. 53 and FIG. 52B is that in the present drawing, the data storage destination is distributed across the whole storage device.

If the write request is a new data page, a new storage destination is allocated in a data store 93 and the data page is written therein. When identical data are detected in the write request, a pointer points to the real data page of the data store 93. At this time, the other storage device accesses the storage device having the cluster volume using the communication path coupling the storage devices. Further, the hash table 91 is shared by a plurality of storage devices so that the same information can be acquired from the hash engine of any storage device.

When hash table 91 is referred to during reading of data, identical data may be stored in a storage device that differs from the storage device associated with the partial volume 7 having issued the IO request based on the SCSI Referral.

At this time, there are two methods of the procedure for reading data. One method performs reading of data among storage devices using the communication path coupling the storage devices and then returning the read data to the host. Another method first prompts a retry request to the host in a Referral response since it is possible to determine which storage the data is stored in based on the hash table 91. Thereafter, the host uses the TPG information stored in the Referral response to switch the IO issue path to a storage that differs from the initial IO storing the real data via deduplication, and issues an IO request.

According to the former operation flow, the communication path coupling the storage devices is consumed. According to the latter operation flow, the host must reissue the IO based on the Referral response, but the bandwidth of the communication path between storage devices is not consumed by the read data. Whether to choose which operation flow to process the IO request should be selected by the storage device having received the IO request based on the size of the read IO request and the bandwidth load of the communication path between storage devices to determine whether the process should be performed within the present storage device or to send a response to the host to re-issue the IO request to another storage device.

Figure 54:
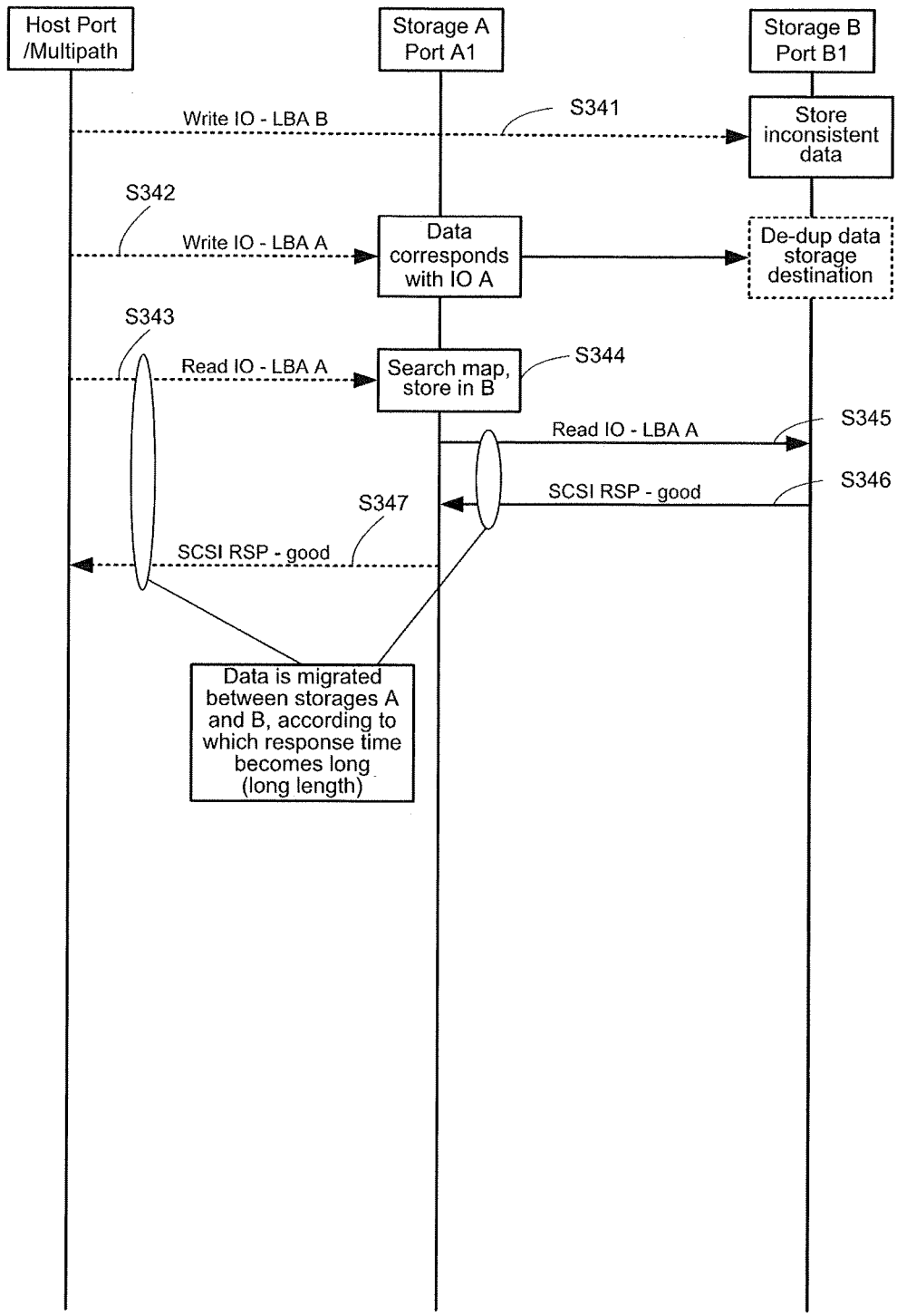
FIG. 54 is a ladder chart showing a distributed virtual volume processing having applied the de-duplication function.

FIG. 54 is a ladder chart illustrating the IO processing procedure between storage devices in a distributed virtual volume for operating the de-duplication function described in FIG. 53. The host issues a write command to the LBA (Logical Block Address) B. At this time, when the host refers to the Referral of the distributed virtual volume 6 having been acquired in advance, the LBA B corresponds to the partial volume 7B stored in the storage device 2B. Therefore, the write command of LBA B is issued using the path connected to storage device 2B (S341).

As a result of executing the hash engine processing, the storage device recognizes that the data does not correspond to the already-stored data and therefore does not correspond to de-duplication, so a new page is allocated to the storage device 2B and the data received via the write command S341 is stored therein. Thereafter, the host issues a write IO request to another LBA A. At this time, by referring to the Referral that the host has, the host recognizes that LBA A is an IO request that should be issued to the storage device 2A. Therefore, the host issues the write IO request through the path connected to storage device 2A (S342).

At this time, it is assumed that by processing the write data received by the storage device 2A via the hash engine, the data has corresponded with the data of the IO request A. In this case, since the data storage destination is storage device 2B, when the area of LBA A is to be read, the data must be read from the storage device 2B.

According to this process, the Referral information that the host or the distributed virtual volume has will be inconsistent with the position of the page assigned via deduplication. When the host issues a read IO request to the LBA B, the Referral information and the mapping of de-duplication correspond, and the IO request being issued to the storage device 2B should read the data page assigned to the storage device 2B and complete the process (not shown in FIG. 54).

Next, an example is described in which the host executes the reading of data with respect to LBA A. The host issues a read IO request with respect to the LBA A. At this time, by referring to the Referral information that the host has, the LBA A is an IO request to be issued to the storage device 2A, so that the host should issue the IO to the associated storage device 2A. Therefore, the host issues a read IO request of LBA A to the storage device 2A (S343). The storage device 2A having received the aforementioned IO request refers to the de-duplication page management table. Here, it is found that the data storage destination storage device is 2B (S344).

Next, the storage device 2A issues an IO request to the storage device 2B via the communication path 16. The storage device 2B reads data from the data storage destination (S345), and returns the read out data and response (S346). Next, the storage device 2A returns the data read from the storage device 2B and a response to the host (S347).

According to this procedure, when the size of the IO request is large, the communication path 16 between storage devices will be the bottleneck. Therefore, according to the length of the IO request, it may be suitable for the multipath software of the host to issue an IO read request of the LBA A directly to the storage device 2B.

Figure 55:
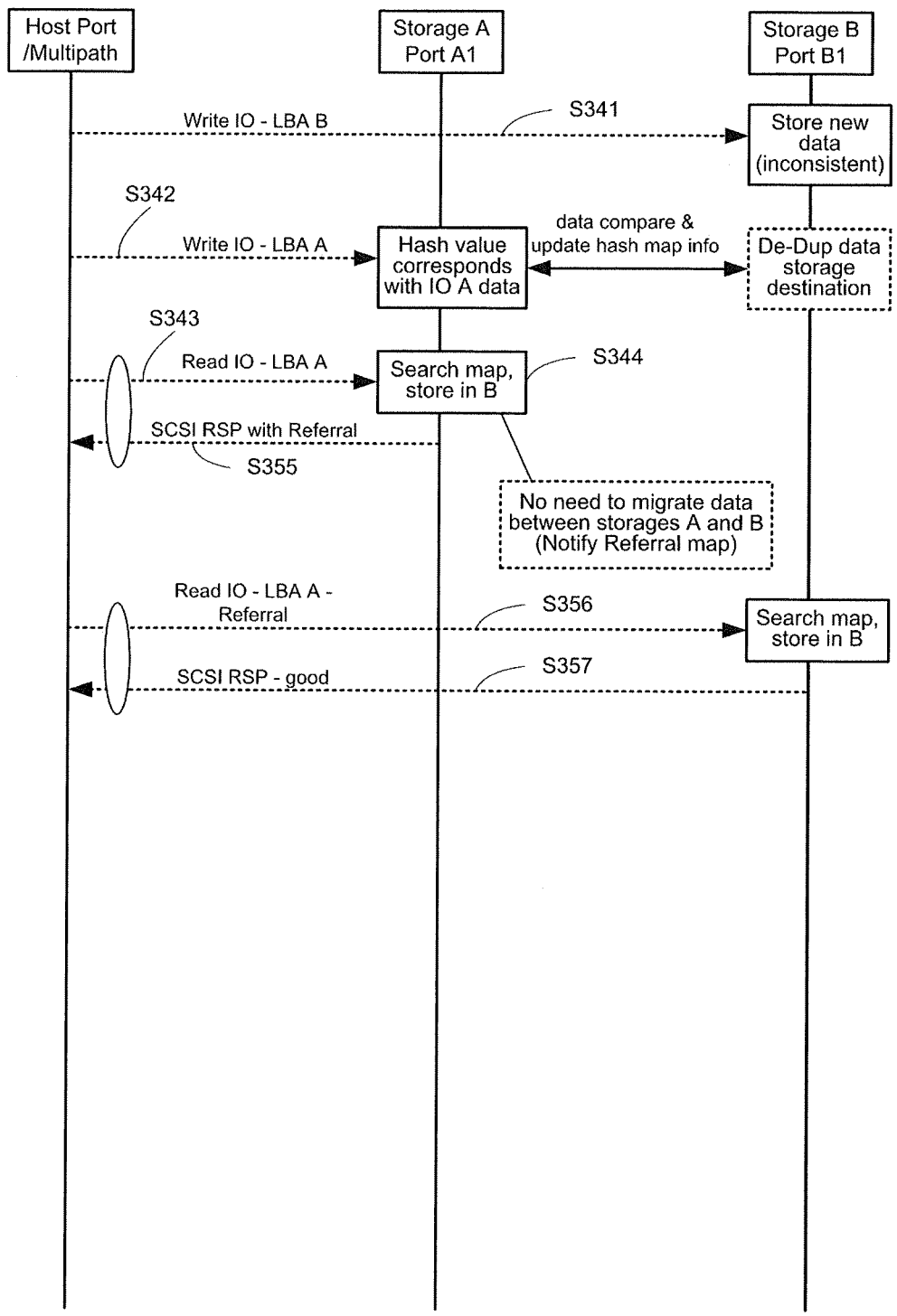
FIG. 55 is a ladder chart showing a distributed virtual volume processing having applied the de-duplication function.

FIG. 55 is a ladder chart showing the IO processing procedure between storage devices in a distributed virtual volume having activated the de-duplication function. The conditions of FIG. 54 apply to steps S341 through S344 of FIG. 55, so the descriptions thereof are omitted.

After S344, the storage device 2A returns a response including Referral information stating that an IO request to the storage device 2B is required to the multipath software and requests that IO request is re-issued (S355). Then, the host having received the SCSI Referral response in S355 analyzes the response and re-issues a current IO request to the storage device 2B only in this case. The host re-issues the IO request only in this case since the current IO request is associated with the Referral response (S356).

The storage device 2B reads the data of LBA A that is stored therein (data matched via de-duplication) from the data page, and sends a response to the host without having the storage device 2A intervened (S357).

The difference between the response methods of FIGS. 54 and 55 is the tradeoff of the amount of traffic of the communication path 16 and the increase in the number of retries by the host. The storage device can use both the sequences of FIGS. 54 and 55 by calculating the amount of traffic of the IO and the amount of traffic of the data.

FIGS. 56A through 56D show the arrangements of various information that the virtual storage device and the physical storage device retains, and the method for accessing the same. Since the host group information 1109, the host/peer zone information 1111 and the communication path/peer zone information 1102 differs for each physical storage device, the information is not required to be shared with other physical storage devices. The page location information 1106 is location information allocated from the capacity pool, so that the information is not required to be shared with other physical storage devices.

The volume configuration information (volume information 1104, distributed virtual volume information 1105 and storage function information 1116) and the TPG information 1113 are information that need to be shared with all the storage devices constituting the distributed virtual volume. The virtual storage device refers to and changes these shared information via the procedure (FIG. 35) in which the storage administrator creates a volume. Further, in the procedure (FIG. 36) in which the host executes volume recognition, the host refers to the volume configuration information and the TPG information for creating the Inquiry information or the TPG information. When the host issues an IO request in normal times, the information is retained in the memory of the host, so that there is no need to send an inquiry to the virtual storage device. The capacity of these information is small, so that it can be shared with each physical storage devices and can be updated synchronously when creating a volume, since there is little influence on the performance.

The Referral information 1114 of the distributed virtual volume is information storing the path of the TPG that can be accessed in page granularity, and the capacity of the information is extremely large. Further, the Referral information must be referred to every time an IO request is issued so as to determine the associated storage device regarding the IO request from the host, to create a Referral Sense Data response when the storage device is not the associated storage device, or to perform IO routing, and there are a number of arrangement methods thereof.

Figure 56A:
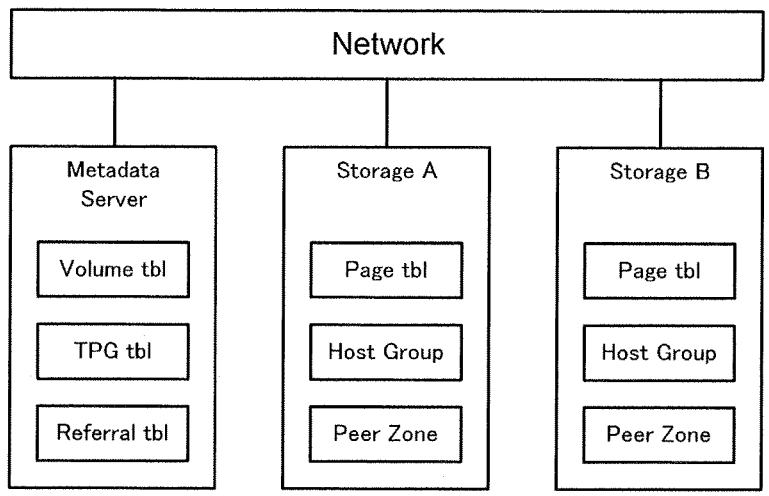
FIG. 56A is a block diagram showing an arrangement in which a metadata management server or a representative physical storage device stores shared information of the virtual storage device.

FIG. 56A illustrates a configuration in which the metadata management server or the representative physical storage device stores the shared information of the virtual storage device. In the case of FIG. 56A, each physical storage device must send an inquiry of Referral information to the metadata management server or the representative physical storage device so as to inquire the target port of the associated physical storage device each time an IO request is received. In this case, when a transaction performance is required, the communication traffic for acquiring shared information becomes the bottleneck. This method is suitable in cases where the shared information is changed frequently or where the capacity is too large that it cannot be retained in the respective storage devices.

Figure 56B:
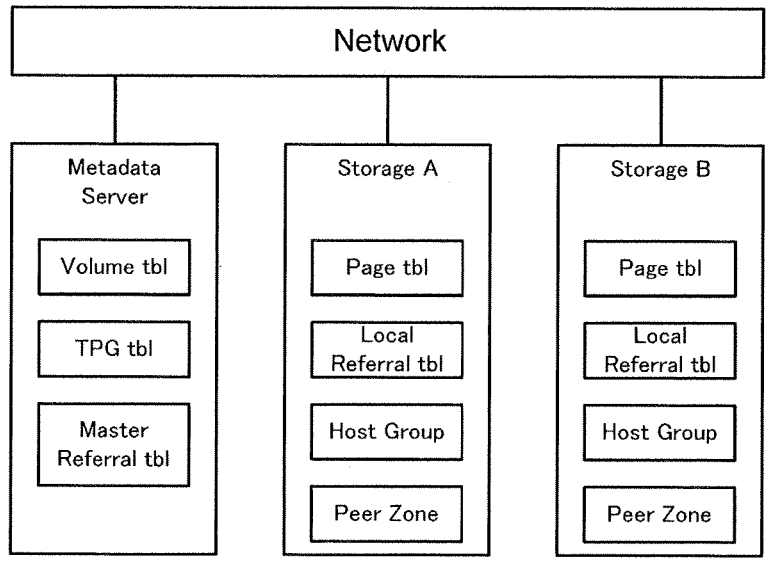
FIG. 56B is a block diagram showing an arrangement in which a metadata management server or a representative physical storage device stores shared information of the virtual storage device, and each physical storage device locally includes a necessary section of a part of the shared information.

FIG. 56B illustrates a configuration in which the metadata management server or the representative physical storage device stores the shared information of the virtual storage device, and each physical storage device locally stores the necessary portion of the shared information. In FIG. 56B, if another physical storage device receives from the host an IO request corresponding to the associated UDS, the physical storage device accesses the master Referral information of the metadata management server or the representative physical storage device, and sends a Referral Sense Data response.

If a configuration is adopted in which the host multipath software retains all the Referral information of the virtual storage device via the SCSI Report Referral command, the host multipath software issues an IO request correctly to the associated physical storage device. Thus, as shown in FIG. 56B, an arrangement is preferred in which the partial volumes store only the associated Referral information with the other information missing.

Further, by locally arranging the Referral information of the associated physical storage device or the other physical storage devices in response to the storage tier required to have high transaction performance or according to the access frequency, it is expected that the traffic of inquiry to the metadata server can be reduced.

Figure 56C:
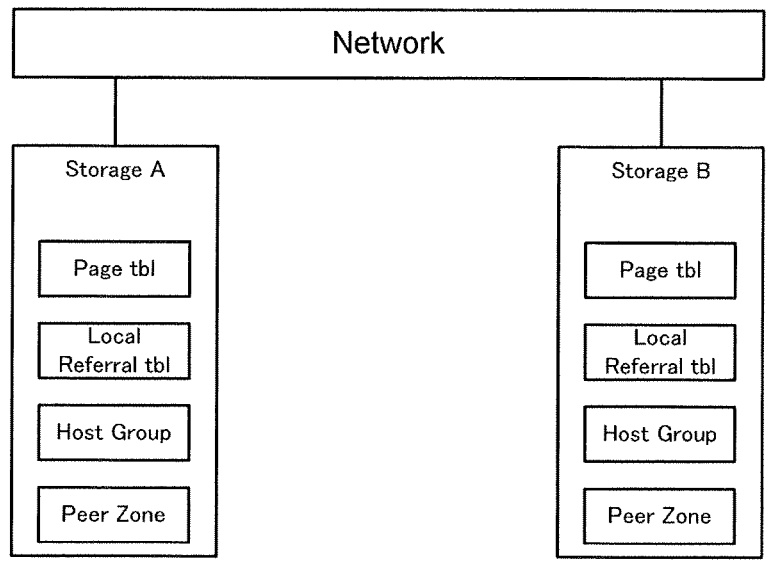
FIG. 56C is a block diagram showing an arrangement in which each physical storage device independently stores the associated Referral information.

FIG. 56C illustrates an arrangement in which the individual physical storage devices store the associated Referral information independently. In the arrangement of FIG. 56C, when a physical storage device receives an IO request corresponding to the UDS associated with another physical storage device from the host, the physical storage device sends an inquiry to all the physical storage devices constituting the distributed virtual volume, acquires the Referral information of the associated storage device, and sends Referral Sense Data response. It is also possible to repeat the Referral Sense Data response in each physical storage device so as to simply resend a response to the next physical storage device and to finally reach the associated physical storage device.

Figure 56D:
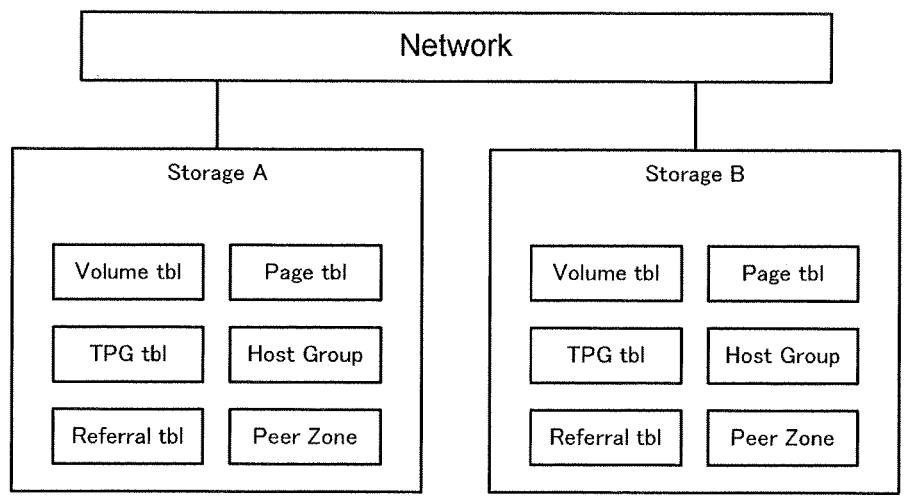
FIG. 56D is a block diagram showing an arrangement in which each physical storage device stores all the shared information of the virtual storage device.

FIG. 56D illustrates an arrangement in which the individual physical storage devices store all the shared information of the virtual storage device. Since according to the arrangement of FIG. 56D all the physical storage devices have all the information of the UDS associated to other physical storage devices, it is not necessary to send an inquiry to other storage devices. However, each physical storage device must store enormous amount of information.

REFERENCE SIGNS LIST

1: Host
2: Storage device
3: SAN
4: Entity volume
5: Virtual volume
6: Distributed virtual volume
7: Partial volume
11: Multipath software
12: Host port
13: ALUA control
14: Storage device port

The invention claimed is:

1. A storage system comprising:
a first storage device, and a second storage device, which are mutually coupled via a network with a host,
wherein the first storage device and the second storage device each include a processor, a memory, at least one physical storage area, and a plurality of ports connected to the network, the memory storing instructions for causing the processor to store data from the host in the at least one physical storage area,
wherein, when the first storage device and the second storage device receive a request to create a distributed virtual volume, including a plurality of data segments, from the host and a port of the host which has permission to access the distributed virtual volume, the processor of the first physical storage device:
creates a first partial volume constituting a part of the distributed virtual volume in the first storage device on the at least one physical storage area of the first storage device;

determines one or more ports of the first storage device which are permitted to receive access to the distributed virtual volume from the port of the host, and stores the one or more ports of the first storage device and the port of the host as access information;

establishes a coupling between the host and the first storage device according to the access information; and the processor of the second physical storage device:

creates a second partial volume constituting a part of the distributed virtual volume in the second storage device on the at least one physical storage area of the second storage device;

determines one or more ports of the second storage device which are permitted to receive access to the distributed virtual volume from the port of the host, and stores the one or more ports of the first storage device and the port of the host in the access information;

establishes a coupling between the host and the second storage device according to the access information; and wherein the access information also includes which of the one or more ports of the first storage device permitted to receive access to the distributed virtual volume from the port of the host are further permitted to access which ones of the logical data segments of the distributed virtual volume stored in the first partial volume, and which of the one or more ports of the second storage device permitted to receive access to the distributed virtual volume from the port of the host are further permitted to access which ones of the logical data segments of the distributed virtual volume stored in the second partial volume, wherein the logical data segments of the distributed virtual volume stored in the first partial volume are different from the logical data segments of the distributed virtual volume stored in the second partial volume, and wherein the host issues an input/output (I/O) request to the distributed virtual volume by referring to the access information.

2. The storage system according to claim 1, wherein the network is a storage area network (SAN) and the establishment of the coupling between the first storage device and the second storage device is performed by setting a zoning.

3. The storage system according to claim 2, wherein the processor of the first storage device further determines a number of the data segments stored in the first partial volume based on a required performance of the distributed virtual volume and the performances of the first storage device and the second storage device.

4. The storage system according to claim 3, wherein the second storage device further synchronizes the access information with the first storage device and the host.

5. The storage system according to claim 4, wherein the first storage device and the second storage device further store a function table which includes flags indicating which functions of the distributed virtual volume, the first partial volume, and the second partial volume are enabled.

6. The storage system according to claim 4, wherein the access information further includes which ports of the first storage device are permitted to access which ports of the second storage device, and which ports of the second storage device are permitted to access which ports of the first storage device, and wherein each of the processor of the first storage device and the processor of the second storage device further:

stores an identical hash information;

executes de-duplication by referring to the hash information, and wherein, when one of the first storage device or the second storage device receives a read request from the host:

specifies which of the first storage device or the second storage device stores target data of the read request by referring to the hash information; and if the one of the first storage device or the second storage device having received the read request is not the specified storage device, reads the target data of the read request from the specified storage device and sends the same to the host.

7. The storage system according to claim 4, wherein the access information further includes which ports of the first storage device are permitted to access which ports of the second storage device, and which ports of the second storage device are permitted to access which ports of the first storage device, and wherein each of the processor of the first storage device and the processor of the second storage device further:

stores an identical hash information;

executes de-duplication by referring to the hash information, and wherein, when one of the first storage device or the second storage device receives a read request from the host:

specifies which of the first storage device or the second storage device stores a target data of the read request by referring to the hash information; and if the one of the first storage device or the second storage device having received the read request is not the specified storage device, sends a request to the host to reissue the read request to the specified storage device.

8. The storage system according to claim 4, further comprising:

a third storage device and a fourth storage device, wherein the first storage device has a journal volume storing differential information of the first partial volume;

wherein the third storage device includes a processor, a memory, at least one physical storage area, and a plurality of ports connected to the network, the memory storing instructions for causing the processor to store data in a third partial volume constituting part of the journal volume, wherein the fourth storage device includes a processor, a memory, at least one physical storage area, and a plurality of ports connected to the network, the memory storing instructions for causing the processor to store data in a fourth partial volume constituting part of the journal volume, and wherein the first storage device sends an I/O request received from the host to the journal volume to the third storage device or the fourth storage device by referring to the access information.

9. The storage system according to claim 4, wherein the access information is stored in each of the host, the first storage device and the second storage device.

10. The storage system according to claim 1, wherein the processor of the first storage device and the processor of the second storage device de-duplicate data stored on the first partial volume and the second partial volume, wherein the processor of the first storage device creates a third partial volume constituting a part of a de-duplicated distributed virtual volume on the at least one physical storage area of the first storage device, wherein the processor of the second storage device creates a fourth partial volume constituting a part of the de-duplicated distributed virtual volume on the at least one physical storage area of the second storage device, wherein the processor of the first storage device and the processor of the second storage device store the de-duplicated data in the second distributed virtual volume, and wherein the processor of the first storage device and the processor of the second storage device store hashes of the de-duplicated data in a hash table which associates hashes of the de-duplicated data with corresponding logical data segments of the distributed virtual volume and corresponding locations in the third partial volume and the fourth partial volume.

11. A storage management method of a storage system comprising a first storage device, and a second storage device, which are mutually coupled via a network with a host, where the first storage device and the second storage device each include a processor, a memory, at least one physical storage area, and a plurality of ports connected to the network, the memory storing instructions for causing the processor to store data from the host in the at least one physical storage area, the storage management method comprising:

receiving, at the first storage device and the second storage device, a request to create a distributed virtual volume, including a plurality of data segments, from the host and a port of the host which has permission to access the distributed virtual volume;

creating a first partial volume constituting a part of the distributed virtual volume on the at least one physical storage area of the first storage device;

determining one or more ports of the first storage device which are permitted to receive access to the distributed virtual volume from the port of the host, and store the one or more ports of the first storage device and the port of the host as access information;

creating a second partial volume constituting a part of the distributed virtual volume one the at least one physical storage area of the second storage device;

determines one of more ports of the second storage device which are permitted to receive access to the distributed virtual volume from the port of the host, and store the one or more ports of the second storage device and the port of the host in the access information;

establishing a coupling between the host and the first storage device;

establishing a coupling between the host and the second storage device; and issuing an input/output (I/O) request from the host to the distributed virtual volume by referring to the new access information, wherein the access information also includes which of the one or more ports of the first storage device permitted to receive access to the distributed virtual volume from the port of the host are further permitted to access which ones of the logical data segments of the distributed virtual volume stored in the first partial volume, and which of the one or more ports of the second storage device permitted to receive access to the distributed virtual volume form the port of the host are further permitted to access which ones of the logical data segments of the distributed virtual volume stored in the second partial volume, where the logical data segments of the distributed virtual volume stored in the first partial volume are different from the logical data segments of the distributed virtual volume stored in the second partial volume.

12. The storage management method according to claim 11, wherein the network is a storage area network (SAN) and the establishment of the coupling between the first storage device and the second storage device is performed by setting a zoning.

13. The storage management method according to claim 12, further comprising:

determining, by the first storage device, a number of the data segments stored in the first partial volume based on a required performance of the distributed virtual volume and the performances of the first storage device and the second storage device.

14. The storage management method according to claim 12, wherein the first storage device and the second storage device stores an identical hash information; and the method further comprising:

executing de-duplication by referring to the hash information;

receiving a read request;

specifying which of the first storage device or the second storage device stores target data of a read request sent from the host by referring to the hash information; and if the one of the first storage device or the second storage device having received the read request is not the specified storage device, reading the target data of the read request from the specified storage device and sending the same to the host.

15. The storage management method according to claim 12, wherein the first storage device and the second storage device store an identical hash information; and the method further comprising:

executing de-duplication by referring to the hash information;

receiving a read request;

specifying which of the first storage device or the second storage device stores target data of a read request sent from the host by referring to the hash information; and if the one of the first storage device or the second storage device having received the read request is not the specified storage device, sending a request to the host to reissue the read request to the specified storage device.

16. The storage management method according to claim 12, wherein the storage device further comprises a third storage device and a fourth storage device, and the first storage device has a journal volume storing differential information of the first partial volume;

the method further comprising:

storing data in a third partial volume constituting part of the journal volume on the third storage device;

storing data in a fourth partial volume constituting part of the journal volume on the fourth storage device; and sending to the third storage device or the fourth storage device an I/O request from the host to the journal volume by referring to the access information.

17. The storage management method according to claim 11, further comprising:

de-duplicating data stored on the first partial volume and the second partial volume; and creating a third partial volume constituting a part of a de-duplicated distributed virtual volume on the at least one physical storage area of the first storage device;

creating a fourth partial volume constituting a part of the de-duplicated distributed virtual volume on the at least one physical storage area of the second storage device;

storing the de-duplicated data in the second distributed virtual volume; and storing hashes of the de-duplicated data in a hash table which associates hashes of the de-duplicated data with corresponding logical data segments of the distributed virtual volume and corresponding locations in the third partial volume and the fourth partial volume.

\* \* \* \* \*